United States Patent [19]

Konno

[11] Patent Number: 5,694,619
[45] Date of Patent: Dec. 2, 1997

[54] SYSTEM FOR EXCLUSIVELY CONTROLLING ACCESS OF A SEMICONDUCTOR MEMORY MODULE USING A BACKUP MEMORY AND COMPRESSION AND DECOMPRESSION TECHNIQUES

[75] Inventor: Shigeo Konno, Kawasaki, Japan

[73] Assignee: Fujitsu Limited, Kawasaki, Japan

[21] Appl. No.: 261,851

[22] Filed: Jun. 16, 1994

[30] Foreign Application Priority Data

Sep. 20, 1993 [JP] Japan .................. 5-232677

[51] Int. Cl.⁶ .................. G06F 7/32; G06F 12/10
[52] U.S. Cl. .................. 395/888; 395/427
[58] Field of Search .................. 395/600, 200.01, 395/427, 888

[56] References Cited

U.S. PATENT DOCUMENTS

| | | | |
|---|---|---|---|
| 4,604,709 | 8/1986 | Blout et al. | 364/900 |
| 5,031,091 | 7/1991 | Wakatsuki et al. | 364/200 |
| 5,167,034 | 11/1992 | MacLean, Jr. et al. | 395/575 |
| 5,247,638 | 9/1993 | O'Brien et al. | 395/425 |

FOREIGN PATENT DOCUMENTS

| | | |
|---|---|---|
| 57 34233 | 2/1982 | Japan . |
| 57 60588 | 4/1982 | Japan . |
| 58 27240 | 2/1983 | Japan . |
| 58 27255 | 2/1983 | Japan . |
| 2 50389 | 2/1990 | Japan . |
| 2213966 | 8/1990 | Japan . |

*Primary Examiner*—Thomas C. Lee
*Assistant Examiner*—Rehana Perveen Krick
*Attorney, Agent, or Firm*—Greer, Burns & Crain, Ltd.

[57] ABSTRACT

Disclosed is an exclusive control method in an I/O subsystem having an exclusive controller which is provided with an exclusive control table and which permits a host interface to use the I/O device when the I/O device is not used by any other host interface while prohibiting the use when another host interface is using the I/O device. The method comprises the steps of: allotting a logical path number to each of the host interfaces of each of the input/output interface portions; judging whether or not the I/O device is being used by another host interface by reference to the exclusive control table when a request for use of the I/O device is input from a host interface to which a predetermined logical path number is allotted; permitting the host interface which has required for access to use the I/O device when the I/O device is not in use, while setting a flag indicating that the I/O device is "Occupied" in the exclusive control table in correspondence with the allotted logical path number; and changing the flag to a flag indicating that the I/O device is "Vacant" when the use of the I/O device is finished.

10 Claims, 41 Drawing Sheets

FIG.2 (PRIOR ART)

| Channel No. | Physical interface | Device No. | | |
|---|---|---|---|---|
| | | 0 | 1 | 2 |
| 0 | 0 | Occupied | | |
| | 1 | | | |
| 1 | 0 | | | |
| | 1 | | | |

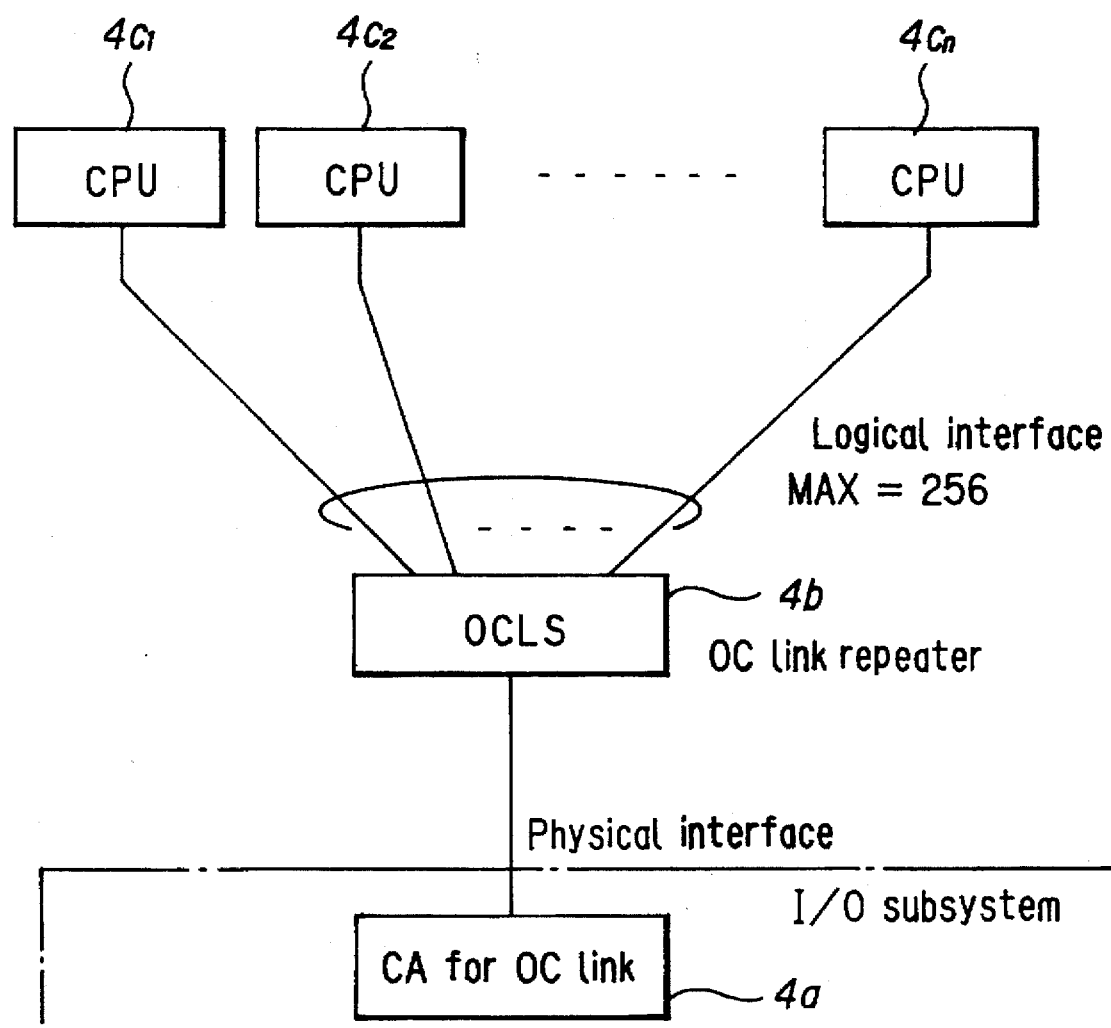

| Exposure No. | I/O device address |
|---|---|
| 0 | (00)hex |
| 1 | (40)hex |
| 2 | (80)hex |
| 3 | (C0)hex |

OS1: rows 0, 1
OS2: rows 2, 3

FIG.5 (PRIOR ART)

| CA No. | Physical interface | Logical interface | Exclusive control management information |
|---|---|---|---|
| 0 | 0 | 0<br>1<br>2<br>· · ·<br>n3-1 | · · · ·<br>· · · ·<br>· · · ·<br>· · · ·<br>· · · · |
| | 1 | 0<br>1<br>2<br>· · ·<br>n3-1 | · · · ·<br>· · · ·<br>· · · ·<br>· · · ·<br>· · · · |
| | 2 | 0<br>1<br>2<br>· · ·<br>n3-1 | |
| | 3<br>· · · | 0<br>1 | |
| | n2-1 | 0<br>1<br>· · ·<br>n3-1 | |
| 1 | 0 | 0<br>1 | |
| · · · | · · · | · · · | |
| n1-1 | 0<br>· · ·<br>n2-1 | 0<br>1<br>n3-1 | |

| Logical path No. | CA No. | Host interface No. |
|---|---|---|
| 0 | 0 | 0 |
| 1 | 1 | 0 |
| 2 | 1 | 1 |
| 3 | 2 | 0 |
| 4 | 2 | 1 |
| 5 | 2 | 2 |
| ⋮ | ⋮ | ⋮ |

LPT

FIG. 15

| Logical path No. | Occupation | Reservation | Other information |
|---|---|---|---|
| 0 | 0 | 0 | |
| 1 | 1 | 1 | |
| 2 | 0 | 0 | |
| 3 | 0 | 0 | |
| 4 | 0 | 0 | |
| 5 | 0 | 0 | |
| : | : | : | : |

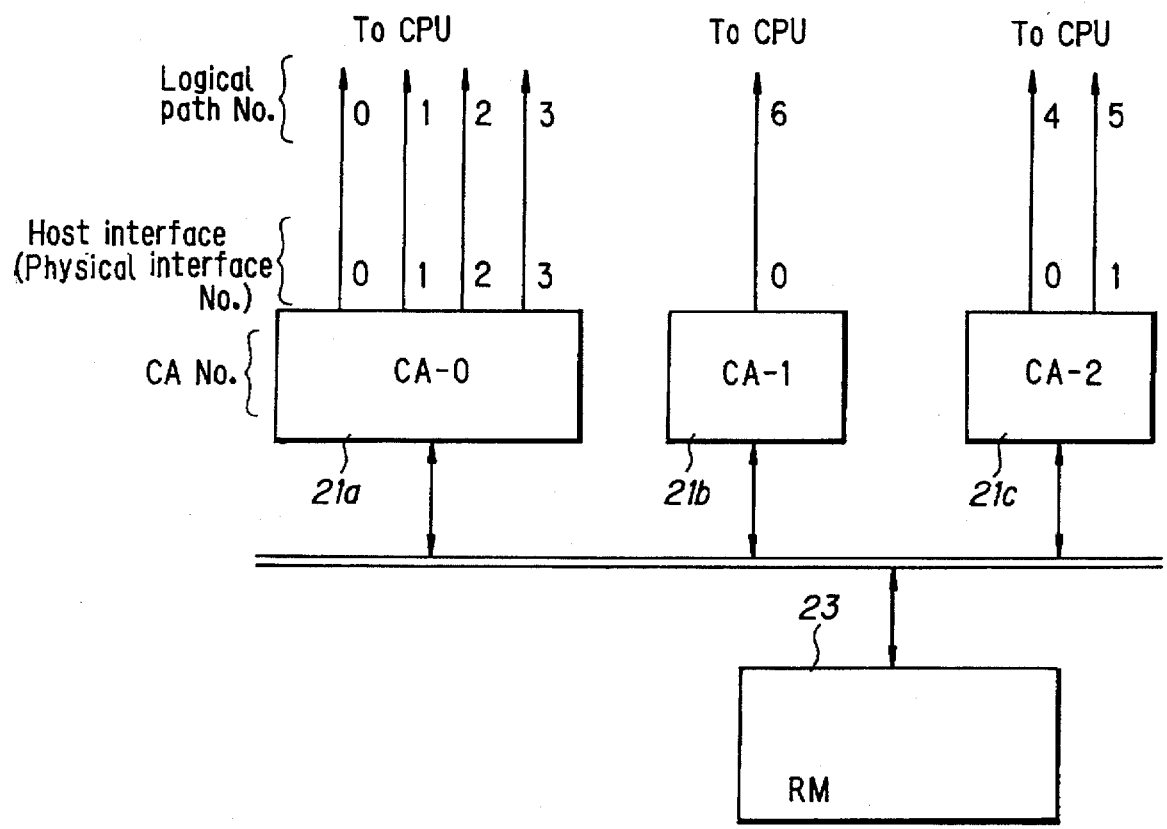

| Logical path No. | CA No. | Host interface No. |
|---|---|---|
| 0 | 0 | 0 |
| 1 | 0 | 1 |
| 2 | 0 | 2 |
| 3 | 0 | 3 |
| 4 | 2 | 0 |
| 5 | 2 | 1 |
| 6 | 1 | 0 |
| 7 | 1 | 1 |
| 8 | 1 | 2 |
| 9 | 1 | 3 |

Exposure

| Logical path No. | CA No. | Host interface No. |
|---|---|---|
| 0 | 0 | 0 |
| 1 | 0 | 1 |
| 2 | 0 | 2 |
| 3 | 0 | 3 |
| 4 | 2 | 0 |
| 5 | 2 | 1 |
| 6 | 1 | 0 |
| 7 | 1 | 1 |
| ⋮ | ⋮ | ⋮ |

FIG.22A

| Host interface No. | Logical path No. |
|---|---|
|  |  |

FIG.22B

| Host interface No. | OC link No. | Logical path No. |
|---|---|---|
|  |  |  |
|  |  |  |

At the time of refreshment

At the time of data writing

SYSTEM FOR EXCLUSIVELY CONTROLLING ACCESS OF A SEMICONDUCTOR MEMORY MODULE USING A BACKUP MEMORY AND COMPRESSION AND DECOMPRESSION TECHNIQUES

BACKGROUND OF THE INVENTION

1. Field of the Invention

The present invention relates to an I/O subsystem and the exclusive control method, data storage method and memory initialization method in the I/O subsystem.

2. Description of the Related Art

A recent large computer system which has increasingly enlarged the scale is generally composed of a plurality of central processing units (CPUs). In such a system, common use of data and communication of data among a plurality of CPUs are necessary. For this purpose, I/O device subsystem including an external storage unit is required to be provided with a multiplicity of host interfaces.

To meet this demand, the I/O subsystem is provided with a multiplicity of input/output controllers (CAs: Channel Adapters) having a plurality of input/output interfaces which are connected to host CPUs. In order to exclusively control the accesses from a plurality of CPUs, the I/O subsystem is provided with an exclusive control manager (RM: Resource Manager) having an exclusive control table.

FIG. 1 shows the structure of a semiconductor disk apparatus as such an I/O subsystem. In FIG. 1, the reference numerals $1a$, $1b$ each represent a CPU, 2 a semiconductor disk controller, and 3 a semiconductor disk having a plurality of semiconductor memory modules $3a$, $3b$, $3c$, . . . . The semiconductor disk apparatus has the same structure (Command code, data transfer method, etc.) as that of a magnetic disk apparatus except that the magnetic disk as the recording medium is replaced by a semiconductor memory. Therefore, the interface between the CPU $1a$ ($1b$) and the semiconductor disk controller 2 is completely the same as the interface between the CPU $1a$ ($1b$) and a magnetic disk controller. This semiconductor disk apparatus is advantageous in that instant access is possible because the movement of the head, which is necessary in a magnetic disk, is not necessary, and in that the software resources between the CPU and the magnetic disk controller are usable as they are.

In the semiconductor disk controller 2, the reference numerals $2a$ and $2b$ each represent a channel adapter CA having a single or a plurality of interfaces (host interfaces) to and from a host apparatus (CPU), numerals $2c$ and $2d$ each a memory interface adapter for controlling the operation of writing/reading data into and from the semiconductor disk 3, numeral $2e$ represents a resource manager RM having an exclusive control table ECT and executing exclusive control for permitting a host interface to use the semiconductor module $3a$ ($3b$ or $3c$) when another host interface is not using it, while prohibiting the use when another host interface is using it. Exclusive control is executed in each semiconductor memory module.

Two physical interfaces (physical ports) $2a_0$, $2a_1$ ($2b_0$, $2b_1$) are provided between the channel adapter $2a$ ($2b$) and the CPU $1a$ ($1b$). The exclusive control table ECT of the resource manager $2e$ records whether or not each of the semiconductor memory modules $3a$, $3b$, $3c$ (device numbers 0 to 2) is occupied by each combination (path) of a channel adapter (channel number) and a physical interface mounted on each channel adapter, as shown in FIG. 2. There are four types of paths, i.e., (00), (01), (10) and (11) in the semiconductor disc controller 2.

In this I/O subsystem, if a command for access to the semiconductor memory module $3b$ is issued from the CPU $1b$ to the channel adapter $2b$ through the physical interface $2b_1$, for example, the channel adapter $2b$ requests the resource manager $2e$ to permit the use of the semiconductor module $3b$. When the resource manager $2e$ receives the request for use, it judges whether or not the semiconductor memory module $3b$ is being used through another path by reference to the exclusive control table ECT. If the answer is YES, the resource manager $2e$ does not permit the channel adapter $2b$ to use it. On the other hand, if the answer is NO, the resource manager $2e$ permits the channel adapter $2b$ to use it, and sets a flag indicating "Occupied" in the field of the semiconductor memory module $3b$ in correspondence with the path (11). The channel adapter $2b$ which is permitted to use the semiconductor memory module $3b$ then receives data from the CPU $1b$ through the physical interface $2b_1$, and writes the data into the semiconductor memory module $3b$ through the memory interface adapter $2d$. When the writing operation is finished, the resource manager $2e$ changes the flag indicating "Occupied" to a flag indicating "Vacant" in correspondence with the path (11).

Problem in exclusive control

As described above, in the conventional I/O subsystem, a table region on the exclusive control table ECT is pre-allotted for each of the channel adapters in the I/O subsystem. For this reason, if the number of channel adapters accommodated in the I/O subsystem is increased and the number of physical interfaces in each channel adapter is increased, the size of the exclusive control is enlarged.

With the recent development and change of data transmitting technique, many kinds of interface system (e.g., electric interface system, optical interface system and OC link) coexist. In this situation, in order to enable an I/O subsystem to be connected to as many CPUs as possible, it is necessary to correspond to all of the existing interface systems. In other words, it is necessary to provide various types of channel adapters in the I/O subsystem in order to correspond to every interface system and, as a result, the number of channel adapters therefore increases. In addition, since not only the physical data transfer means but also the number of physical interfaces which can be provided in one channel adapter are different in interface systems. Therefore, the exclusive control table is further enlarged.

If a plurality of logical interfaces are defined on one physical interface, the exclusive control table must be produced while taking each logical interface into consideration. FIG. 3 is an explanatory view of an OC link interface system. In FIG. 3, the reference numeral $4a$ represents a channel adapter for OC link, and $4b$ an OC link change-over/repeater provided between a CPU $4_{ci}$ ($i=1, 2, \ldots$) and the I/O subsystem so as to dynamically switch the interface. It is possible to define 256 CPUs at its maximum on one physical interface through the OC link change-over/repeater. When a plurality of logical interfaces are defined on one physical interface in this way, it is necessary to produce the exclusive control table ECT while dealing with each of the logical interfaces as if they were different physical interfaces.

There is a system called a multi-exposure system which enables a multiple access by defining a plurality of I/O device addresses with respect to one I/O device. The multi-exposure system is used as an I/O device access system which is able to simultaneously access a plurality of areas in the I/O device such as a magnetic drum apparatus, a semiconductor disk apparatus and a disk cache through different paths. A computer has an architecture called virtual machines (separate operating systems which are operated independently of each other on a single CPU). When a plurality of such virtual machines (operating systems) are operated, one exposure is allotted to one operating system so as to secure the independence of the I/O device access of each operating system. In this way, when there are a plurality of virtual machines, a plurality of logical interfaces exist on one physical interface. In this case, it is also necessary to produce the exclusive control table ECT while dealing with each of the logical interfaces as if they were different physical interfaces.

FIG. 4 is an explanatory view of a multi-exposure system. It is now assumed that 256 I/O device addresses such as $(00)_{hex}$ to $(FF)_{hex}$ can be defined on an interface. At this time, the zone bits of an address is assigned to an exposure number. For example, as shown in FIG. 4A, the first 2 bits are assigned to an exposure number and the last 6 bits are assigned to a device number. In other words, exposures 0, 1, 2 and 3 are defined. If it is assumed that the number of physical I/O device in the I/O subsystem is one, and the device number is 0, the relationship shown in FIG. 4B holds between an exposure number and an I/O device address. These four I/O device addresses designate the same physical device (duplicate definition). The number of exposures may be other than four and the bit positions indicating the exposure number may be other position.

As described above, in the conventional I/O subsystem, a table region is stationarily allotted on the exclusive control table in accordance with the maximum possible structure of the I/O subsystem. In this system, it is necessary to secure a large table area on the exclusive control table, so that a large storage region is required. FIG. 5 shows an example of the structure of a conventional exclusive control table. In this table, the symbol n1 represents the maximum number of channel adapters mounted in the I/O subsystem, n2 the maximum number of physical interfaces mounted on one channel adapter, and n3 the maximum number of logical interfaces defined on one physical interface. The number of items in the column is n1×n2×n3. In the actual subsystem, however, the number of physical interfaces on one channel adapter and the number of logical interfaces on one physical interface vary, and a large part of the table is generally vacant, so that it is wasteful to produce a large exclusive control table.

Problem in semiconductor memory

In the semiconductor disk apparatus, a semiconductor memory chip is used as a medium for storing data. For this reason, the memory cost per bit is more expensive than that in a magnetic disk apparatus. In addition, the storage capacity per semiconductor disk apparatus is smaller as compared with a magnetic disk apparatus. In order to solve the problem in the storage capacity, the shape of a semiconductor memory chip is devised or the method of mounting the semiconductor memory chip is improved, but both of these improvements have a limitation, and the problem of the cost still remains unsolved. In order to solve the problem of the cost, a technique of storing as large an amount of data as possible in the physically same semiconductor memory resource is necessary.

In a conventional semiconductor disk apparatus, a format (CKD format) similar to that in an actual magnetic disk apparatus is adopted at the time of emulation. That is, an area on the semiconductor memory is allotted to gap information, which is necessary for controlling the operation of inputting/outputting data to and from a magnetic disk medium.

FIG. 6 shows a data format in a conventional semiconductor disk apparatus. The symbol DIR represents a directory written at the head of a track field. This data is intrinsic to a semiconductor disk and does not exist in the actual magnetic disk apparatus. After the directory DIR, a plurality of records Ri each of which is composed of a count portion Ci (i=1, 2, . . . ), a key portion Ki and a data portion Di are written. The count portion Ci records a track address, a record number, and the lengths of the subsequent key portion Ki and data portion Di. The key portion Ki is not always necessary but records a key for retrieval by an access method. The data portion Di records data which are generally called "user data". Each adjacent recording portions are divided by a gap g.

Such a gap g is unnecessary for accessing the semiconductor memory. Therefore, by removing all the gaps g, a larger amount of data is stored in the same physical semiconductor memory resource. However, since these gap areas are very small as seen from the total region of the subsystem, removal of the gap areas cannot be said to be a very effective solution.

As a technique which is worth notice, a data compression.restoration technique has recently been developed. This is a technique of compressing data so as to reduce the original data size without impairing the contents of the data, storing the compressed data in an external storage medium, and restoring the compressed data to the original data when the data is actually processed. There are various methods for this technique. The typical method is a method of encoding data in accordance with the continuity of the data in a block of data strings, and includes a run-length encoding method and a universal encoding method. In the run-length encoding method, data "a", for example, is compressed by representing "aa" by "a2" and "aaaaa" by "a5".

In the universal encoding method, input data are encoded by using the information representing a partial data string which has already been encoded. The typical universal encoding method adopts a Ziv-Lempel code. (See, for example, Munakata, "Data Compression Method by Ziv-Lempel" Information Processing Vol. 26, No. 1, 1985.) In the Ziv-Lempel encoding method, two algorithms, (1) a universal type and (2) an incremental parsing type, are proposed. As a practical method using a universal type algorithm, there is an LZSS encoding method (T. C. Bell, "Better OMP/L Text Compression", IEEE trans. on Commun, Vol. COM-34, No.12, December 1986). As a practical method using an incremental parsing type algorithm, there is an LZW (Lempel-Ziv-Welch) encoding method (T. A. Welsh, "A Technique for High-Performance Data Compression", Computer, June 1984.)

In the case of writing a large amount of data in the physically same semiconductor memory, adoption of a method of writing compressed data and restoring it to the original data when reading is considered. However, there are some problems remaining unsolved in the data compression technique.

A first problem is that a long time is required for data compression, i.e., the overhead time which is necessary for data transfer. Although there is a slight variation according to the methods of data compression, data compression processing fundamentally necessitates processing such as buffering of the data for monitoring the pattern of the data and the registration and retrieval of encoded data. For this reason, the data transfer time for compressed data is longer than that for data which is not subjected to any processing. Such an overhead time cannot be disregarded in a semiconductor disk apparatus which enables a uniform and high-speed access irrespective of the type of data.

A second problem is that the size of compressed data cannot be estimated before actual compression. As a result, in the case of reading stored data and rewriting it after modifying a part thereof, it is not always possible to store the data at the same position because the size of the compressed data is different from the compressed data before modification. If the run-length encoding method is cited as an example, when data "aaaa" encoded as "a4" and stored in the semiconductor memory is modified to "aabaa", the compressed data becomes "a2ba2", so that the size of the compressed data increase. In addition, since the data compression ratio depends on the type of data, if data are not continuous or the pattern of the data or the frequency of data occurrence is not constant, compression is generally impossible. In the worst case, the size of compressed data becomes larger than that of the original data.

A third problem is that since the original data is compressed, when there is an abnormality in a data compression mechanism or the like, the abnormality cannot be found until the compressed data is restored to the original data.

It is necessary to solve these problems in order to increase the amount of data which is stored in the semiconductor memory by adopting the data compression\restoration method.

Problem in memory initializing time

In a storage unit using a volatile memory such as a semiconductor disk apparatus, when the power source is initially turned on or print board with memory module is mounted or removed, the contents of the memory become undefined. In this case, the initializing operation for writing specific data (initialization data) in the memory so as to initialize the memory is necessary. Since the apparatus cannot be used until the initializing operation is finished, the user must wait for a while after the power source is turned on. In addition, since the access controller executes the initializing operation, memory access is impossible during initialization. It is therefore necessary to reduce such inconveniences in a storage unit as much as possible by shortening the initialization time or improving the memory access path.

FIG. 7 shows a conventional initializing mechanism. When the power source is turned on, an initialization starting signal INS is produced in a host module or an access controller 11. A data register 12 receives the initialization starting signal INS and sets writing data IDT for initialization therein. An initialization address counter 13 outputs an initialization address IAD. An address switching circuit 14 changes an address signal AD from the host module over to the initialization address IAD, and outputs the initialization data IDT to a data bus 15, the initialization address signal IAD to an address bus 16, and a memory access timing signal (not shown) so as to execute the operation of initializing a storage unit 10. Herein, REF denotes a refresh command signal and IED denotes an initialization end signal.

FIG. 8 shows the structure of another conventional initializing mechanism. In this mechanism, two access controllers 11a, 11b access three memory portions 10a, 10b and 10c separately from each other. Each of the access controllers 11a, 11b has the same structure as the access controller 11 shown in FIG. 7. When the memory portion 10b at the center is added by mounting a print board for memory module, the upper access controller 11a accesses the memory portion 10b so as to initialize it in the same way as in the mechanism shown in FIG. 7. During the initialization of the storage portion 10b, the lower access controller 11b receives an address signal AD and a data signal DT from the host module and outputs these signals to the address bus 16 and the data bus 15, respectively, and further outputs a storage access timing signal (not shown) so as to access the other two storage portions 10a and 10c in response to the request for access from the host module.

As described above, initialization is conventionally executed by producing an initialization address and writing initialization data into a memory in accordance with the address by an access controller. In the case of initializing a volatile memory, a refreshing operation for holding the data in the memory is necessary. Therefore, when a refresh command signal REF (see FIG. 7) is input, the initialization address counter 13 suspends the production of an initialization address signal IAD, and after the refreshing operation is finished, it resumes the production of an initialization address signal IAD. As a result, the time required for initialization is the sum of the time for writing the initialization data IDT and the time for executing the refreshing operation.

If initialization takes a long time, since the request for access from the host module cannot be processed until the end of the initialization, the user who has turned on the power source must wait for a long time before he can actually use the apparatus. In the mechanism shown in FIG. 8, the other access controller can process the request for access from the host module, but the memory access performance of the apparatus as a whole is reduced to half during that time. That is, if initialization takes a long time, the performance is also greatly lowered even in this mechanism.

As described above, in a conventional I/O subsystem, the exclusive control table is large and a large memory for storing the exclusive control table is required.

Furthermore, the operation of writing compressed data into a conventional semiconductor disk apparatus suffers from various problems such as (1) that the increase in the transfer time cannot be disregarded, (2) that it is impossible to estimate the size of compressed data in advance and (3) that when an abnormality is caused in the compression control mechanism, it is impossible to find the abnormality until the data is restored.

In addition, since a refreshing operation is necessary for initializing a semiconductor memory or the like, the waiting time for access is long.

SUMMARY OF THE INVENTION

Accordingly, it is a first object of the present invention to eliminate the above-described problems in the related art and to provide an I/O subsystem having an enhanced performance.

It is a second object of the present invention to provide an exclusive control method and an I/O subsystem which can reduce the size of an exclusive control table.

It is a third object of the present invention to provide a data storage method and an I/O subsystem for storing compressed data in a semiconductor disk apparatus which can solve the problems in data compression in the related art.

It is a fourth object of the present invention to provide an initialization method and an I/O subsystem which can shorten the time for initializing a semiconductor memory or the like by obviating a refreshing operation.

To achieve the first and second objects, in a first aspect of the present invention, there is provided an exclusive control method comprising the steps of: allotting a logical path number to each of host interfaces in each of input/output interface portions; managing the state of use of I/O devices in correspondence with the logical path number in an exclusive control table; judging whether or not an I/O device is being used by another host interface by reference to the exclusive control table when a request for use of the I/O device is input from a host interface to which a predetermined logical path number is allotted; permitting the host interface which has required for access to use the I/O device when the I/O device is not in use, while setting a flag indicating that the I/O device is "Occupied" in the exclusive control table in correspondence with the allotted logical path number; and changing the flag to a flag indicating that the I/O device is "Vacant" when the use of the I/O device is finished. There is also provided an I/O subsystem which realizes this exclusive control method.

To achieve the third object, in a second aspect of the present invention, there is provided a data storage method for storing data in a semiconductor memory module, the method comprising the steps of: compressing the data by a channel adapter and writing the compressed data in the semiconductor memory module, reading and restoring the compressed data from the semiconductor memory module; and verifying the compressed data written in the semiconductor memory module by comparing the restored data with the data before compression. There is also provided an I/O subsystem which realizes this data storage method.

To achieve the fourth object, in a third aspect of the present invention, there is provided a memory initialization method for initializing a volatile memory which is accessed in accordance with combination of a designated column address and a designated row address and which is refreshed for each row by writing initialization data into the memory, the method comprising the steps of: writing the initialization data in all memory cells on an i-th column while consecutively producing row addresses in an ascending order with the column address fixed at a constant value i; and repeating the step of writing the initialization data in the same way on subsequent columns while serially advancing the column address one by one.

Other features and advantages of the present invention will be apparent from the following description taken in conjunction with the accompanying drawings.

BRIEF DESCRIPTION OF THE DRAWINGS

FIG. 2 is an explanatory view of an exclusive control table;

FIG. 3 is an explanatory view of an OC link interface system;

FIG. 5 shows the structure of a conventional exclusive control table;

FIG. 15 is an explanatory view of an exclusive control table in the embodiment;

FIG. 16 is an explanatory view of the allotment of a logical path number when one host interface corresponds to one physical interface in the embodiment:

FIG. 17 is an explanatory view of the contents of a logical path control table;

FIGS. 22A and 22B are explanatory views of registration of a logical path number by a channel adapter;

DESCRIPTION OF THE PREFERRED EMBODIMENTS (a) Schematic structure of the invention FIGS. 9 and 10 are schematic explanatory views of the structure of the present invention.

Figure 9:
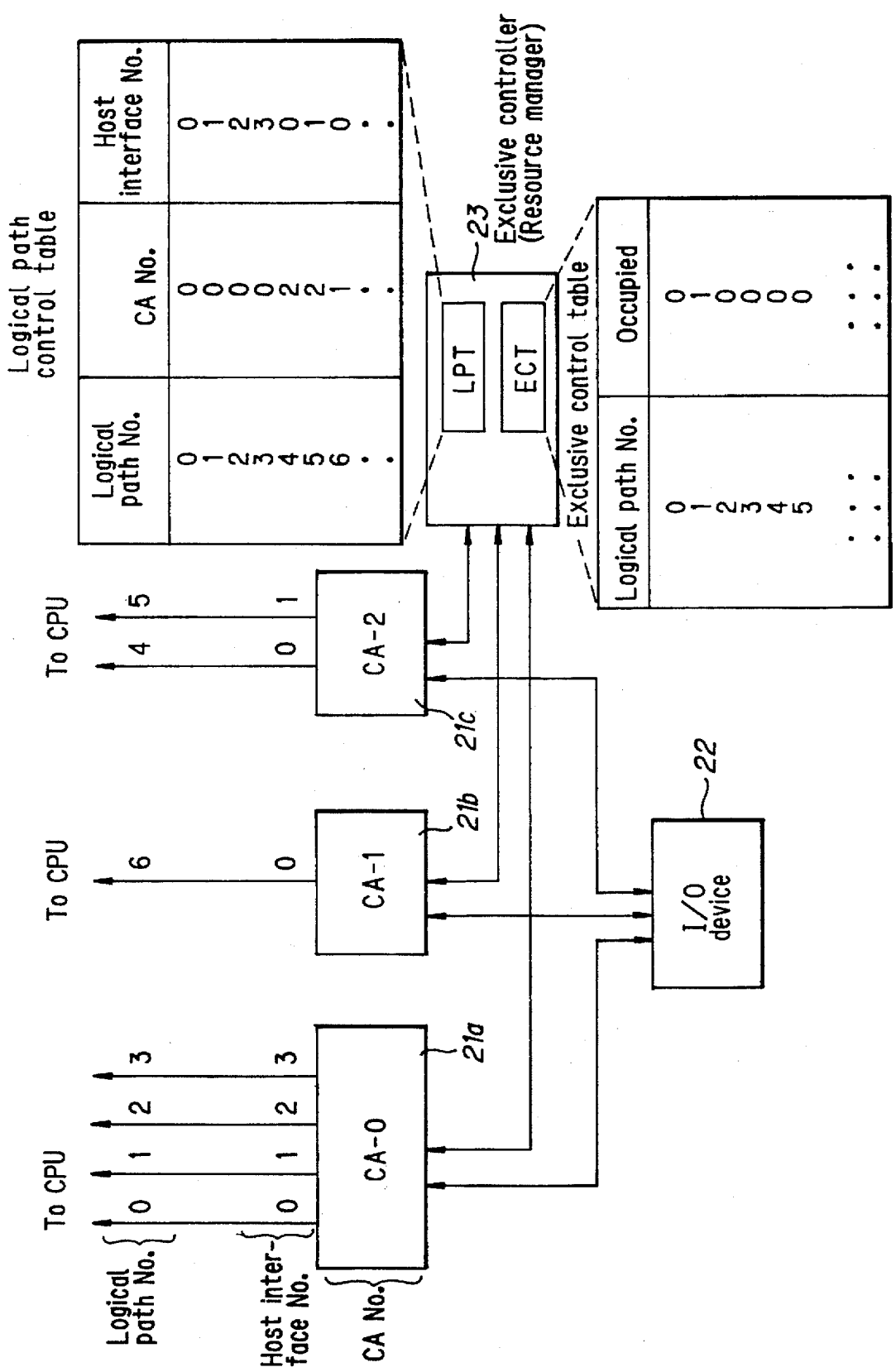
FIG. 9 is a first schematic explanatory view of the present invention.

(a-1) Exclusive control (FIG. 9)

Referring to FIG. 9, the reference numerals 21a to 21c represent a plurality of input/output interface portions (channel adapters) each having a single or a plurality of interfaces (host interfaces) between a host apparatus and the interface portion, 22 an I/O device (semiconductor memory) used by the plurality of interface portions 21a to 21c in common, and 23 an exclusive controller (resource manager) which is provided with an exclusive control table ECT and a logical path control table LPT and which permits a host interface to use an I/O device when it is not used by any other host interface while prohibiting the use when another host interface is using it.

The exclusive controller 23 allots a logical path number to each of the host interfaces of each of the input/output interface portions 21a to 21c, manages the state of using the I/O device in correspondence with the logical path number in the exclusive control table ECT and judges whether or not the I/O device 22 is being used by another host interface through another logical path by reference to the exclusive control table ECT when the exclusive controller 23 receives the request for use of the I/O device 22 through a host interface having a predetermined logical path number allotted thereto. If the answer is NO, the exclusive controller 23 permits the host interface which has requested access to use the I/O device 22, and sets a flag indicating that the I/O device is "Occupied" in the exclusive control table ECT in correspondence with the logical path number of the host interface. When the use of the I/O device 22 is finished, the exclusive controller 23 changes the flag to a flag indicating that the I/O device is "Vacant".

In this case, one host interface may correspond to one physical interface, but when a plurality of logical interfaces are defined on one physical interface, one host interface corresponds to one logical interface. That is, when at least two interfaces are defined on one physical interface, a logical path number is allotted to each logical interface as a host interface. Further, when a plurality of I/O machine numbers are allotted to a single I/O device and the operating systems on one host apparatus are simultaneously accessible to the I/O device via a physical interface by using the respective I/O machine numbers, a host interface number is allotted to the physical interface in accordance with each of the I/O device numbers, and a logical path number is allotted to each of the host interfaces (host interface numbers).

According to this structure, it is not necessary to stationarily prepare a large exclusive control table which can cope with the maximum structure unlike in a conventional I/O subsystem. In other words, an exclusive control table suffices in which only the host interfaces actually connected to the I/O subsystem are listed. It is therefore possible to reduce the size of the exclusive control table and the storage capacity for the table.

The allotment of logical path numbers is controlled in the following manner. A logical path control table LPT is provided in the exclusive controller 23. When the power source is turned on or logical interfaces are defined, each of the input/output interface portions 21a to 21c requests the exclusive controller 23 to allot a logical path number to all the host interfaces which are connected thereto. The exclusive controller 23 dynamically allots a vacant logical path number to a host interface in response to the request for allotment of a logical path number and registers the allotted logical path number in the logical path control table LPT in correspondence with the identification information (CA number) of input/output interface portion and the identification information (host interface number) of the host interface.

The exclusive controller 23 also stores the logical path control table LPT in a non-volatile memory which does not lose the contents even at the time of power failure, and allots a logical path number either on the basis of the logical path control table LPT stored in the non-volatile memory or on the basis of the above mentioned dynamic allotment of the logical path number in accordance with the on/off of an instructing means (switch). According to this structure, since it is possible to reproduce the allotment of a logical path number before the power failure, the same environment is reproduced at the time of analysis of a trouble or a reproducing test of the trouble.

Figure 10:
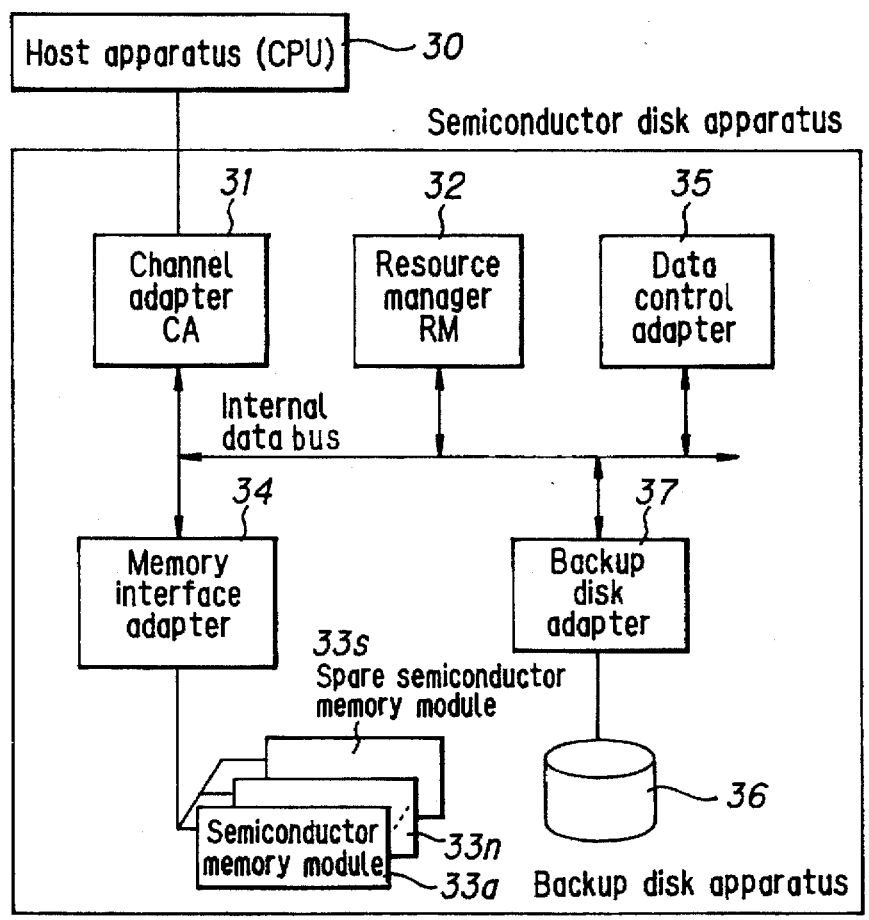
FIG. 10 is a second schematic explanatory view of the present invention.

(a-2) Data storage control (FIG. 10)

Referring to FIG. 10, the reference numeral 31 represents a channel adapter for controlling the data input/outputting operation between a host apparatus (CPU) 30 and a memory interface adapter, an exclusive controller 32 (resource manager) for executing exclusive control over the access to a semiconductor memory module, semiconductor memory modules 33a to 33n each composed of a plurality of semiconductor memory chips, a memory interface adapter 34 for controlling the operation of writing and reading data to and from a semiconductor memory module, a data control adapter 35 for verifying the compressed data written in a semiconductor memory module, a backup disk apparatus 36 and a backup disk adapter 37.

When data is stored in one of the semiconductor memory modules 33a to 33n (hereinafter referred to as "the semiconductor memory module 33") in the I/O subsystem, the channel adapter 31 compresses the data stored in the data buffer provided therein and writes the compressed data in the semiconductor memory module 33. The data control adapter 35 reads and restores the compressed data from the semiconductor memory module 33 so as to verify the compressed data written in the semiconductor memory module 33 by comparing the restored data with the data (uncompressed data) before compression. In this case, after the compressed data is written in the semiconductor memory module 33, the uncompressed data stored in the data buffer is written in a spare semiconductor memory module 33s, and the uncompressed data is read out of the spare semiconductor memory module 33s so as to be compared with the restored data.

When an abnormality is detected as a result of the data comparison, the data control adapter 35 compresses the data read out of the spare semiconductor memory module 33s and writes the compressed data into the semiconductor memory module 33. Thereafter, the compressed data is restored and the restored data is compared with the uncompressed data so as to verify the compressed data written in the semiconductor memory module 33. The result of the verification is recorded at the directory portion at the head of the track of the semiconductor memory module 33.

When the semiconductor memory module becomes full during the operation of writing compressed data, the uncompressed data is stored in the backup disk apparatus 36, and thereafter the uncompressed data is written into the semiconductor memory module from the backup disk apparatus 36.

In this way, the problems caused when data is compressed are solved. As a result, it is possible to store substantially a large amount of data in a semiconductor memory by writing compressed data.

Figure 11:
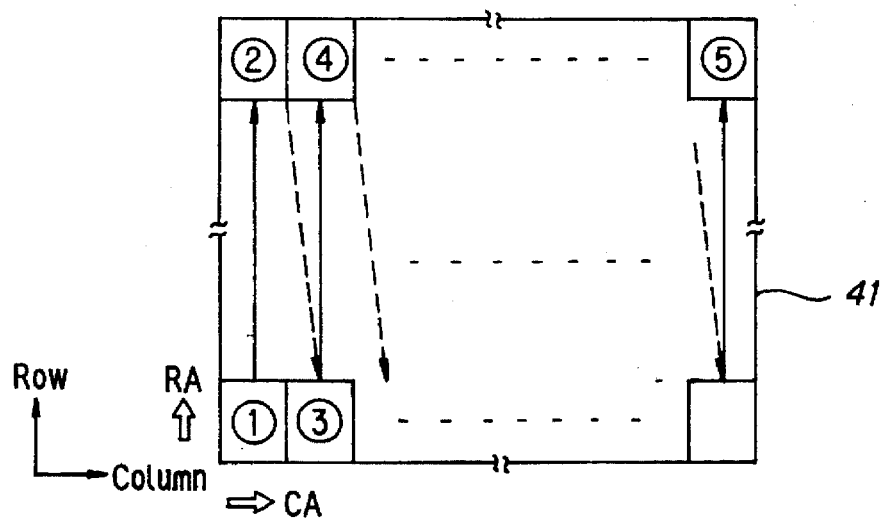
FIG. 11 is a third schematic explanatory view of the present invention.

(a-3) Initialization (FIG. 11)

In FIG. 11, the reference numeral 41 denotes a volatile memory which requires refreshing and the symbol CA denotes a column address and RA a row address.

The volatile memory 41 is accessed by the combination of the designated column address CA and the designated row address RA and it is refreshed for each row. In order to initialize the volatile memory 41, initialization data is written in all memory cells (① to ②) on an i-th column while consecutively producing the row addresses RA in an ascending order with the column address CA fixed at a constant value i. The initialization data is then written in the same way on the subsequent column (at the row addresses ③ to ④). In this way, since the operation of writing the initialization data simultaneously refreshes the memory, when the time required for writing the data on one column is shorter than the interval between refreshing operations, separate refreshing operation is not necessary, which leads to a reduction of the initialization time. In the case of a high-speed memory, the column address CA is divided into an upper column address and a lower column address, the initialization data is written in the memory cells while consecutively producing the lower column addresses in an ascending order with the upper column address and the row address fixed. The initialization data is then written in the same way on the subsequent row. In this way, after the initialization data is written on all rows, the data writing operation is repeated while serially advancing the upper column address one by one. This process also obviates a separate refreshing operation, thereby reducing the initialization time.

Figure 12:
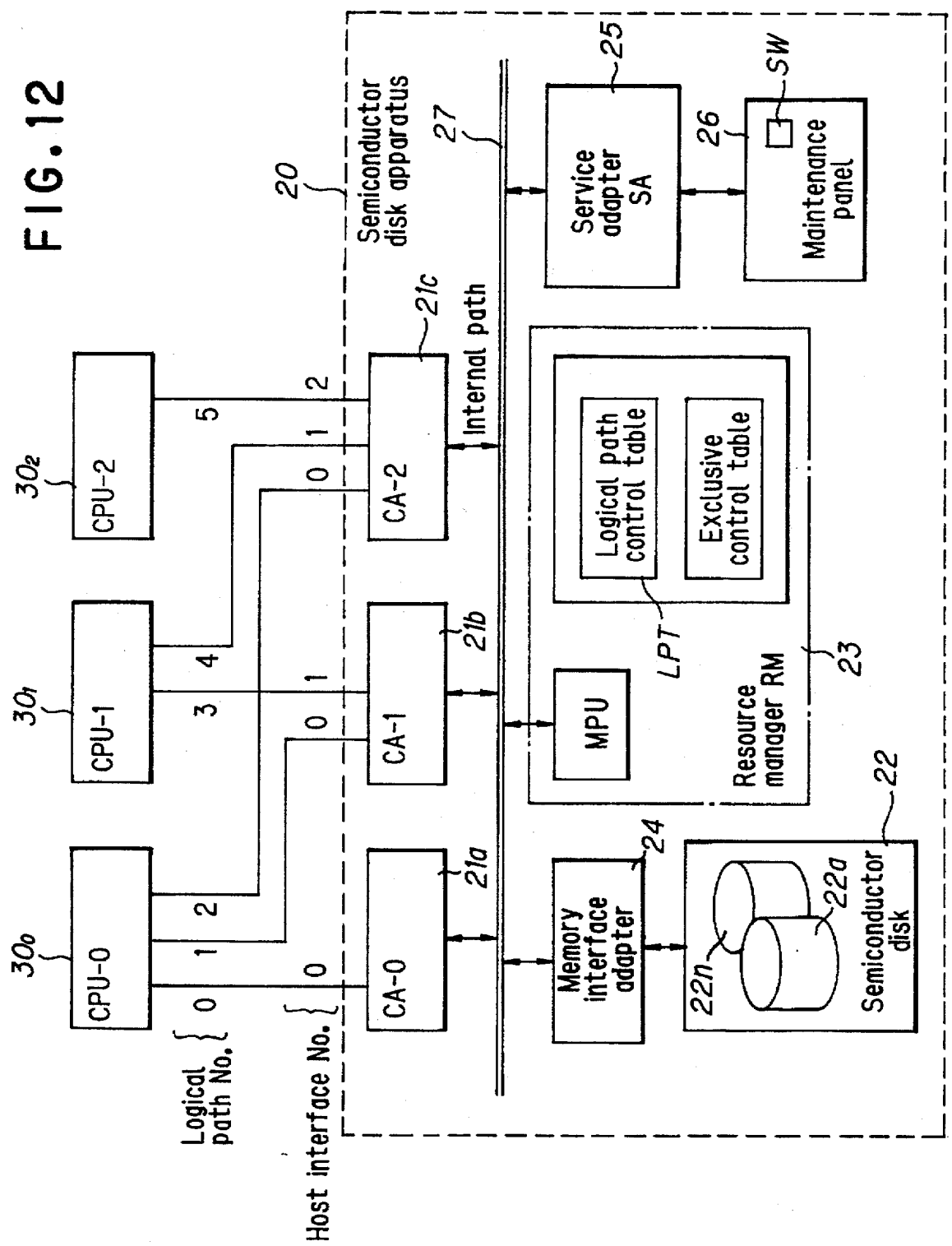
FIG. 12 shows the structure of an embodiment of an exclusive control method according to the present invention.

(b) Embodiment of exclusive control method of the invention (b-1) Entire structure FIG. 12 shows the structure of an embodiment of an exclusive control method according to the present invention. The reference numeral 20 represents a semiconductor disk apparatus as an I/O subsystem, and $30_0$, $30_1$ and $30_2$ represent CPUs (CPU-0 to CPU-2) as host apparatuses. In the semiconductor disk apparatus 20, the reference numerals 21a, 21b and 21c represent channel adapters (CA-0 to CA-2) each of which has a single or a plurality of interfaces (host interfaces) to and from a host apparatus (CPU), 22 a semiconductor disk provided with a plurality of semiconductor memory modules 22a to 22n, each of which serves as an I/O device for the CPUs $30_0$ to $30_2$. The reference numeral 23 represents a resource manager (RM) which is provided with an exclusive control table ECT and a logical path control table LPT so as to execute processing such as logical path control and exclusive control. The exclusive control table ECT and a logical path control table LPT are stored in a non-volatile storage region. The logical path control is processing for adding a logical path number to a host interface connected to each adapter and controlling the path between the CPUs and the semiconductor disk, and the exclusive control is processing for permitting a host interface to use a semiconductor memory when it is not used by any other host interface while prohibiting the use when another host interface is using it. Exclusive control is conducted for each semiconductor memory module.

The reference numeral 24 represents a memory interface adapter for controlling the operation of writing and reading data to and from the semiconductor disk 22, 25 a service adapter (SA) for executing processing such as maintenance and module monitoring, and 26 a maintenance panel which is provided with a switch SW for instructing the method of allotting a logical path number. As a method of allotting a logical path number, there are two methods: ① a method (referred to as unfixed logical path number mode) of allotting a vacant logical path number when a request for allotment of a logical path number is supplied from one of the channel adapters 21a to 21c, and ② a method (referred to as fixed logical path number mode) of allotting a logical path number on the basis of the logical path control table stored in the non-volatile storage region before power failure. When the switch SW is off, a logical path number is allotted by the unfixed logical path number mode and when the switch SW is on, a logical path number is allotted by the fixed logical path number mode.

The reference numeral 27 represents an internal bus provided with C-BUS, D-BUS and S-BUS (not shown). The C-BUS is a control bus through which each unit communicates a message and accesses control information, the D-BUS is a data transfer bus thorough which each unit supplies and receives data to and from the semiconductor disk 22, and the S-BUS is a service bus through which a service module 25 as a master controls the state of each unit.

The channel adapter 21a is provided with one physical interface (physical port) 0, the channel adapter 21b is provided with two physical interfaces 0, 1, and the channel adapter 21c is provided with three physical interfaces 0, 1, 2. The physical interface 0 of the channel adapter 21a also constitutes the interface of the CPU $30_0$, the physical interfaces 0, 1 of the channel adapter 21b also constitute the interfaces of the CPUs $30_0$, $30_1$, respectively, and the physical interfaces 0, 1, 2 of the channel adapter 21c also constitute the interfaces of the CPUs $30_0$, $30_1$, $30_2$, respectively.

Figure 13:
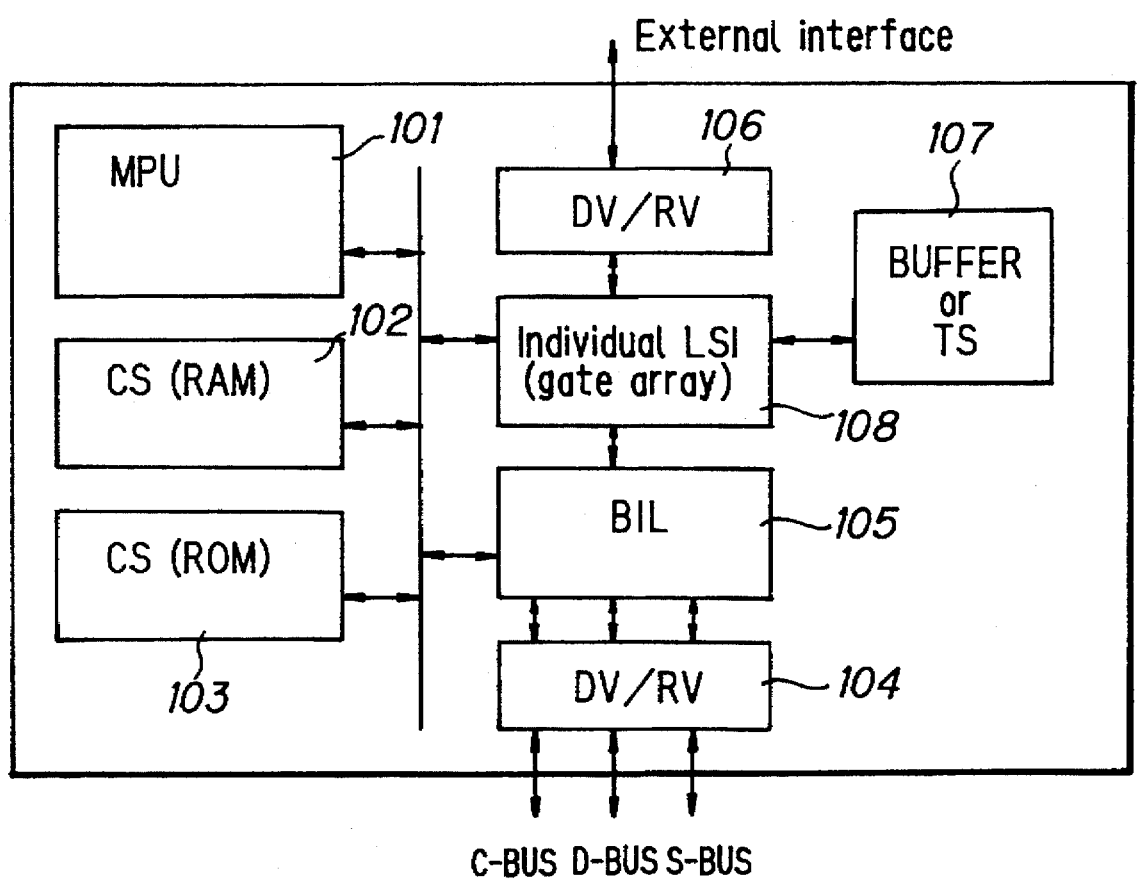
FIG. 13 shows the structure of the hardware of each unit in the embodiment shown in FIG. 12.

Each of the channel adapters 21a to 21c, the resource manager 23, the memory interface adapter 24 and the service adapter 25 is composed of a microprocessor which has substantially the same structure as that shown in FIG. 13. In FIG. 13, the reference numeral 101 represents a microprocessor (MPU), 102 a control storage portion (CS) having a RAM structure, 103 a control storage portion (CS) having a ROM structure, 104 a driver/receiver (DV/RV) connected to the internal bus 27, 105 a bus interface logic (BIL), 106 a driver/receiver (DV/RV) connected to an external interface, 107 a buffer or a table storage portion (TS), and 108 an individual LSI (gate array). The number of driver/receivers (DV/RV) 106 depends upon the number of external interfaces connected thereto.

(b-2) Logical path control table

Figure 14:
FIG. 14 is an explanatory view of a logical path control table in the embodiment shown in FIG. 12.

The logical path control table LPT stores a logical path number, a channel adapter number (CA number) and a host interface number in correspondence with each other, as shown in FIG. 14. If no logical interface is defined on a physical interface, one host interface corresponds to one physical interface (physical port). On the other hand, if a plurality of logical interfaces are defined on a physical interface, one host interface corresponds to one logical interface.

The logical path control table LPT is produced in the following way in case of the unfixed logical path number mode. When the power switch is turned on, each of the channel adapters 21a to 21c requires the resource manager 23 to allot a logical path number to each host interface which is connected to the corresponding channel adapter. The resource manager 23 allots a vacant logical path number to a host interface in response to the request for allotment, and registers the channel adapter number (CA number) and the host interface number in the logical path control table LPT in correspondence with the logical path number. By conducting this registering operation with respect to all channel adapters, the logical path control table LPT is produced. In FIG. 14, the logical path number 0 is allotted to the host interface 0 of the channel adapter 21a, the logical path number 1 is allotted to the host interface 0 of the channel adapter 21b, the logical path number 2 is allotted to the host interface 1 of the channel adapter 21b, . . . . . (The same rule applies correspondingly to the following.)

If a host interface of a channel adapter is added due to attachment of an option after the allotment of logical path numbers, the channel adapter requires the resource manager 23 to allot a logical number to the host interface added. The resource manager 23 then allots a vacant logical path number to the host interface in the same way and registers the channel adapter number (CA number) and the host interface number in the logical path control table LPT in correspondence with the logical path number. . . . additional dynamic allotment When a predetermined host interface of a channel adapter is eliminated or a channel adapter itself is removed from the I/O subsystem (for the purpose of repairing a part), the resource manager 23 eliminates the logical path number(s) allotted to the corresponding host interface(s). . . . dynamic elimination In this method of allotting logical path numbers, a logical path number is allotted as occasion demands, for example, when the I/O subsystem is started or when an option is attached. For this reason, the logical path numbers themselves may vary in accordance with the order of turning on the power switches in the CPU or the I/O subsystem. This is no problem in an ordinary state, but when a trouble is caused, it is difficult to reproduce the same environment for the analysis of a trouble or a reproducing test of the trouble. As a countermeasure, a non-volatile region is provided so as to store the logical path control table LPT. In addition, the switch SW which can be externally operated by a maintenance man or the like is provided on the maintenance panel 26, as described above.

When the switch SW is off, every time a request of allotment of a logical path number is supplied from a channel adapter, a new logical path number is allotted, as described above (dynamic allotment). On the other hand, when the switch SW is on, the same logical path number as that indicated by the table information stored in the non-volatile region is allotted. The switch SW is turned on when the maintenance man stationarily allots a logical path number. . . . fixed logical path number mode

(b-3) Exclusion control table

The exclusive control table ECT stores the occupation data indicating whether or not an I/O device (semiconductor memory module) is in use, the reservation data indicating whether or not an I/O device (semiconductor memory module) is reserved, path group information (path name), etc. in correspondence with a logical path number, as shown in FIG. 15. The exclusive control table ECT is provided for each semiconductor memory module.

When a host interface is using a semiconductor memory module 33, a flag "1" is set at the column of the occupation data on the row of the logical path number of the host interface. When the use of the semiconductor memory module 33 is finished, the flag "1" is returned to "0". When a host interface issues a reserve command so as to exclusively use a predetermined semiconductor memory module 33, a flag "1" is set at the column of the reservation data in the row of the logical path number of the host interface. When the reserve command is released, the flag "1" is returned to "0". Even if another host interface supplies a request for access to the semiconductor memory module 33, the response is "Busy" while the flag "1" is set at the column of reservation data.

(b-4) Allotment of logical path number

FIG. 16 is an explanatory view of the allotment of a logical path when one host interface corresponds to one physical interface. The physical interfaces mounted on each of the channel adapters 21a to 21c serve as host interfaces, and the logical path control table LPT such as that shown in FIG. 17 is produced by logical path number allotment control.

Figures 18A, 18B:
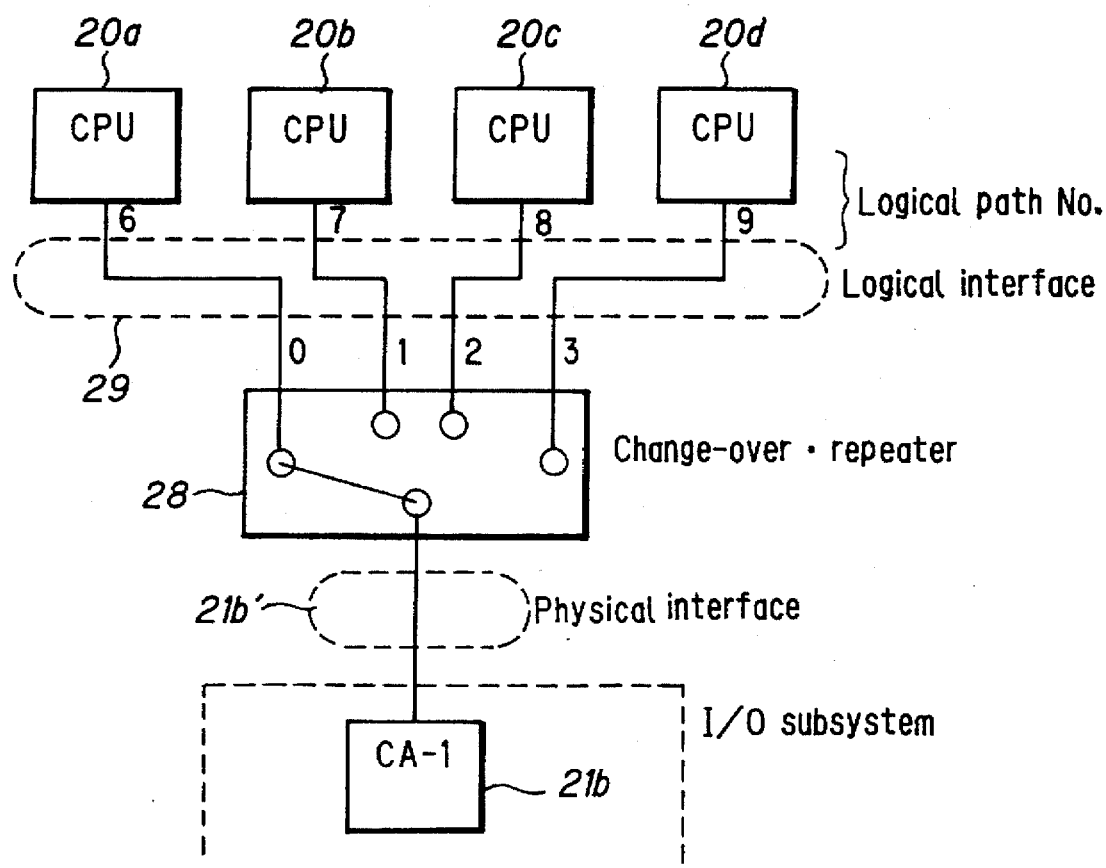
FIGS. 18A and 18B are explanatory views of the allotment of a logical path when one host interface corresponds to one logical interface in the embodiment.

FIGS. 18A and 18B are explanatory views of the allotment of a logical path when one host interface corresponds to one logical interface. The channel adapter 21b is an adapter for OC link, and one physical interface 21b' is connected to four CPUs 20a to 20d through a changeover/repeater 28. In other words, four interfaces 29 are defined on the one physical interface 21b'. In such a case, one host interface corresponds to one logical interface, and a logical path number is allotted to each of the host interfaces (0 to 3). If it is assumed that the channel adapter 21b shown in FIG. 16 and each CPU is connected as shown in FIG. 18A, the logical path control table LPT such as that as shown in FIG. 18B is produced by logical path number allotment control.

Figures 19A, 19B, 19C:
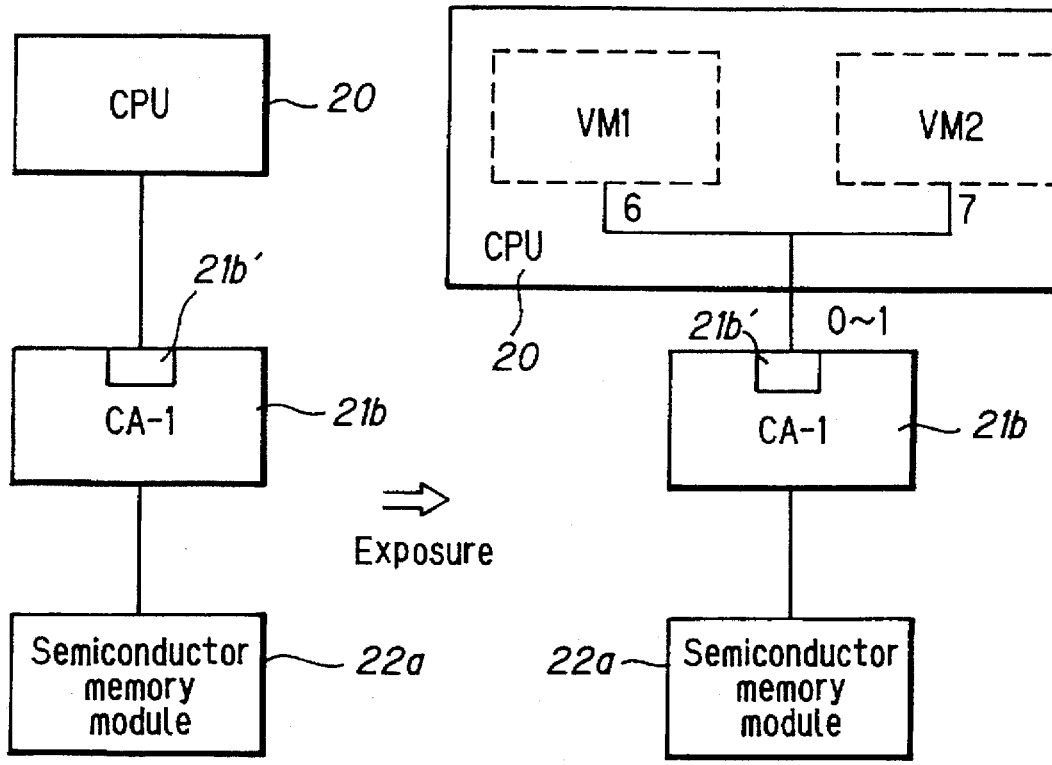
FIGS. 19A to 19C are explanatory views of logical path number allotment control in an exposure system.

FIGS. 19A to 19C are explanatory views of logical path number allotment control in an exposure system. When the CPU 20 is connected to the channel adapter 21b through one physical interface 21b' (see FIG. 19A), two machine addresses are set on the semiconductor memory module 22a by an exposure. Owing to the exposure, the one CPU 20 serves as if it were two virtual computers VM1, VM2, so that each of the virtual computers VM1, VM2 can supply a request for access to the semiconductor memory module 22a through the one physical interface 21b'. This means that two logical interfaces are defined on the one physical interface 21b' (see FIG. 19B). Since one host interface corresponds to one logical interface, a logical path number is allotted to each of the host interfaces (0 and 1). Therefore, if the CPU which is connected to the physical interface of the channel adapter 21b in FIG. 16 sets two exposures, the logical path control table LPT shown in FIG. 19C is produced.

(b-5) Logical path number allotment control

Figure 20:
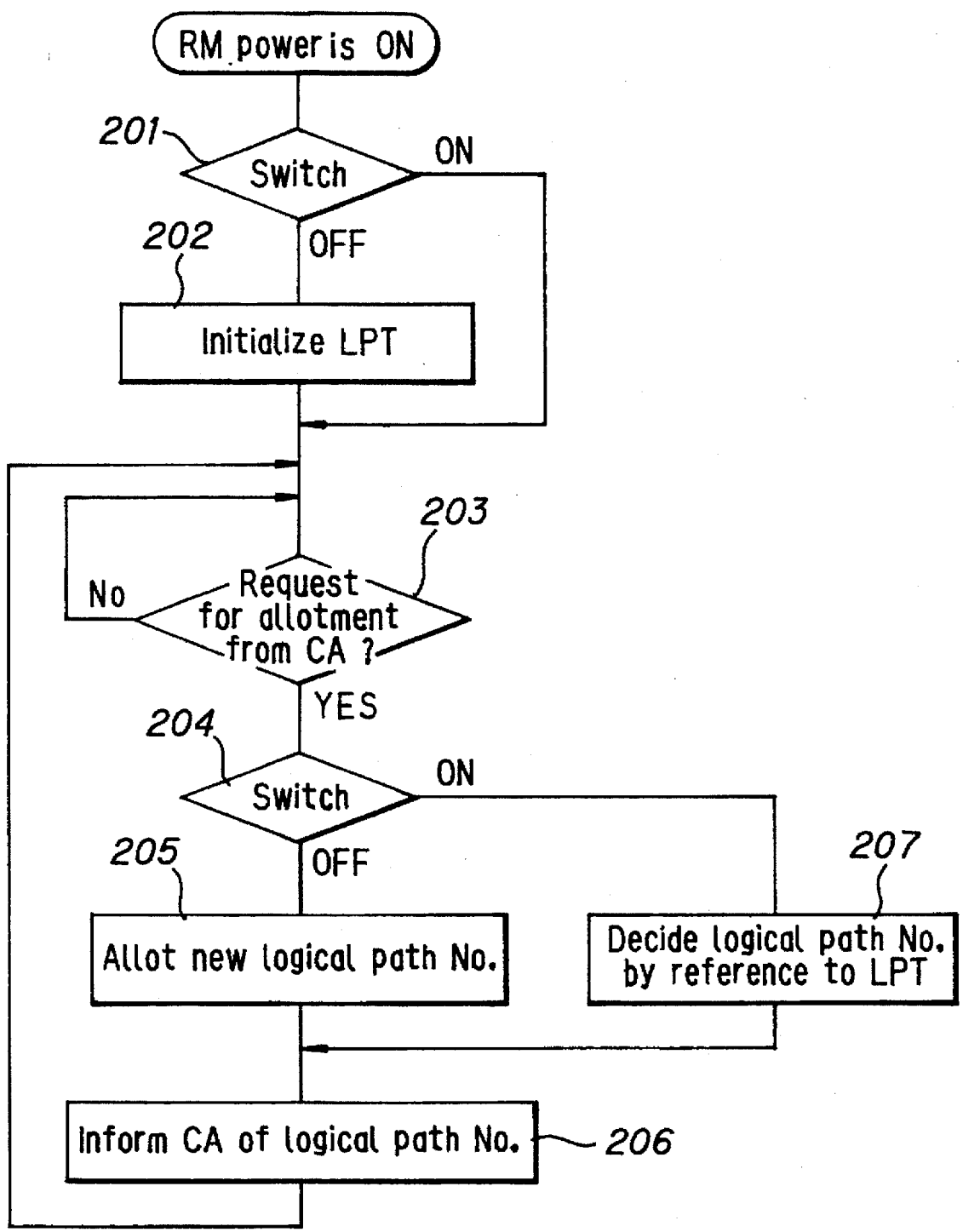
FIG. 20 is a flowchart of the processing by the resource manager in logical path number allotment control.

FIG. 20 is a flowchart of the processing by the resource manager 23 in logical path number allotment control.

When the power source of the resource manager 23 is turned on, a function program is started so as to judge whether the switch SW is ON or OFF after initial diagnosis (Step 201). If the switch SW is OFF, the contents of the logical path control table LPT are initialized (Step 202), while if the switch SW is ON, they are not initialized.

Whether or not a request for allotment of a logical path number (allotment request command+CA number+host interface number) is issued from a channel adapter is judged (Step 203), and if the answer is in the affirmative, it is judged whether the switch SW is ON or OFF (Step 204). If the switch SW is OFF, a new logical path number is dynamically allotted, and the logical path number is registered in the logical path control table LPT in correspondence with the CA number and the host interface number (Step 205). After registration, the channel adapter which has supplied the request for allotment is informed of the logical path number (Step 206), and the process returns to the step 203 so as to repeat the subsequent processing.

If the switch SW is ON at the step 204, the logical path number is retrieved from the logical path control table LPT on the basis of the CA number and the host interface number contained in the request for allotment (Step 207). The channel adapter which has supplied the request for allotment is then informed of the retrieved logical path number (Step 206), and the process returns to the step 203 so as to repeat the subsequent processing.

The logical path numbers are serial numbers which are allotted to all host interfaces in the I/O subsystem.

Figure 21:
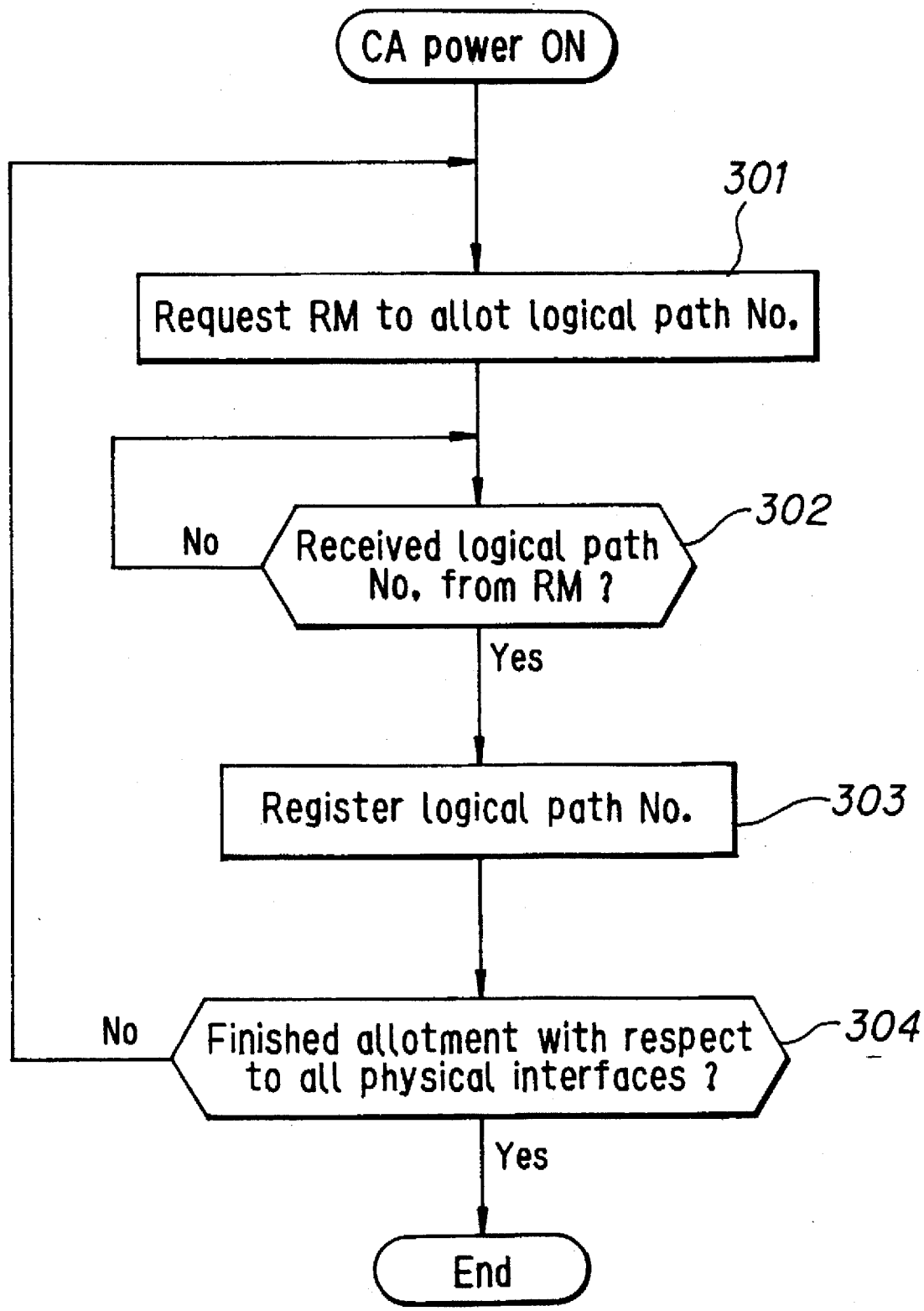
FIG. 21 is a first flowchart of the processing by a channel adapter in logical path number allotment control.

FIG. 21 is a flowchart of the processing by each of the channel adapters 21a to 21c in logical path allotment control. When the power source is turned on, a logical path number of the host interface which corresponds to one physical interface, or the logical path number of the host interface which is allotted by an exposure is registered.

When the power source of a predetermined channel adapter is turned on, a function program is started after initial diagnosis. The channel adapter counts and confirms the number of host interfaces which are connected thereto, and requests the resource manager 23 to allot a logical path number to an i-th host interface (Step 301). The request for allotment is composed of an allotment request command, a CA number and an interface number.

It is then judged whether or not the resource manager 23 has informed the channel adapter of the logical path number (Step 302), and if the answer is YES, the channel adapter registers the logical path number received from the resource manager 23 in the logical path control table in correspondence with the host interface number (Step 303, see FIG. 22A). After registration, judgement is made as to whether or not allotment of a logical path number has been completed with respect to all host interfaces (Step 304), and if the answer is NO, the processing at the step 301 and thereafter is repeated with respect to the (i+1)-th host interface. In this way, the logical path numbers of all host interfaces are registered.

Figure 23:
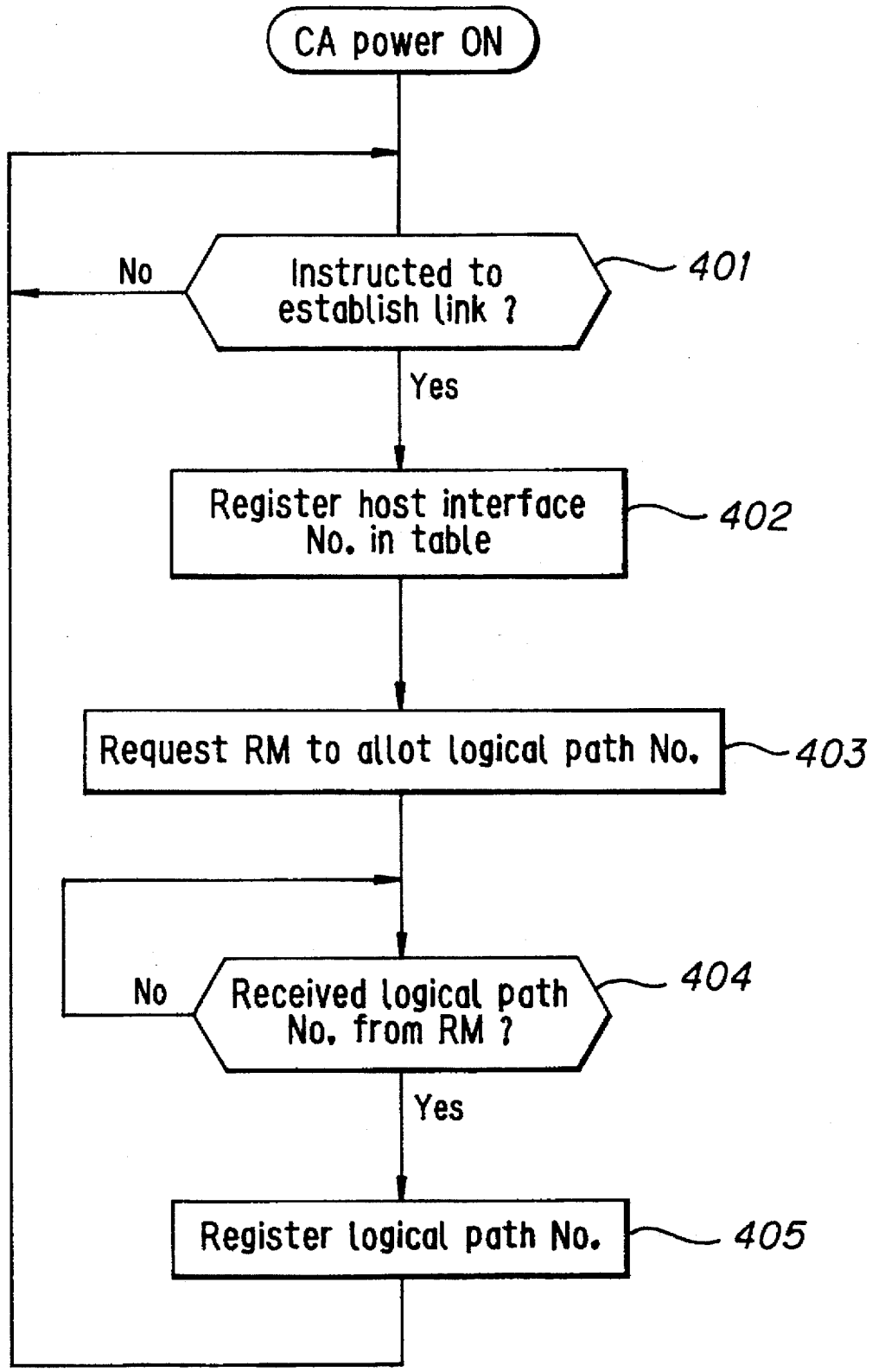
FIG. 23 is a second flowchart of the processing by a channel adapter in logical path number allotment control

In the case of OC link, logical interfaces are dynamically defined during the operation of the system. FIG. 23 is a flowchart of the processing by a channel adapter in logical path number allotment control in this case.

A channel adapter for OC link judges whether or not a CPU has instructed it to establish link (Step 401). If the answer is YES, an OC link number is registered in correspondence with the host interface number (Step 402, see FIG. 22B). The channel adapter then requests the resource manager to allot a logical path number to the host interface (Step 403).

Thereafter, it is judged whether or not the resource manager 23 has informed the channel adapter of the logical path number (Step 404), and if the answer is YES, the channel adapter registers the logical path number received from the resource manager 23 in the logical path control table in correspondence with the host interface number and the OC link number (Step 405), as shown in FIG. 22B. The process returns to the step 401 so as to repeat the subsequent processing.

(b-6) Exclusive control

Figure 24:
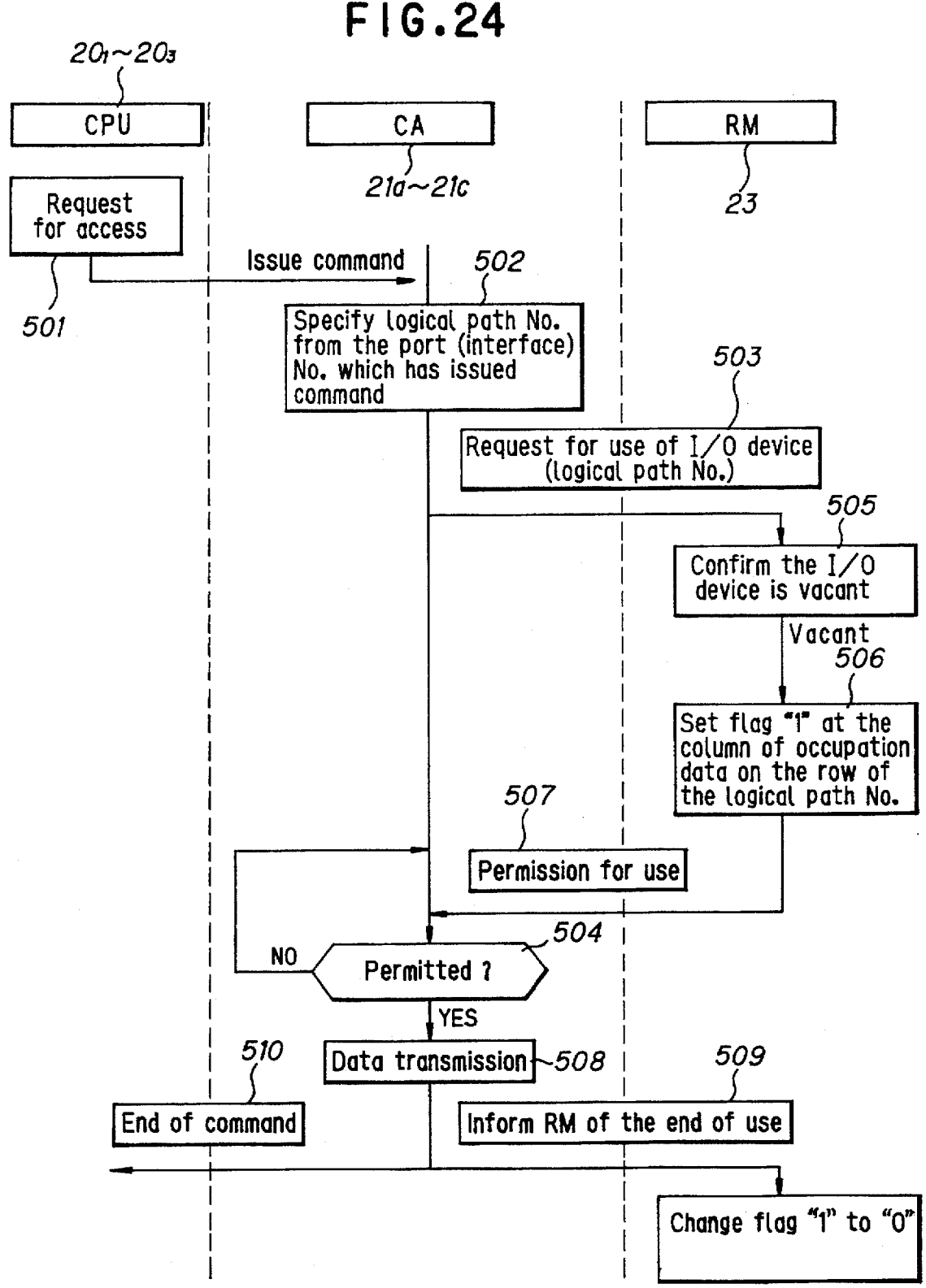
FIG. 24 is a flowchart of exclusive control.

FIG. 24 is a flowchart of exclusive control.

When a request for access (read/write command) is supplied from a predetermined CPU to a predetermined channel adapter through a host interface (Step 501), the channel adapter specifies the physical interface and the logical interface which have issued the request, recognizes the host interface number and obtains the logical path number from the logical path control table on the basis of the host interface number (Step 502). The request for use of the I/O device (semiconductor memory module) with the logical path number attached thereto is transmitted to the resource manager 23 (Step 503) and waits for the permission from the resource manager 23 (Step 504). When the resource manager 23 receives the request for use of the I/O device, it judges whether or not the semiconductor memory module is occupied or reserved by another logical path (host interface) by reference to the exclusive control table ECT (Step 505). If it is neither occupied nor reserved, a flag "1" indicating "Occupied" is set in the exclusive control table ECT in correspondence with the logical path number which is attached to the request for use (Step 506). The resource manager 23 then supplies permission to use the I/O device to the channel adapter which has transmitted the request for use (Step 507). If the semiconductor memory module is in use, the resource manager 23 answers the channel adapter in the negative ("Busy").

When the channel adapter receives the permission, data is transmitted between the CPU and the semiconductor memory module (Step 508), and when the access is finished, the channel adapter informs the resource manager 23 of the end of use (Step 509) and the CPU of the end of command (Step 510).

When the resource manager 23 is informed of the end of use, the resource manager 23 changes the flag "1" to "0" indicating "Vacant", thereby finishing the exclusive control.

(b-7) Other control

A CPU is sometimes newly added to a computer system due to an enlargement of a business scale or the like. If the new CPU uses the existing I/O subsystem, it is necessary to add an interface or a channel adapter to the I/O subsystem. After an interface/channel adapter is added, a request for allotment of a logical path number is supplied to the resource manager in the same way as when the power source is turned on, and the new logical path number is allotted and registered. The channel adapter/interface is thereafter dealt with as an object of exclusive control.

When there is a trouble in a part of the hardware and the adapter is removed from the I/O subsystem so as to be repaired, the data registered in the area in the logical path control table LPT which corresponds to the logical path number related to the channel adapter are deleted.

Such addition or elimination of a logical path number during the operation of the system exerts no influence on the operation which is conducted through an interface of another logical path number. It is therefore possible to add an option, change modules and maintain a module while continuing the operation of the I/O subsystem and the entire computer system.

In the method of allotting logical path numbers in the present invention, the logical path numbers may vary in accordance with the order of turning on the power switches in the I/O subsystem every time the power source is turned on even if the internal structure (the number of channel adapters, the number of interfaces) of the I/O subsystem is the same. This is no problem in practical operation, but when a problem in exclusive control is produced due to a trouble in a part of the hardware or a microprogram, it is necessary to analyze the problem and reproduce the problem. In such a case, it is important to produce the same environment. For this purpose, the above-described switch SW for fixing logical path numbers is turned on so as to change the mode to a fixed logical path number mode. This operation ensures the same allotment of logical path numbers. In a fixed logical path number mode, it is possible to allot a new logical path number, but in the case of eliminating a logical path number due to a trouble or the like, the logical path number is not removed from the logical path control table LPT. This is because the same logical path number is allotted to the module after it is repaired. Furthermore, a control method in which the switch SW is fixed at ON after the application form of the system is established may be adopted.

(b-8) Structure of actual semiconductor disk apparatus

Figure 25:
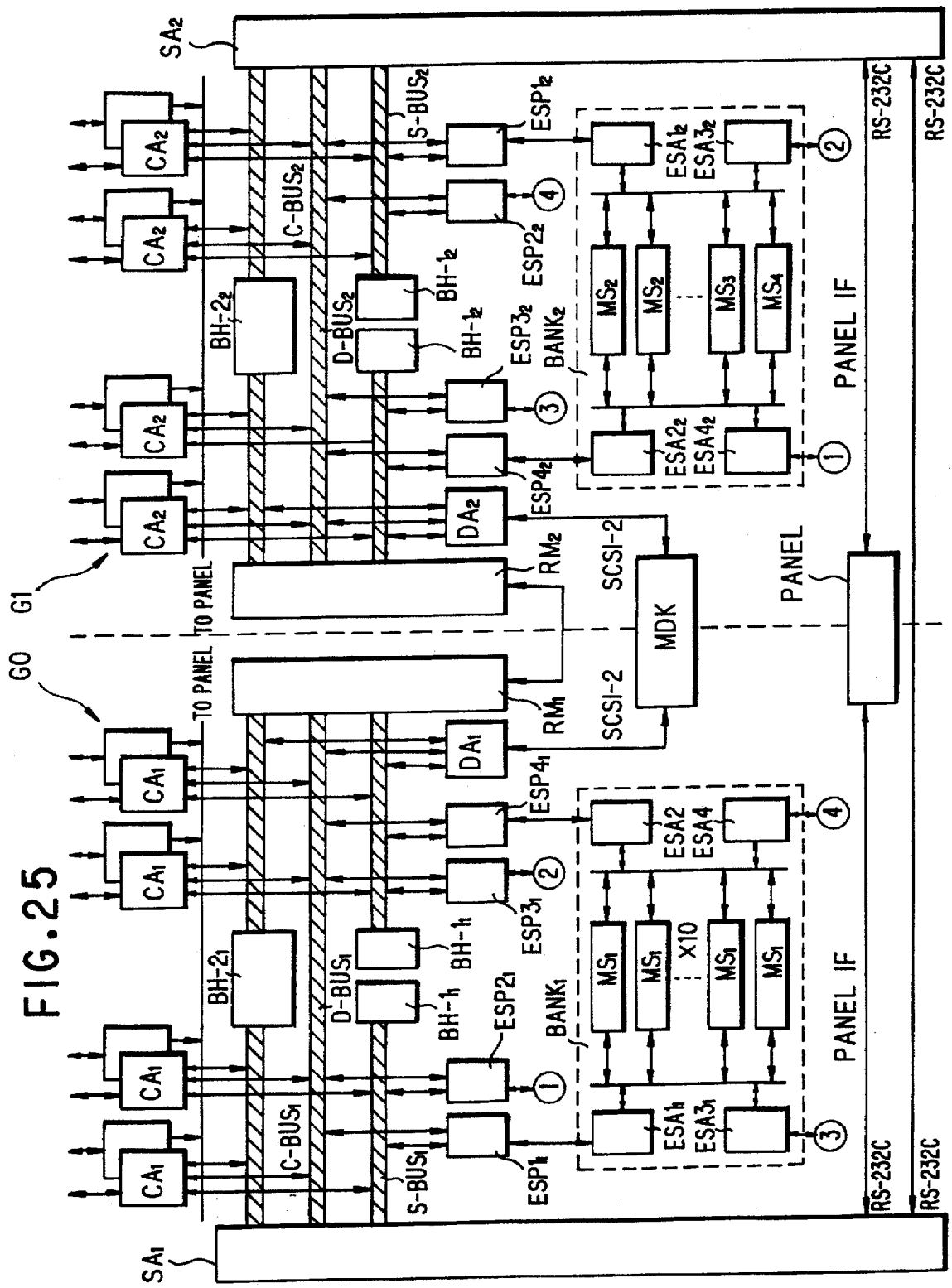
FIG. 25 shows the entire structure of an actual semiconductor disk.

FIG. 25 shows the entire structure of a semiconductor disk apparatus as the I/O subsystem. The semiconductor disk apparatus has a dual structure, wherein modules having a subscript 1 belong to a first semiconductor disk apparatus G0, modules having a subscript 2 belong to a second semiconductor disk apparatus G1, and modules having no subscript are used in common.

The symbol CA represents a channel adapter which serves as an interface to and from a host apparatus. Various channel adapters corresponding to an electric channel, an optical channel and OC link are provided as occasion demands. A resource manager RM executes logical path control and exclusive control and also manages all resources of the subsystem. A service adapter SA serves as a master which controls the states of other units.

A C-BUS is a control bus through which each unit communicates a message and accesses control information, a D-BUS is a data transfer bus thorough which each unit supplies and receives data to and from a semiconductor disk, and an S-BUS is a service bus through which a service module as a master controls the state of each unit. The symbols BH-1 and BH-2 represent bus handlers for controlling the contention of buses or distributes bus clock, MDK a magnetic disk apparatus for temporarily backs up the contents of a memory when it has a trouble, DA a device adapter which serves as an interface between the magnetic disk apparatus and the channel adapter CA, and BANK a semiconductor disk (shared memory) which can accommodate 10 semiconductor memory modules MSs at its maximum.

The symbols ESP1 to ESP4 represent ports (Extended Storage Ports) for controlling the access to the semiconductor disks, ESA1 to ESA4 memory interface adapters for executing timing control between the semiconductor memory modules MSs, memory refreshment and data correction based on an error check code, and PANEL a maintenance panel.

The first and second semiconductor disk apparatuses G0, G1 have a symmetric structure with relative to the broken center line in FIG. 25. A host CPU is symmetrically connected to the channel adapters $CA_1$ and $CA_2$ of the first and second semiconductor apparatuses, and the respective ports ESP2 and ESP3 are connected to the memory interface adapters ESA3, ESA4 on the other side. Therefore, even there is a trouble in a channel adapter on one side, the CPU can access a semiconductor disk through a channel adapter on the other side. Even if there is a trouble in a semiconductor disk on one side, it is possible to access a semiconductor disk on the other side. In this way, reliability is enhanced.

In this embodiment, an exclusive control method in a semiconductor disk apparatus as an I/O subsystem is explained, but an exclusive control method of the present invention is not limited thereto but applicable to an I/O subsystem such as a magnetic disk apparatus and disk cash.

Figure 26:
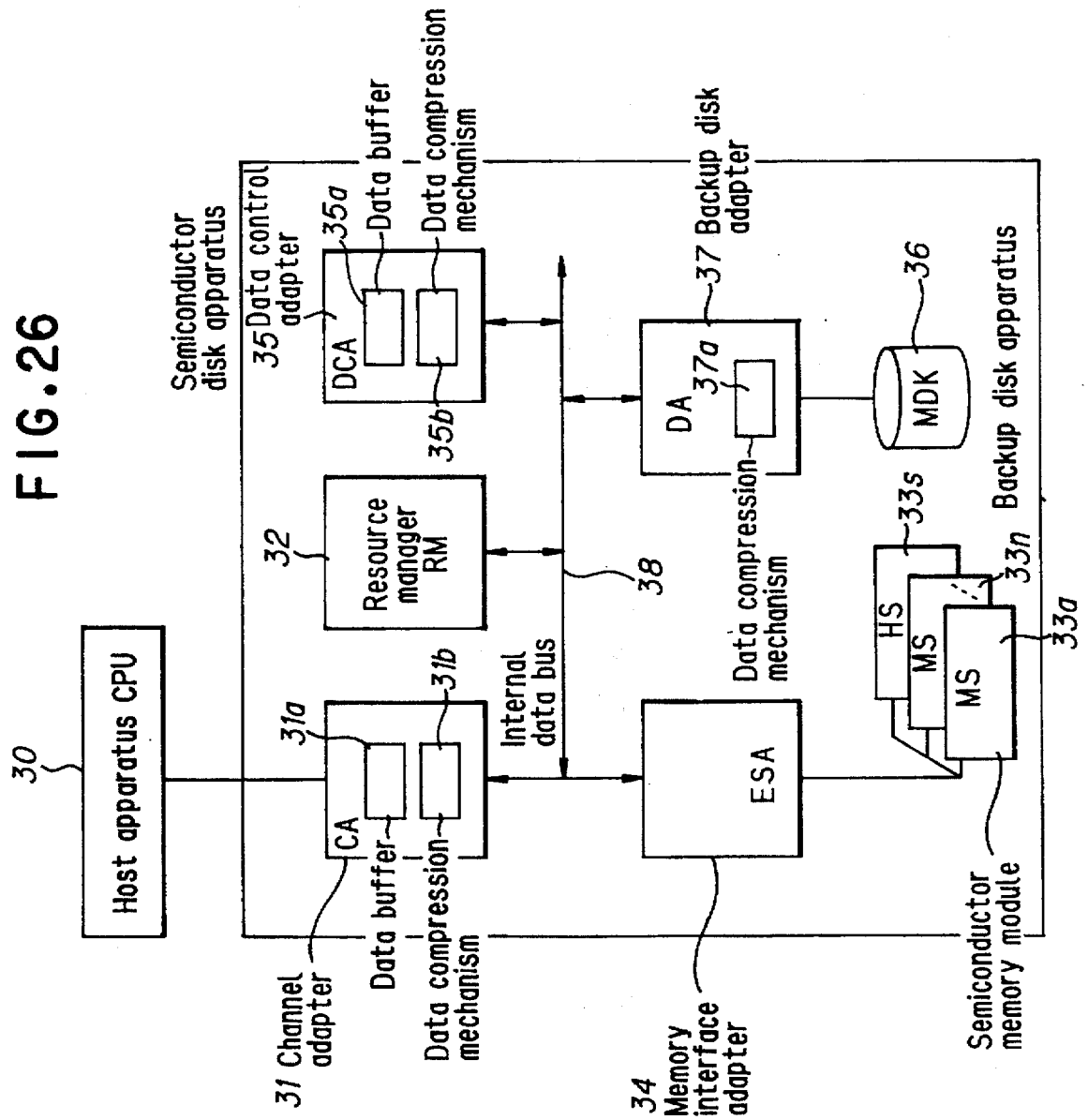
FIG. 26 shows the structure of an embodiment of a data storage control method for storing compressed data in a semiconductor memory module of a semiconductor disk apparatus according to the present invention.

(c) Embodiment of data storage control method of the invention (c-1) Entire structure FIG. 26 shows the structure of an embodiment of a data storage control method for storing compressed data in a semiconductor memory module of a semiconductor disk apparatus according to the present invention. The reference numeral 30 represents a host apparatus such as a CPU, 31 a channel adapter for controlling the data input/outputting operation between the host apparatus (CPU) 30 and a memory interface adapter ESA, 32 a resource manager for executing exclusive control over the access to a semiconductor memory module, 33a to 33n semiconductor memory modules each composed of a plurality of semiconductor memory chips, 33s a spare semiconductor memory module, 34 a memory interface adapter for controlling the operation of writing and reading data to and from a semiconductor memory module, 35 a data control adapter for verifying the compressed data written in a semiconductor memory module, 36 a backup disk apparatus, 37 a backup disk adapter and 38 an internal data bus. The channel adapter 31 and the data control adapter 35 have a large-capacity data buffer 31a and a data compression mechanism 31b, and a large-capacity data buffer 35a and a data compression mechanism 35b, respectively, and the backup disk adapter 37 has a data compression mechanism 37a.

When data is stored in one of the semiconductor memory modules 33a to 33n (hereinafter referred to as "the semiconductor memory module 33") in the I/O subsystem, the data compression mechanism 31b of the channel adapter 31 compresses the data stored in the data buffer 31a and writes the compressed data in the semiconductor memory module 33. The data before compression (uncompressed data) stored in the data buffer 31a is written in the spare semiconductor memory module 33s.

After writing these data, the data compression mechanism 35b of the data control adapter 35 reads and restores the compressed data from the semiconductor memory module 33 so as to store them in the data buffer 35a. Thereafter, the uncompressed data is read out of the spare semiconductor memory module 33s so as to verify the compressed data written in the semiconductor memory module 33 by comparing the restored data with the uncompressed data. If a request for access to the data is supplied from any channel adapter during the comparison and verification, the resource manager 32 answers, "Busy".

When an abnormality is detected as a result of the data comparison, the data control adapter 35 compresses the data read out of the spare semiconductor memory module 33s and writes the compressed data into the semiconductor memory module 33. Thereafter, the compressed data is restored and the restored data is compared with the uncompressed data so as to verify the compressed data written in the semiconductor memory module 33. The result (comparison failure flag, recovery flag, or the like) of the verification is recorded at the directory portion at the head of the track of the semiconductor memory module 33. A flag indicating whether or not the data is compressed is added to the head of each data. The directory portion contains, in addition to the result of the verification, logical address information, physical memory address information, a compression flag indicating that the data has been an object of compression, and the latest date (update information) when the data on the track is changed or written.

When the semiconductor memory module 33 becomes full during the operation of writing compressed data (for example, when the size of the compressed data is larger than the size of the uncompressed data), the channel adapter 31 stores the uncompressed data in the backup disk apparatus 36 through the backup disk adapter 37. After storage, the backup disk adapter 37 reads the uncompressed data from the backup disk apparatus 36 and writes it in the semiconductor memory module 33.

In the case of backing up the data stored in a semiconductor memory into the backup disk apparatus 36, the data is compressed by the backup disk adapter 37 and stored into the backup disk apparatus 36. When the data is read out of the backup disk apparatus 36, it is restored. In this case, the backup completion date is stored, and when the data stored in the semiconductor memory 33 is backed up again, the date contained at the directory portion is compared with the backup completion date so as not to back up the data older than the backup completion date. In this way, the backup time is shortened.

(c-2) Structure of channel adapter

Figure 27:
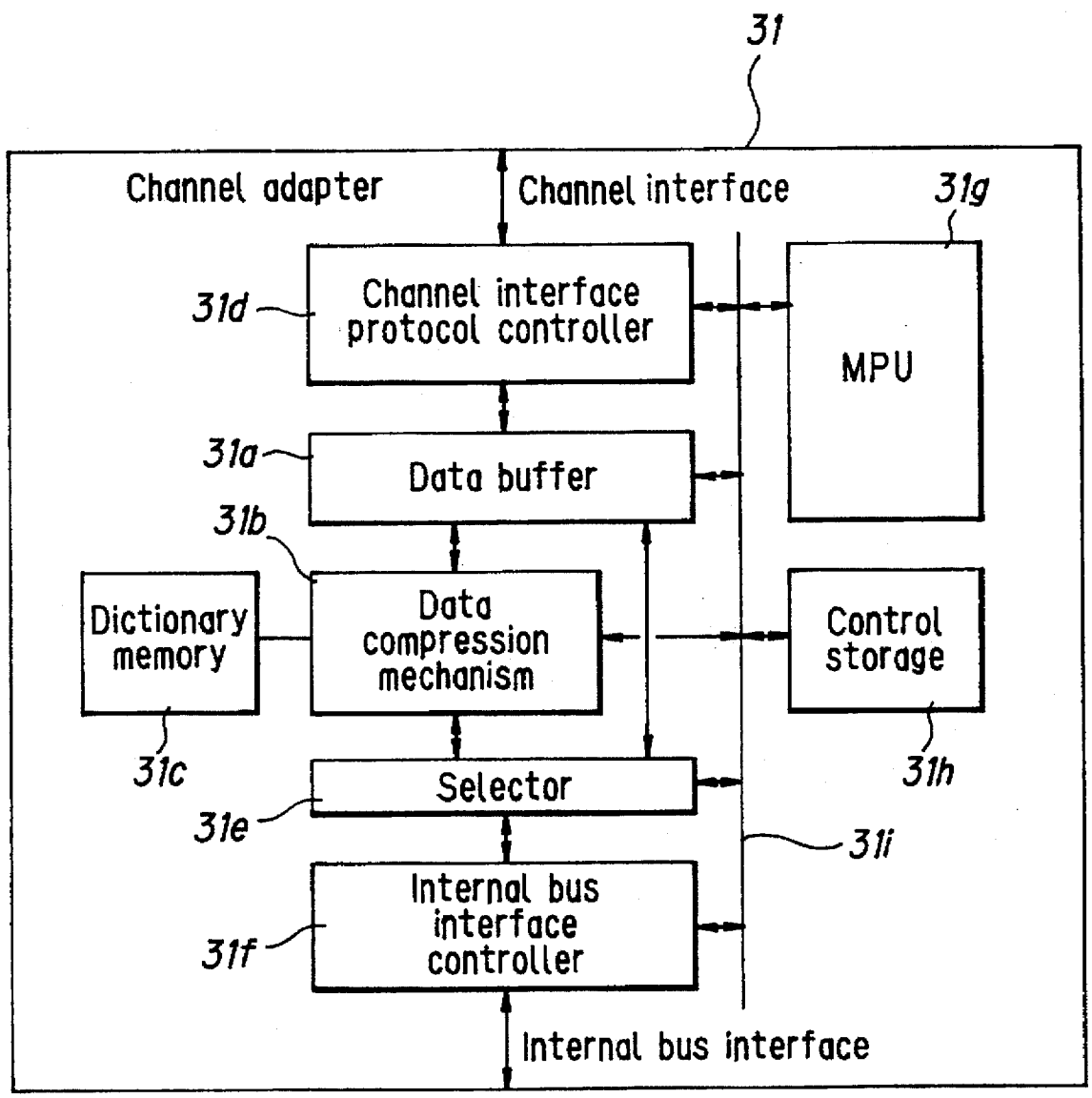
FIG. 27 shows the structure of the channel adapter in the embodiment shown in FIG. 26.

FIG. 27 shows the structure of the channel adapter 31. The channel adapter 31 accommodates the large-capacity data buffer 31a for storing transferred data, the data compression mechanism 31b for compressing/restoring the data transmitted between the channel interface and the internal bus interface, a dictionary memory 31c for assisting the compressing/restoring operation, a channel interface protocol controller 31d, a selector 31e for selectively outputting the data from the data buffer 31a and the data compression mechanism 31b and selectively inputting data into the data buffer 31a and the data compression mechanism 31b, an internal bus interface controller 31f which is connected to the internal bus 38, an MPU 31g for controlling these hardware resources by a microprogram, a control storage 31h for storing the program, and a bus 31i.

The channel interface protocol controller 31d analyzes the contents of the command which is transmitted between the channel adapter and the host apparatus and controls the transfer of data on the basis of a predetermined sequence on the interface. When the channel interface protocol controller 31d receives the data to be stored in the semiconductor memory module 33 from the host apparatus, the channel interface protocol controller 31d temporarily stores the data in the large-capacity data buffer 31a. The data compression mechanism 31b compresses the input data from the data buffer 31a. The selector 31e selects the data compressed by the data compression mechanism 31b or the original data (uncompressed data) stored in the data buffer 31a under the control of the MPU 31g, and inputs the selected data to the internal bus interface controller 31f. The internal bus interface controller 31f which has received the data from the selector 31e transmits the data to the memory interface adapter 34. At the time of writing, the data compressed by the data compression mechanism 31b is ordinarily written in the semiconductor memory module 33 through the selector 31e, the internal bus interface 31f and the memory interface adapter 34. The uncompressed data is ordinarily written in the spare semiconductor memory module 33s through the data buffer 31a, the selector 31e, the internal bus interface 31f and the memory interface adapter 34.

On the other hand, in the case of transferring the data written in the semiconductor memory module 33 to the host apparatus, the selector 31e selectively outputs the data to the data compression mechanism 31b or the data buffer 31a by reference to the identification flag written immediately before the data so as to indicate whether the data is compressed data or uncompressed data. That is, if the data which the internal bus interface controller 31f receives from the memory interface adapter 34 is compressed data, the selector 31e inputs the data to the data compression mechanism 31b, while if it is uncompressed data, the selector 31e inputs it to the data buffer 31a. The data compression mechanism 31b restores the compressed data and stores it in the data buffer 31a. The data stored in the data buffer 31a is transmitted to the channel interface protocol controller 31d and transferred to the host apparatus through the channel interface.

(c-3) Data control adapter

Figure 28:
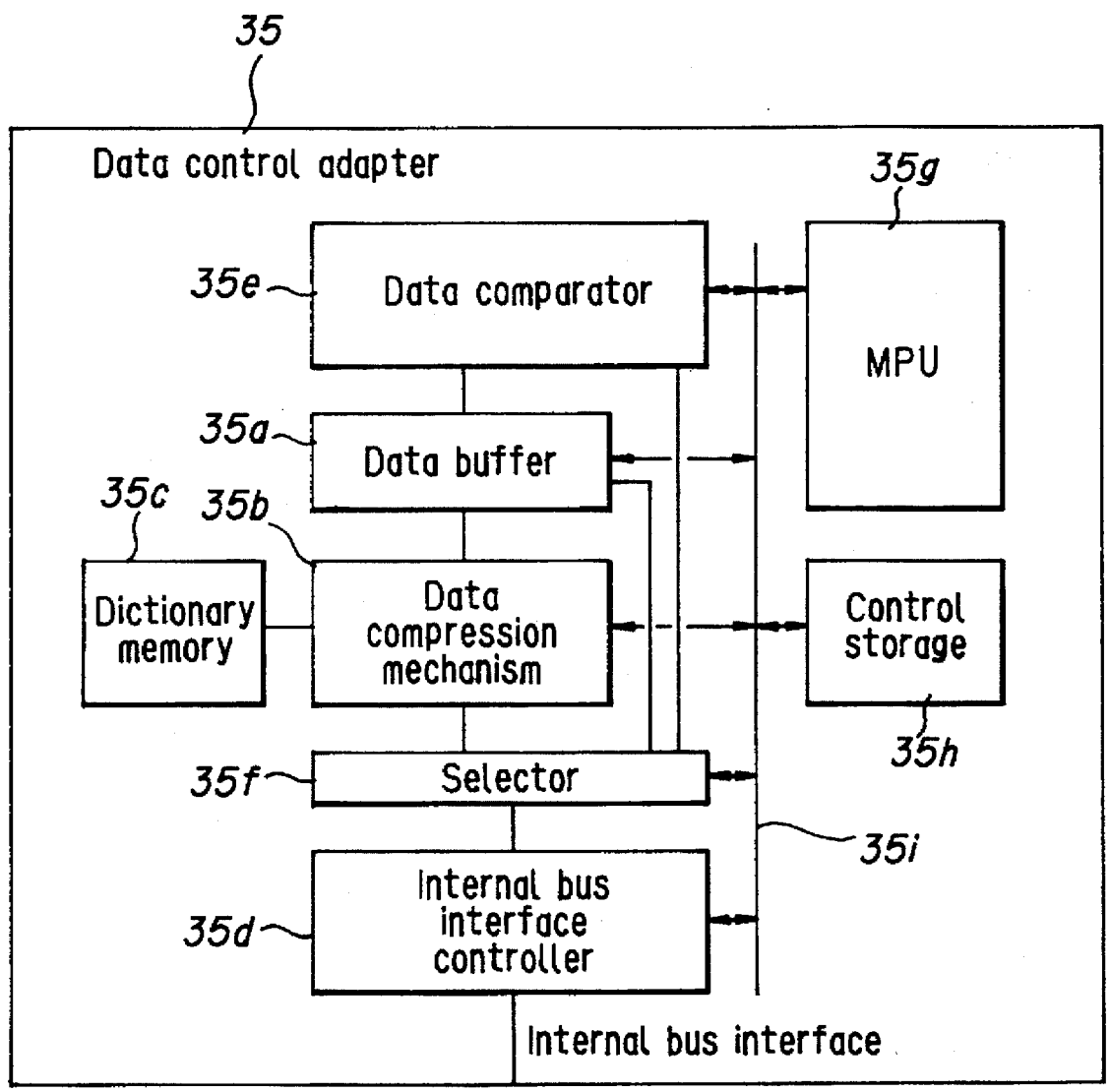
FIG. 28 shows the structure of the data control adapter in the embodiment shown in FIG. 26.

FIG. 28 shows the structure of the data control adapter 35. The data control adapter 35 accommodates the large-capacity data buffer 35a, the data compression mechanism 35b for compressing/restoring the data to be transmitted, a dictionary memory 35c for assisting the compressing/restoring operation, an internal bus interface controller 35d which is connected to the internal bus 38, a data comparator 35e for verifying compressed data by comparing the data compressed and restored with the original uncompressed data, a selector 35f for selectively outputting input data to the data compression mechanism 35b or the data comparator 35e depending upon whether the data input from the internal bus interface controller 35d is compressed data or uncompressed data, an MPU 35g for controlling these hardware resources by a microprogram, a control storage 35h for storing the program, and a bus 35i.

When the channel adapter 31 finishes writing the compressed data to the semiconductor memory module 33, and the uncompressed data to the spare semiconductor memory module 33s, the data control adapter 35 reads the compressed data. The compressed data is input into the data compression mechanism 35b through the internal bus interface controller 35d and the selector 35f, and the data compression mechanism 35b restores the compressed data and stores restored data in the data buffer 35a.

The data control adapter 35 then reads the uncompressed data stored in the spare semiconductor memory module 33s. The uncompressed data is transferred to the data comparator 35e through the internal bus interface controller 35d and the selector 35f. The data comparator 35e compares the restored data stored in the data buffer 35a with the uncompressed data which is read out of the spare semiconductor memory module 33s.

When an abnormality is detected as a result of the comparison, the data is repaired in the following manner. The uncompressed data is read out of the spare semiconductor memory module 33s again, and stored in the data buffer 35a through the internal bus interface controller 35d and the selector 35f. After the completion of reading of the uncompressed data, the data compression mechanism 35b compresses the data stored in the data buffer 35a and writes the compressed data into the semiconductor memory module 33 through the selector 35f and the internal bus interface controller 35d. After the completion of the writing of the compressed data, the data comparison is executed again in the above-described way so as to confirm the normality of the data.

(c-4) Backup disk adapter

Figure 29:
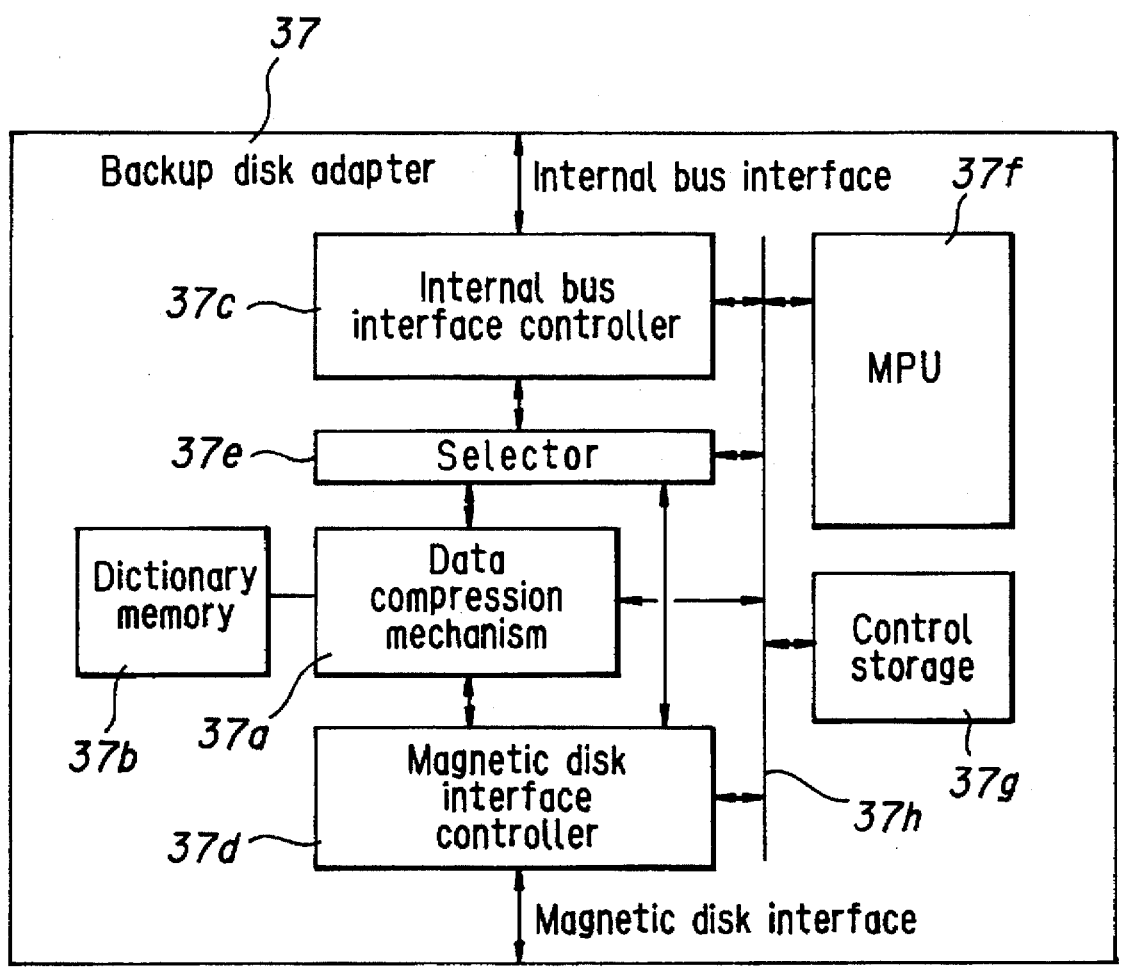
FIG. 29 shows the structure of the backup disk adapter in the embodiment shown in FIG. 26.

FIG. 29 shows the structure of the backup disk adapter 37. The backup disk adapter 37 accommodates a data compression mechanism 37a for compressing/restoring data, a dictionary memory 37b for assisting the compressing operation, an internal bus interface controller 37c for controlling data transfer through an internal bus interface, a magnetic disk interface controller 37d which is connected to the backup disk apparatus 36, a selector 37e for selectively outputting the data input through the internal bus interface controller 37c to the data compression mechanism 37a or the magnetic disk interface controller 37d and selectively outputting the output of the data compression mechanism 37a or the magnetic disk interface controller 37d to the internal bus interface controller 37c, an MPU 37f for controlling these hardware resources by a microprogram, a control storage 37g for storing the program, and a bus 37h.

When the operation of backing up the data stored in the semiconductor memory module 33 is started, the data received through the internal bus interface controller 37c is transferred to the data compression mechanism 37c by the selector 37e. The data compression mechanism 37a compresses all data including the data which has already been compressed by another data compression mechanism and transmits the compressed data to a magnetic disk interface controller 37d. The magnetic disk interface controller 37d writes the data received into the backup disk apparatus 36 in disregard of whether it is compressed data or uncompressed data. It is possible to write data into the backup disk apparatus 36 by operating the selector 37e without compressing it by the data compression mechanism 37a.

(c-5) Data format

Figure 1:
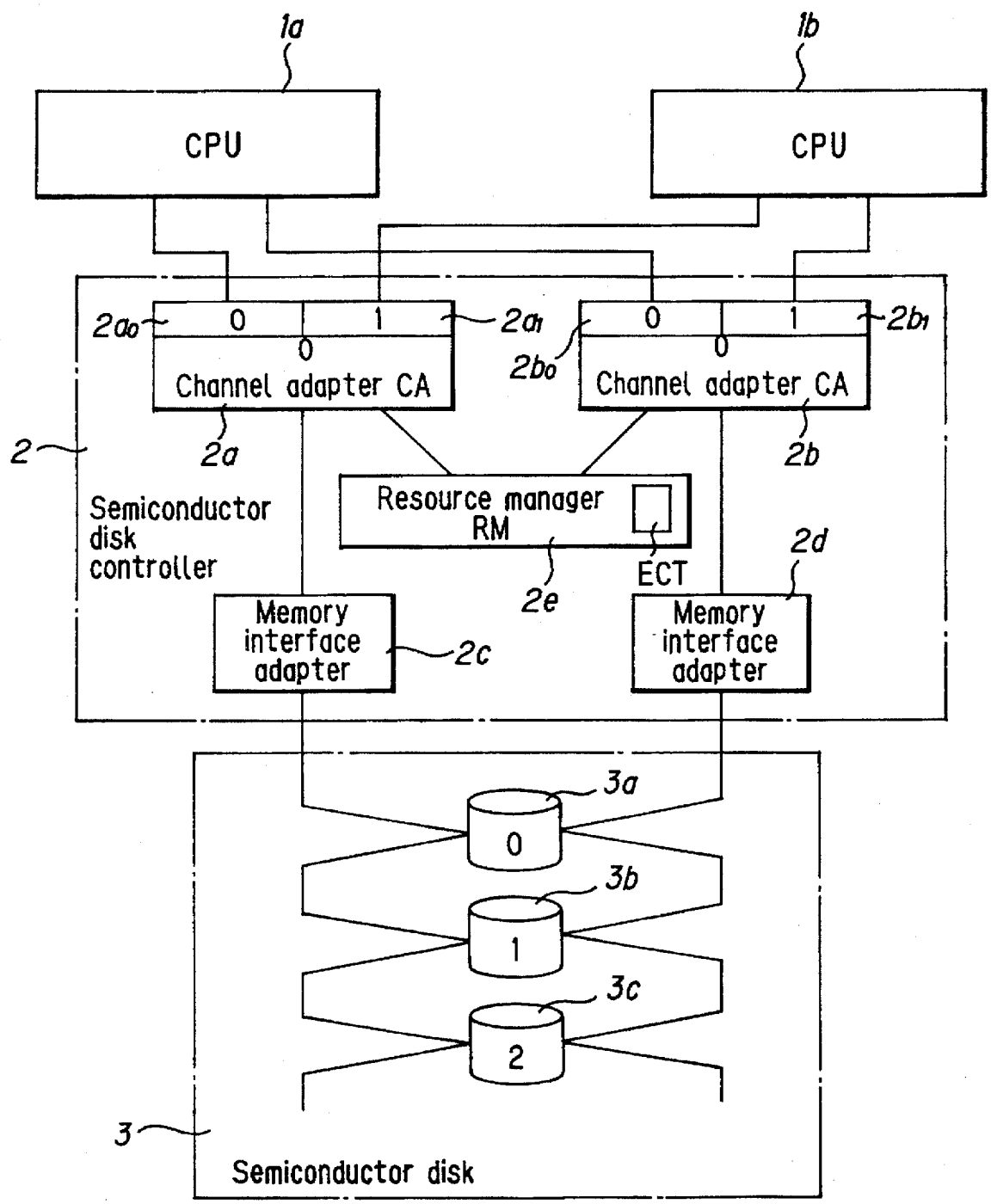
FIG. 1 shows the structure of an I/O subsystem as a semiconductor disk apparatus.
Figures 4A, 4B:
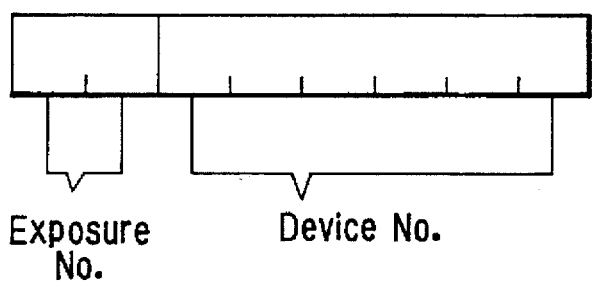
FIGS. 4A and 4B are explanatory views of an exposure.
Figure 6:
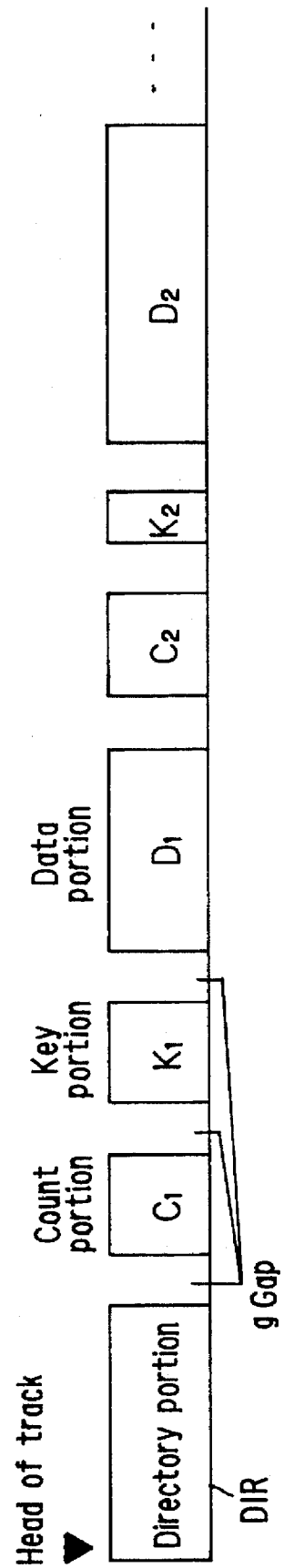
FIG. 6 shows a data format in a conventional semiconductor disk apparatus.
Figure 7:
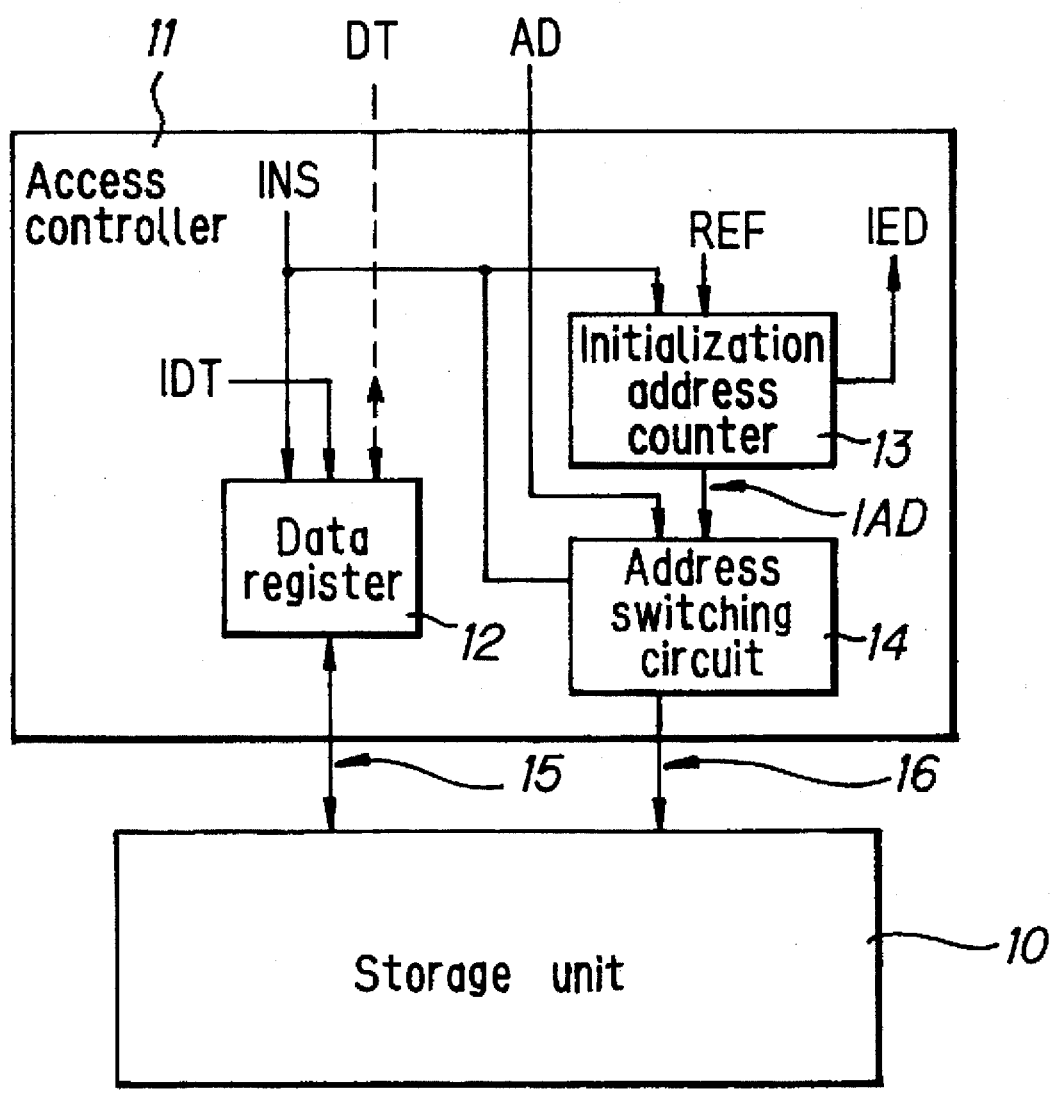
FIG. 7 shows a conventional initializing mechanism.
Figure 8:
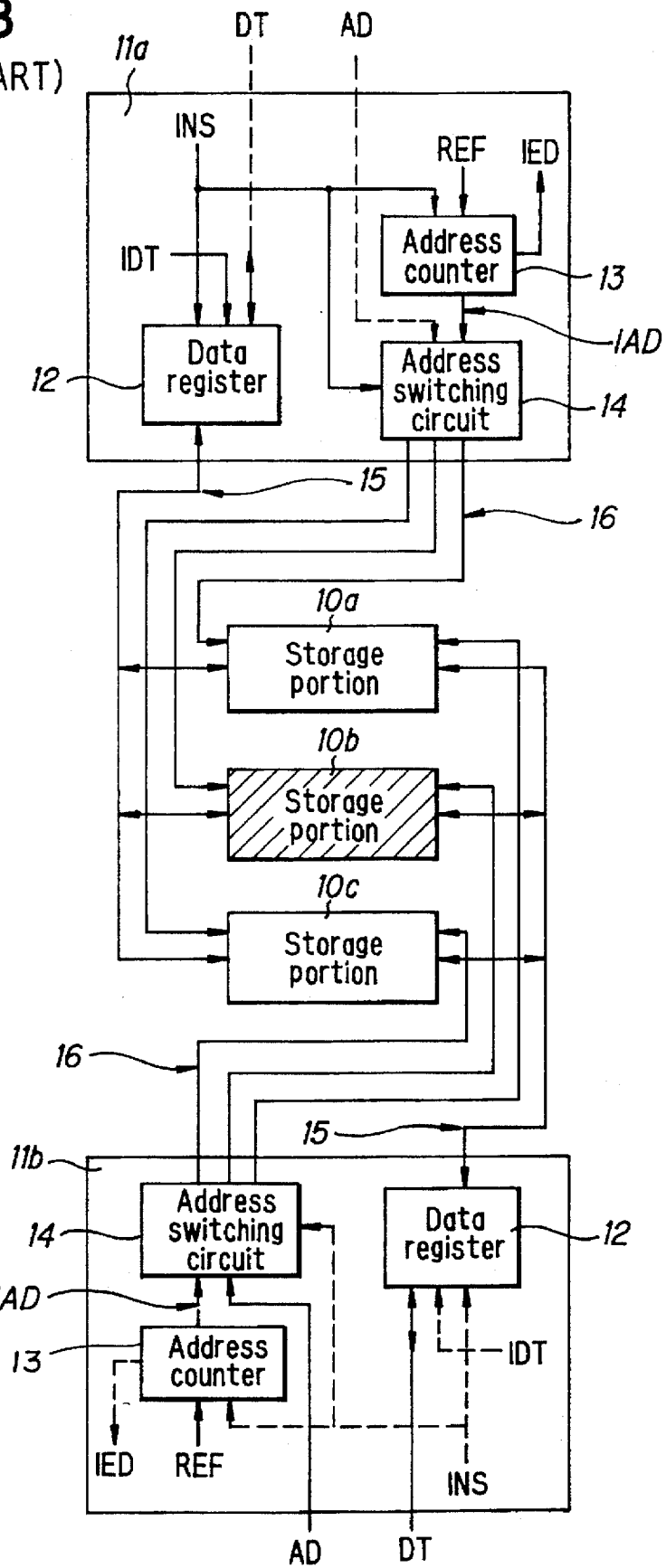
FIG. 8 shows the structure of another conventional initializing mechanism.

A conventional I/O subsystem uses the same data format as that written into an ordinary magnetic disk, as shown in FIG. 6, so as to execute emulation with respect to a magnetic disk. The symbol DIR represents a directory written at the head of a track field. This data is intrinsic to a semiconductor disk and does not exist in an actual magnetic disk apparatus. After the directory DIR, a plurality of records Ri each of which is composed of a count portion Ci (i=1, 2, . . . ), a key portion Ki and a data portion Di are written. The count portion Ci records a record number, and the lengths of the subsequent key portion Ki and data portion Di. The key portion Ki is not always necessary but records a key for retrieval by an access method. The data portion Di records data which are generally called "user data".

In the present invention, the data in the semiconductor memory module 33 with the directory portion DIR, the count portion Ci and the key portion Ki removed therefrom (i.e., only the data portion Di) is compressed. The semiconductor disk apparatus eliminates as many gap portions as possible which are unnecessary, and additional information for the semiconductor disk is written instead in the portion equivalent to a gap.

Figure 30:
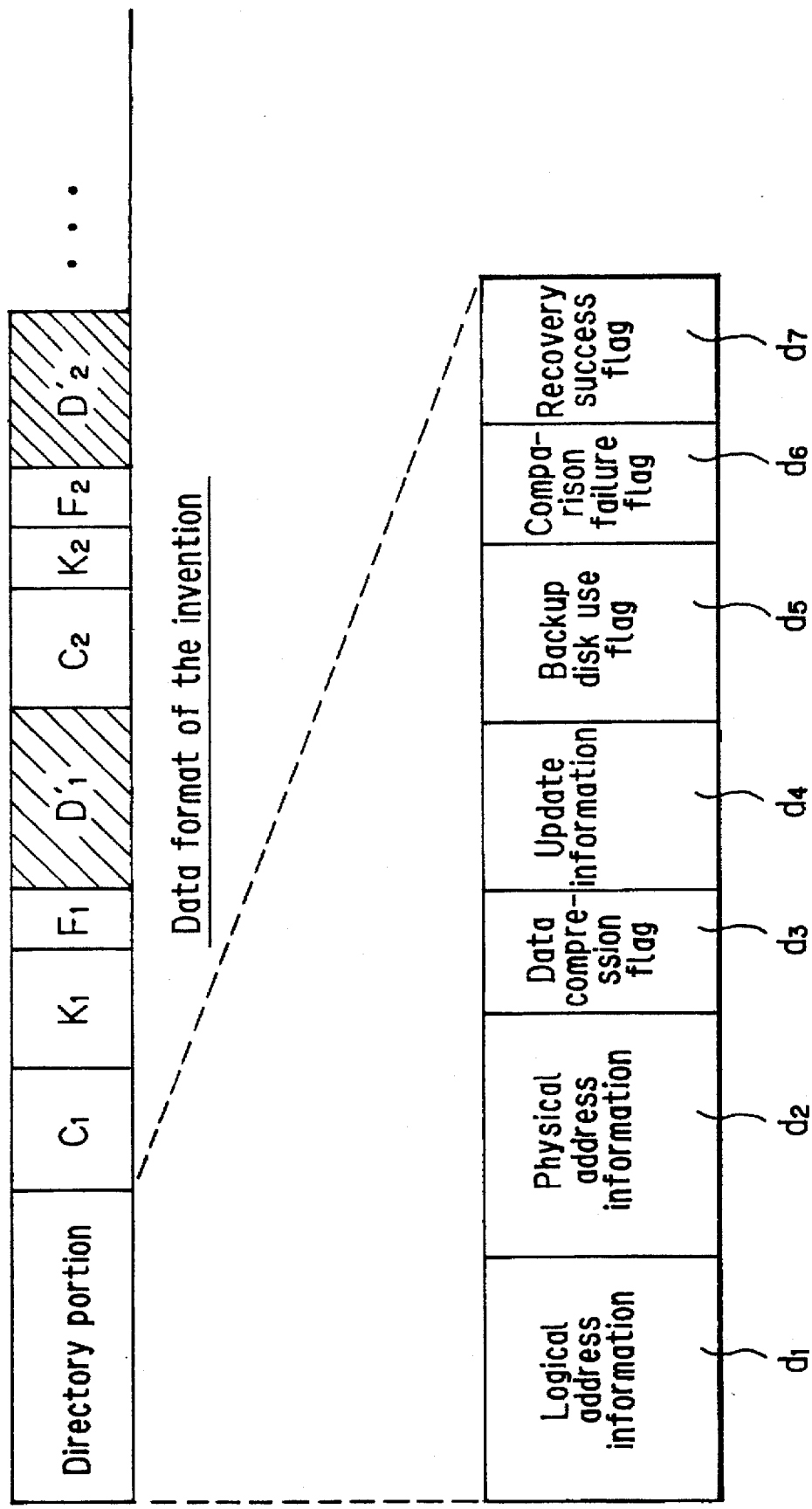
FIG. 30 is an explanatory view of the data format according to the present invention.

FIG. 30 is an explanatory view of the data format written into a semiconductor memory module according to the present invention. In this data format, an identification flag Fi for discriminating between compressed data and uncompressed data is written after the directory portion DIR, the counter portion Ci and the key portion Ki, and data Di' compressed by the data compression mechanism is written after the identification flag Fi.

The directory portion DIR includes logical address information d1, physical memory address information d2, a compression flag d3 indicating that the data is an object of compression, the latest date d4 (update information) on which the data at the track portion is changed or written, a backup disk use flag d5 indicating that part of the data on the track is stored in the backup disk 36, and a comparison failure flag d6 and a recovery success flag d7 indicating the result of verification by the data control adapter 35.

(c-6) Data writing control

Figure 31:
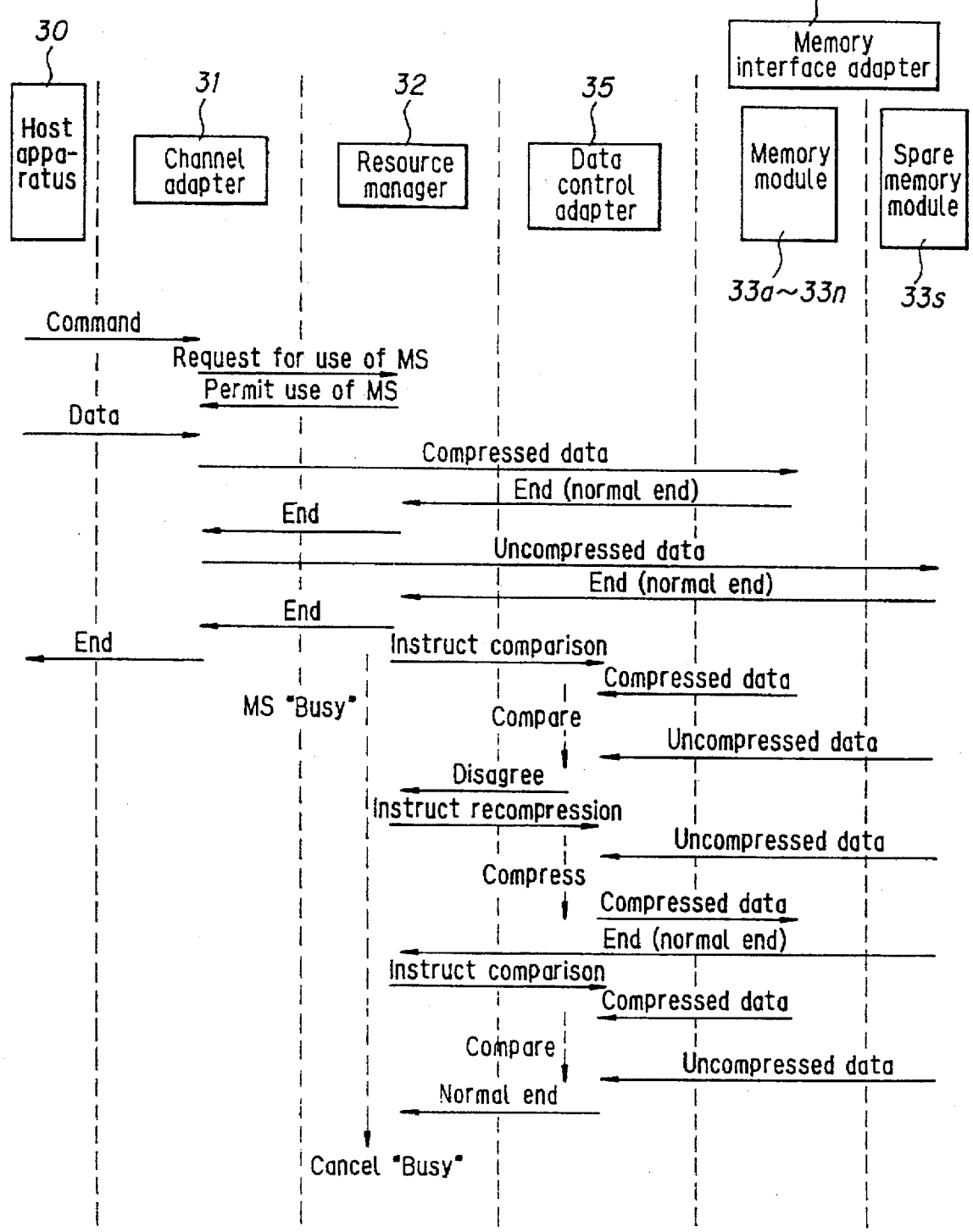
FIG. 31 is an explanatory view of the sequence of data writing control.

FIG. 31 is an explanatory view of the sequence of data writing control.

A semiconductor disk is abscessed from a host apparatus in the same way as a high-speed accessible magnetic disk. In other words, a positioning command for instructing the location of seek or the like, and a read command and a write command for instructing data transfer are issued from the host apparatus in the same way as in the case of an ordinary magnetic disk.

The channel adapter 31 which has received a positioning command requests the resource manager 32 to permit the use of a semiconductor memory module. When the use of the semiconductor memory module is permitted, the address of the corresponding semiconductor memory module is calculated from the designated physical positioning parameter. The directory information of the track in which the address obtained exists is read out of the semiconductor memory module, and processing is executed with respect to the logical address information and the physical address information.

When a write command is issued from the host apparatus after the end of the positioning operation, the channel adapter 31 stores the data received through the channel interface protocol controller 31d into the data buffer 31a. The MPU 31g of the channel adapter 31 controls the selector 31e so as to select the output side of the data compression mechanism 31b when the data corresponds to the data portion Di.

The data compression mechanism 31b compresses the input/output data stored in the data buffer 31a and inputs the compressed data in the internal bus interface controller 31f. The compressed data input in the internal bus interface controller 31f is transmitted to the memory interface adapter 34 through the internal bus and stored at the address position which corresponds to the predetermined semiconductor memory module 33.

When the compressed data has been stored, the MPU 31g of the channel adapter 31 writes the identification flag Fi which indicates that the data is compressed data into the semiconductor memory module 33 in accordance with the data format. The MPU 31g further controls the selector 31e so as to transmit the original data (uncompressed data) which is stored in the data buffer 31a to the internal bus interface controller 31f and writes it in the spare semiconductor memory module 33s.

When the writing operation is finished, the MPU 31g updates the update information, the identification flag which indicates that the data is compressed data, and the like in the directory portion DIR and the directory portion DIR after update is written back at the head of the track of the corresponding semiconductor memory module 33.

When all the writing operation is finished with respect to the semiconductor memory module 33 and the spare semiconductor memory module 33s by the channel adapter 31, the resource manager 32 temporarily prohibits the access to the corresponding data from a host apparatus by answering, "Busy" by exclusive control, and instructs the data control adapter 35 to start the verification of the compressed data.

The MPU 35g of the data control adapter 35 reads the directory portion DIR of the compressed data from the semiconductor memory module 33 and reads out the compressed data. The data transferred from the semiconductor memory module 33 is input to the data compression mechanism 35b through the internal bus interface controller 35d and the selector 35f.

The data compression mechanism 35b restores the input data and stores it in the data buffer 35a. The data compression mechanism 35b then reads the uncompressed data from the spare semiconductor memory module 33s and inputs the uncompressed data to the data comparator 35e. The data comparator 35e compares the restored data with the uncompressed data.

If the normality of the data is confirmed as a result of comparison, the data control adapter 35 informs the resource manager 32 of the normal end of the writing operation without executing processing such as writing back of the directory portion DIR. The resource manager 32 which has received the information removes the temporary prohibition against access to the data from a host apparatus.

When an abnormality of data is detected as a result of data comparison, the MUP 35g of the data control adapter 35 reads the uncompressed data from the spare semiconductor memory module 33s. The data compression mechanism 35b compresses the data on the basis of the read uncompressed data and writes the compressed data into the semiconductor memory module 33. When the operation of writing the compressed data is finished, the data control adapter 35 executes the above-described data verification. If the normality of the compressed data stored in the semiconductor memory module 33 again is confirmed by the second verification, both the comparison failure flag d6 and the normality recovery flag d7 are set at "1" at the directory portion DIR of the compressed data, and the directory portion DIR is written back into the semiconductor memory module 33. When the operation of writing back the directory portion DIR is finished, the resource manager 32 is informed of the end of verification, thereby ending the process. The resource manager 32 then removes the temporary prohibition against access to the data from a host apparatus.

On the other hand, if an abnormality is detected again as a result of data recovery, the data control adapter 35 sets only the comparison failure flag d6 (not the normal recovery flag d7) at "1", and writes back the directory portion DIR into the semiconductor memory module 33. When the operation of writing back the directory portion DIR is finished, the resource manager 32 is informed of the end of verification, thereby ending the process. The resource manager 32 then removes the temporary prohibition against access to the data from a host apparatus.

Figure 32:
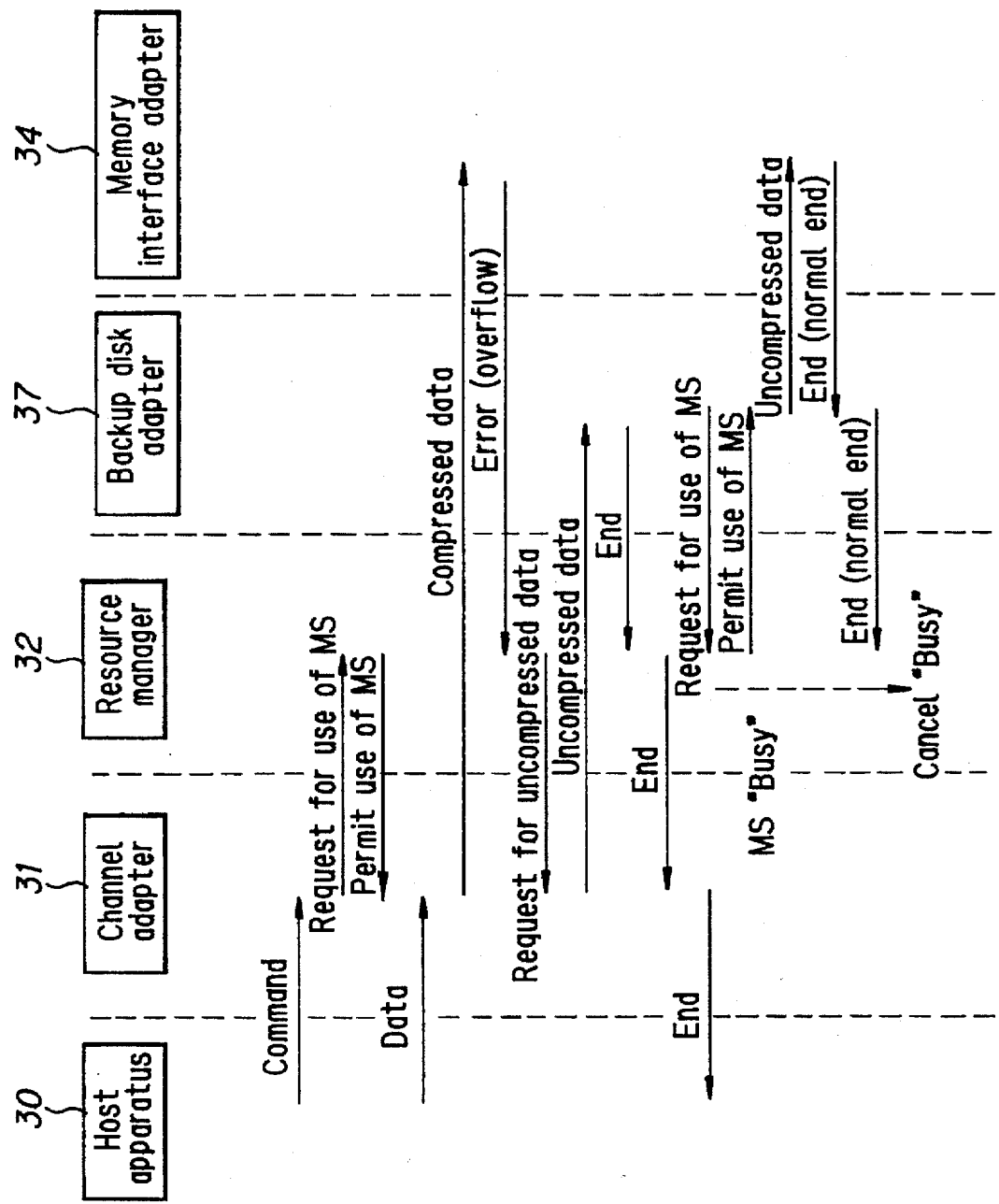
FIG. 32 is an explanatory view of the sequence of data writing control when a semiconductor memory module has overflowed.

The above described sequence is applicable to the case in which a semiconductor memory module does not overflow. FIG. 32 is an explanatory view of the sequence of data writing control when a semiconductor memory module has overflowed.

When compressed data is larger than the original data, it is sometimes physically impossible to write the compressed data into a designated semiconductor memory module 33. In such a case, the resource manager 32 is informed of an error due to overflow of the region. When the resource manager receives the information of the error, it instructs the channel adapter 31 to suspend the operation of writing compressed data into the semiconductor memory module 33 and to write uncompressed data into the backup disk apparatus 36 instead. The channel adapter 31 therefore suspends the operation of writing the compressed data into the semiconductor memory module 33 and starts temporary storage of the uncompressed data into the backup disk apparatus 36. The backup disk adapter 37 which has been instructed to temporarily store the uncompressed data then switches the selector 37e so as to write the data transferred from the channel adapter 31 through the internal bus interface into the backup disk apparatus 36 without compression. Since a sufficient area for temporary storage is allotted to the backup disk apparatus 36 in advance, there is no fear of impairing the user data which is already stored as backup data.

When the writing operation to the backup disk apparatus 36 is finished, the MPU 31g of the channel adapter 31 writes the uncompressed data which is stored in the data buffer 31a in the spare semiconductor memory module 33s through the internal bus interface controller 31f. After these operations, the MPU 31g of the channel adapter 31 updates the update information d4, the compression flag d3 which indicates that the data is compressed data, and the flag d5 which indicates that the data is stored in the backup disk apparatus 36 which is a temporary storage region, and writes back the updated directory portion DIR into the semiconductor memory module 33.

When the writing operation to the backup disk apparatus 36 is finished, the backup disk adapter 37 requests the resource manager 32 to permit the use of the semiconductor memory module 33 so as to write the uncompressed data which is temporarily stored into the semiconductor memory module 33. If the use of the semiconductor memory module 33 is permitted, the backup disk adapter 37 reads the uncompressed data from the backup disk apparatus 36 and writes it into the semiconductor memory module 33. When the writing operation is finished, the backup disk adapter 37 informs the resource manager 32 of the end of the writing operation, thereby ending the process. The resource manager 32 then removes the temporary prohibition against access to the data from a host apparatus.

(c-7) Data read control

Figure 33:
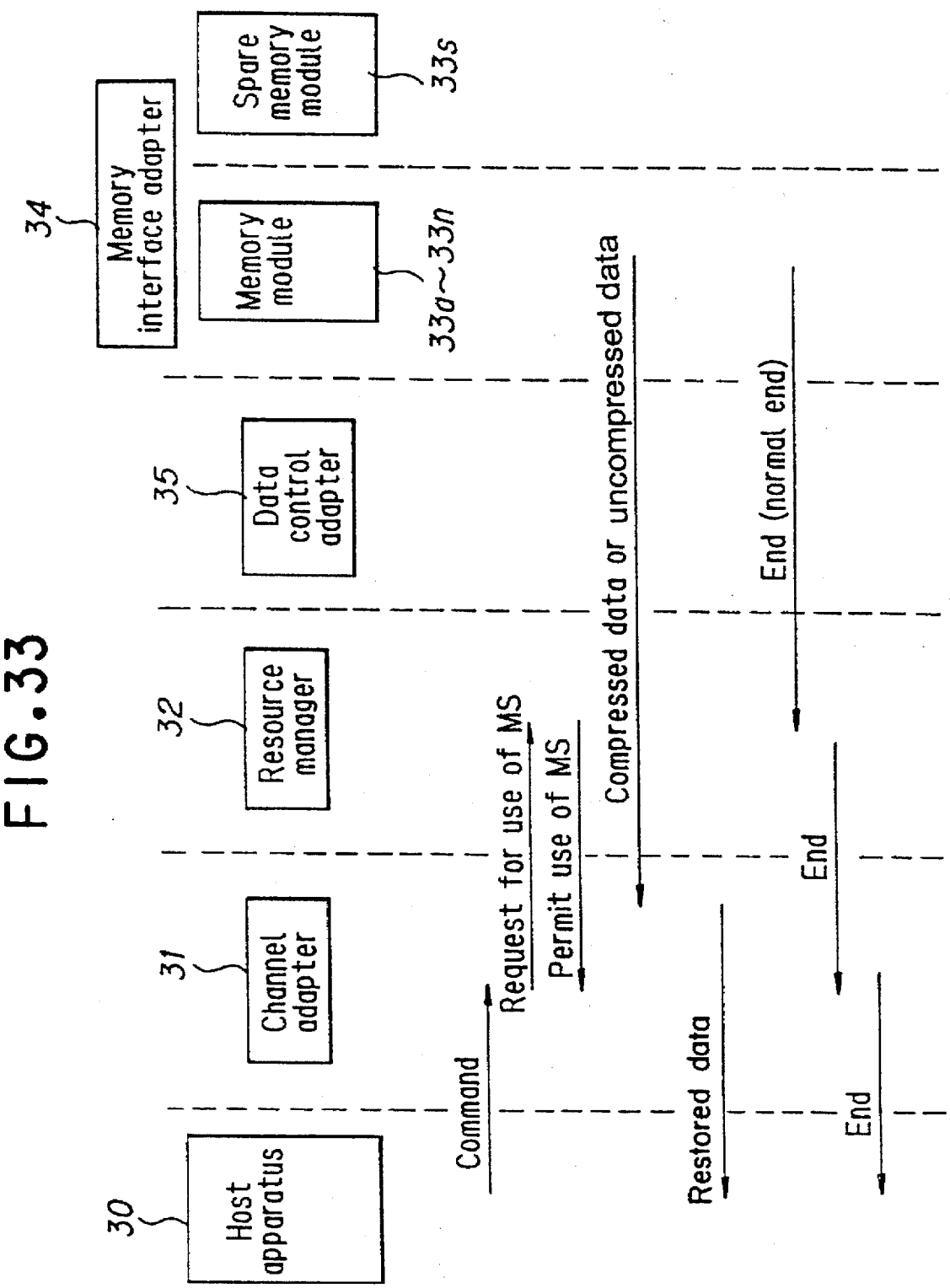
FIG. 33 is an explanatory view of the sequence of data reading control.

FIG. 33 is an explanatory view of the sequence of data reading control.

The channel adapter 31 which has received a positioning command requests the resource manager 32 to permit the use of a semiconductor memory module in the same way as in the writing operation. When the use of the semiconductor memory module is permitted, the address of the corresponding semiconductor memory module is calculated from the designated physical positioning parameter. The directory information of the track in which the address obtained exists is read out of the semiconductor memory module, and processing is executed with respect to the logical address information and the physical address information.

When a read command is issued from the host apparatus after the end of the positioning operation, the MPU 31g of the channel adapter 31 starts reading the data from the semiconductor memory module 33 in which the data is stored. The MPU 31g judges whether the data is compressed or uncompressed by reference to the identification flag Fi, and if the data is compressed data, the MPU 31g supplies the compressed data to the data compression mechanism 31b through the internal bus interface controller 31f and the selector 31e. The data compression mechanism 31b restores the data and transmits it to the channel interface through the data buffer 31a and the data interface protocol controller 31d. On the other hand, if the data is uncompressed data, the MPU 31g stores the uncompressed data directly into the data buffer 31a. Thereafter, the MPU 31g transmits the data to the channel interface through the data interface protocol controller 31d.

In the above-described reading operation, the MPU 31g of the channel adapter 31 judges the status of the data on the basis of the contents of the directory portion DIR. That is, the MPU 31g judges the status of the data on the basis of the flags d5 to d7 written by the channel adapter 31 or the data control adapter 35 at the time of data writing, and reports the status to the host apparatus. For example, when the backup use flag d5 is set at "1", normal data reading is possible but since there is a fear of a shortage of the area of the semiconductor memory module, a warning message is given. When the comparison failure flag d6 is set at "1" and the recovery flag d7 is set at "0", an abnormality of data is informed of in the same way as in the data verification, so that the data is written and transferred again.

(c-8) Backup control

Since a semiconductor memory is a volatile recording medium, data in the semiconductor memory is ordinarily backed up in a magnetic disk apparatus, which is a non-volatile medium, when the system is stopped or in an emergency.

Figure 34:
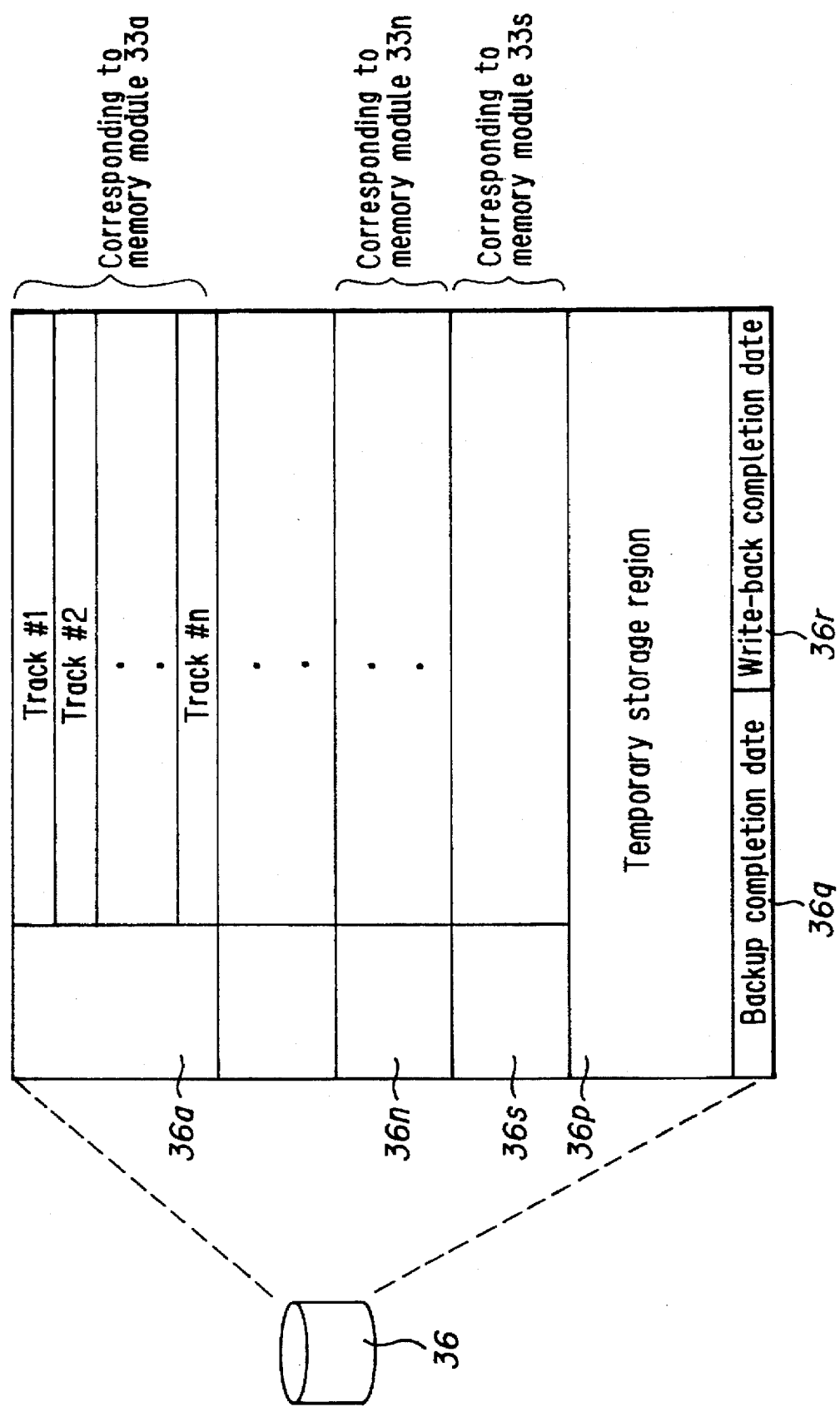
FIG. 34 is an explanatory view of the storage region of the backup disk apparatus in the embodiment shown in FIG. 26.

As shown in FIG. 34, regions 36a to 36n and 36s which correspond to the semiconductor memory modules 33a to 33n and 33s, and a temporary storage region 36p are allotted to the backup disk apparatus 36 in advance. Each of the regions 36a to 36n and 36s is finely divided into regions for tracks each of which corresponds to the track emulated on the semiconductor memory module. The backup disk apparatus 36 also contains regions 36q and 36r for storing the time at which a backup operation is ended and the time at which a write-back operation (the operation of writing back the data in the backup disk apparatus 36 to the semiconductor memory module) is ended. When a backup operation is instructed, the backup disk adapter 37 inputs the data which are transferred from the semiconductor memory modules 33a to 33n and 33s through the internal bus interface controller 37c and the selector 37d to the data compression mechanism 37a. The data compression mechanism 37a collectively compress the input data and writes the compressed data into the corresponding positions in the backup disk apparatus 36 through the magnetic disk interface controller 37d.

The backup disk adapter 37 writes the date on which the backup operation is finished into the region 36q of the backup disk apparatus 36 and reads and internally stores the date when the data is written back. When the backup operation is instructed again, the backup disk adapter 37 compares the stored time with the update information of the directory which is stored at the head of the track of the semiconductor memory module. If the date of the directory is older than the latest backup completion date, the data stored on the track is not written into the backup disk apparatus 36. In this way, it is possible to shorten the backup time.

(c-9) Modification

Although only one channel adapter 31, one memory interface adapter 34 and one backup disk adapter 37 are used in the above-described embodiment, the number of each device may be increased.

Although only one data control adapter 35 is provided in the semiconductor disk apparatus in this embodiment, a plurality of data control adapter may be provided so as to enable parallel processing.

In addition, although the data for each track is stored in the backup disk apparatus 36 as a unit in this embodiment, the data for each cylinder or the data for each sector may be stored therein as a unit.

Furthermore although a spare semiconductor memory module for storing uncompressed data is provided in this embodiment, a part of each of the semiconductor memory modules may be used as a spare semiconductor memory module instead.

(c-10) Advantages

As described above, since part of data is compressed before storage, it is possible to provide a semiconductor disk apparatus for storing a larger amount of data than the capacity of a semiconductor memory.

Since a data buffer having a large capacity is provided within the channel adapter, it is possible to transfer data while keeping the data transfer speed with respect to a host apparatus at a constant rate and therefore to alleviate the stress caused when data is processed.

In addition, since a data control adapter is adopted, it is possible to verify the normality of compressed data within the subsystem without the need for linkage with a host apparatus. Even when an abnormality of data is detected as a result of verification, it is possible to recover the data within the subsystem.

Furthermore, since update information is stored in the directory portion and the backup disk apparatus, the time required for backing up data is shortened.

(d) Initialization of memory (d-1) Schematic explanation of initialization

Figure 35A:
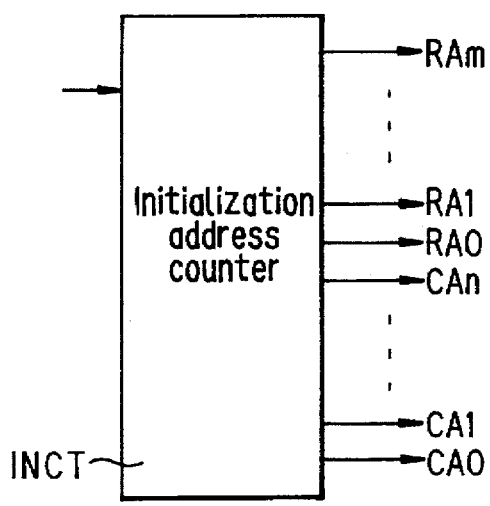
FIGS. 35A and 35B are explanatory views of a conventional memory initialization method.
Figure 35B:
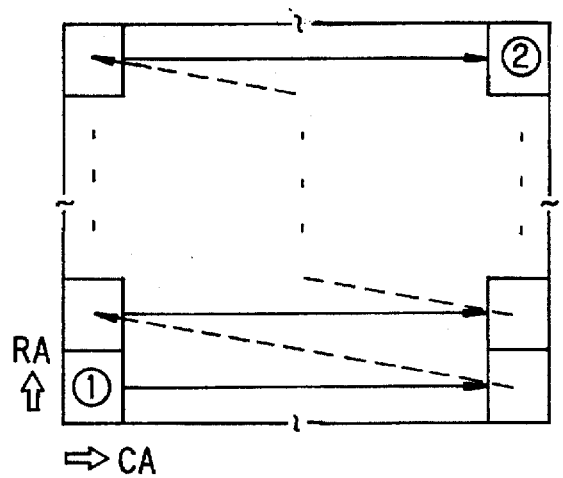

FIGS. 35A and 35B are explanatory views of a conventional memory initialization method adopted by a semiconductor disk or the like in an I/O subsystem. In FIG. 35A, the symbol INCT represents a conventional initialization address counter, wherein the symbols CA0 to CAn represent column addresses of (n+1) bits, and RA0 to RAm represent row addresses of (m+1) bits. A dynamic RAM, which is a volatile memory, is provided with both row addresses which indicate an address in the direction of the row of the memory and column addresses which indicate an address in the direction of the column of the memory. In the conventional initialization address counter, the least significant bit of the counter output signal is CA0 and the most significant bit thereof is RAm. By operating the counter INCT, serial address signals are produced in an ascending order. In this counter INCT, initialization data is written in the memory cells in the order indicated by the arrows of solid lines in FIG. 35B.

Figure 36A:
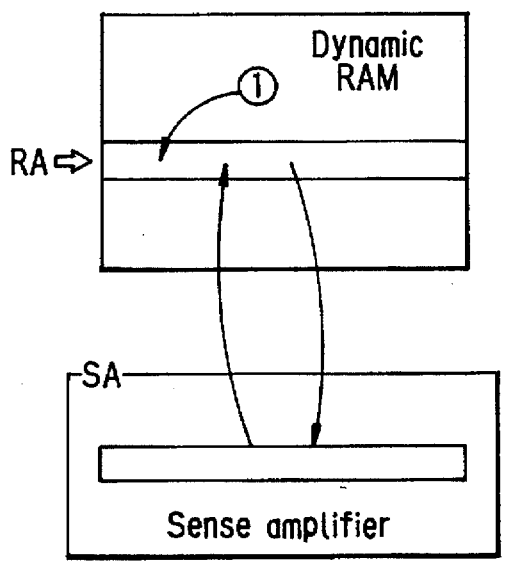
FIGS. 36A and 36B are explanatory views of a refreshing operation.
Figure 36B:
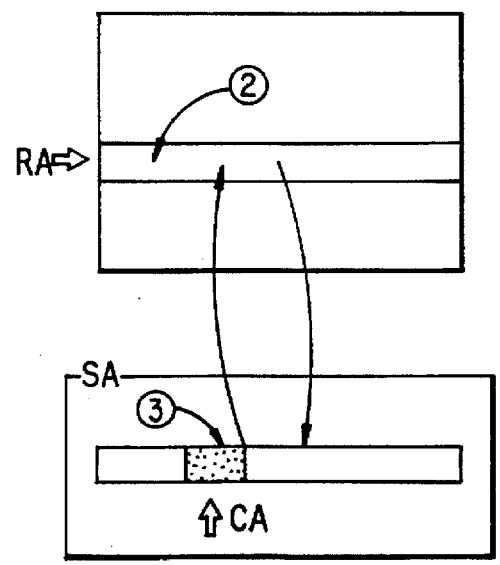

The dynamic RAM must be refreshed at a constant interval of time. In order to refresh the dynamic RAM, the data in all the memory cells on one row ① indicated by the address RA are read to a sense amplifier SA in the memory, as shown in FIG. 36A, and written back into the memory cells on the same row so as to keep the charges stored in the cells above a constant value. This operation is repeated with respect to the data on all the rows at a constant interval of time. If this refreshment of the data is not executed with respect to the data in all cells at a constant interval of time, the data in the memory is lost. When data is written into the memory, the same effect as at the time of refreshment is brought about. That is, when data is written into one cell ③ in FIG. 36B, the data on the row ② externally designated by the row address RA are read to the sense amplifier SA, and after data in the cell ③ designated by the column address CA is updated by the externally supplied data, all the data are written back in the memory cells on the same row. In this way, the data writing operation produces the same effect as the refreshment of the data in all the cells on the row ②.

Referring again to FIG. 35B, if initialization data are consecutively written in the memory from the cells on the row ①, the time for holding the charges runs out before the data are written in the cells on the row ②, so that the charges in the cells on the row ① are lost. For this reason, the refreshment explained in FIG. 36A is necessary during initialization in the conventional memory initialization method, which prolongs the initialization time.

Figure 37B:
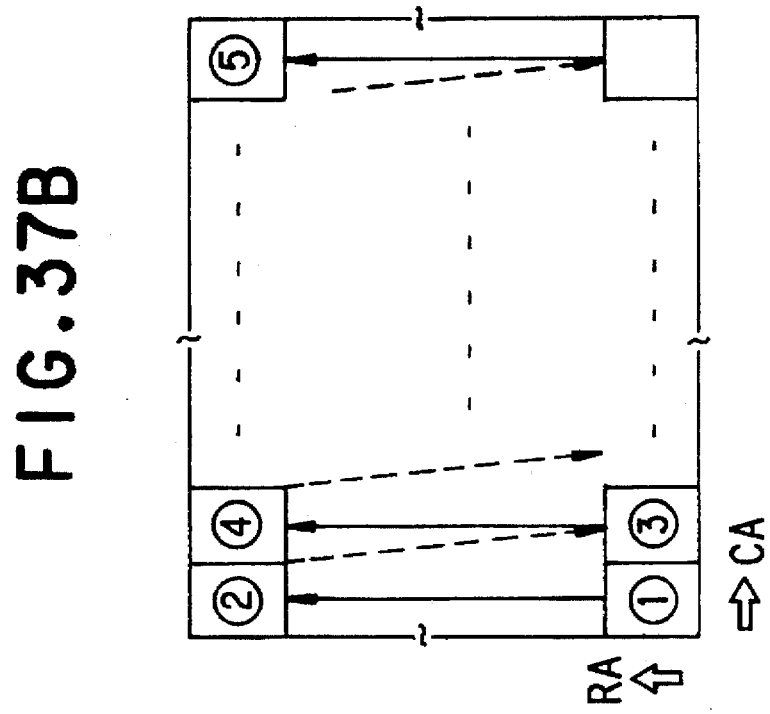
FIGS. 37A and 37B are explanatory views of an initialization method according to the present invention.
Figure 37A:
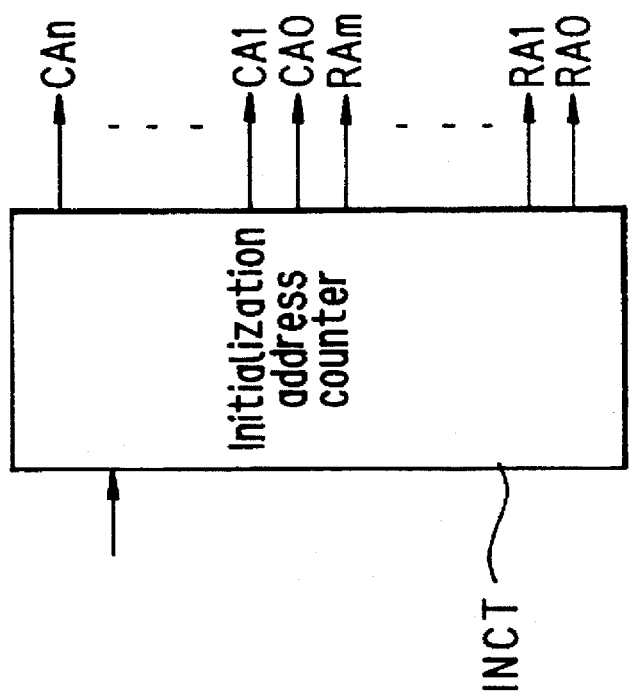

On the other hand, in the initialization address counter INCT of the present invention shown in FIG. 37A, the least significant bit of the counter output signal is RA0 and the most significant bit thereof is CAn. By the operation of this counter, addresses produced are not serial unlike those produced by the conventional counter, and data are consecutively written in the memory cells in the order of columns as indicated by the arrows of solid lines in FIG. 37B. According to this data writing method, the time taken for data to be written into the cells ① to ② and ③ is shorter than the interval between two refreshment operations, so that until data is written into the memory cell ③, the charges in the memory cell ① are stored as they are. In addition, at the time of writing data into the memory cell ③, the memory cell ① which is on the same row as the memory cell ③ is refreshed due to the refreshment effect explained in FIG. 36B. In other words, according to the initialization method using the initialization address counter of the present invention, it is not necessary to instruct a refreshing operation individually and the initialization time is shortened to that extent.

(d-2) Structure of embodiments of memory initialization method of the invention

Figure 38:
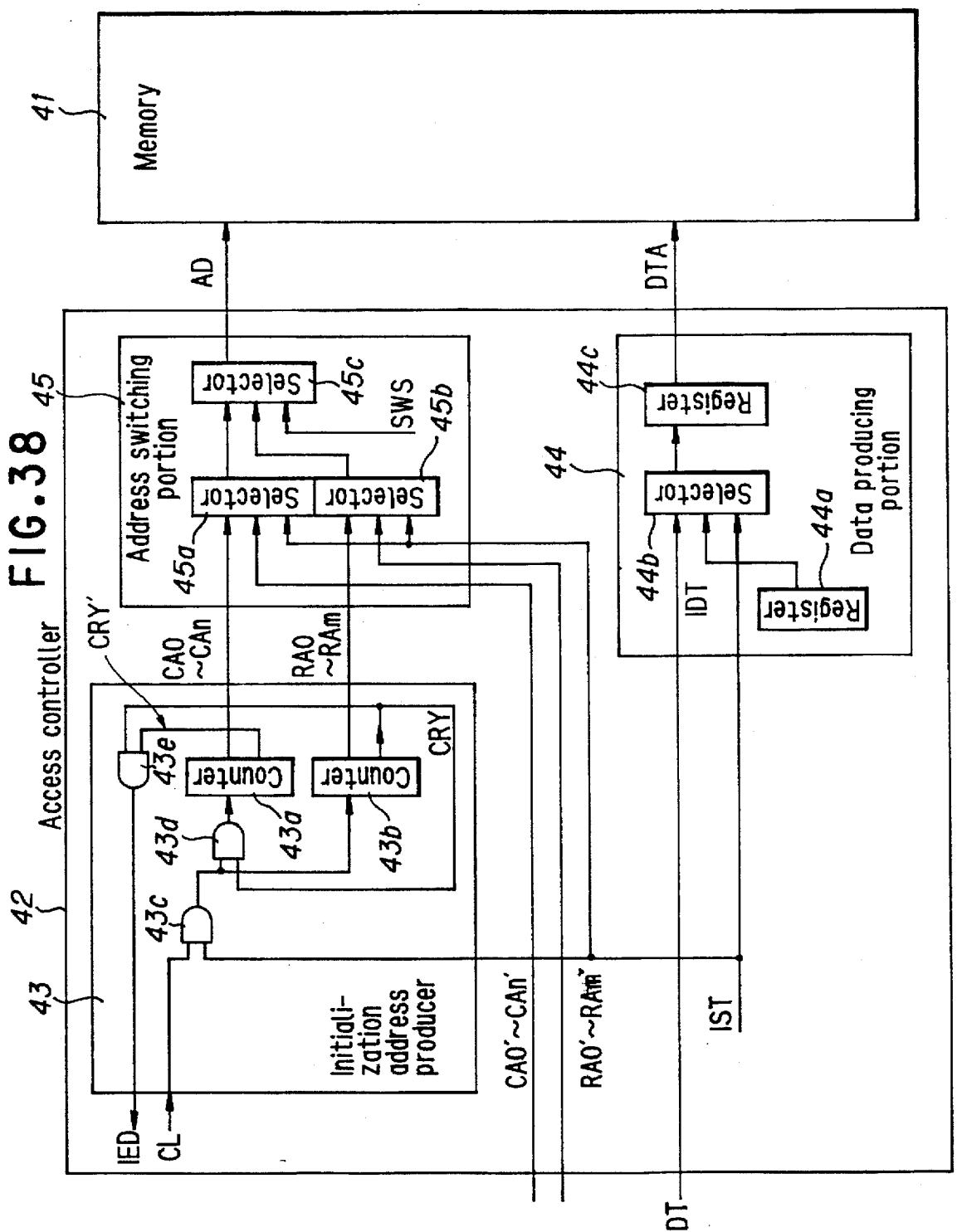
FIG. 38 shows the structure of an embodiment of a memory initialization method according to the present invention.

FIG. 38 shows the structure of an embodiment of a memory initialization method of the present invention. In FIG. 38, the reference numeral 41 represents a volatile memory such as a dynamic RAM which requires refreshment, 42 an access controller, 43 an initialization address producer, 44 a data producer and 45 an address switching portion. In the initialization address producer 43, the reference numeral 43a denotes an up-counter of (n+1) bits for outputting initialization column addresses CA0 to CAn, and 43b denotes an up-counter of (m+1) bits for outputting initialization row addresses RA0 to RAm. At the start of initialization, both counters 43a and 43b output logic 0. In the data producer 44, the reference numeral 44a denotes a register for storing initialization data, 44b a selector for selecting the initialization data or writing data, and 44c a data storage register. In the address switching portion 45, the reference numeral 45a denotes a selector for switching between an initialization column address and a data access column address, 45b a selector for switching between an initialization row address and a data access row address, and 45c a selector for selecting a row address or a column address in accordance with a switching signal SWS.

Figure 39:
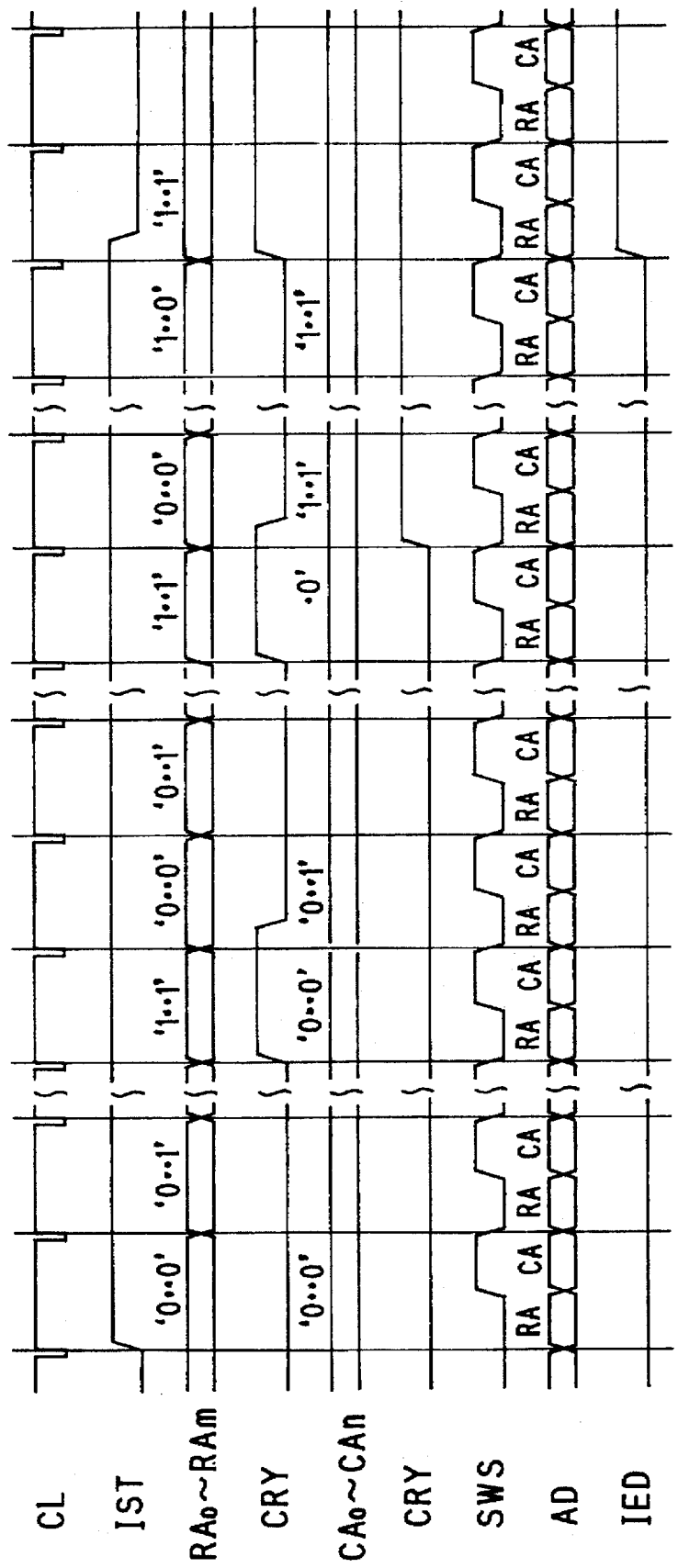
FIG. 39 is a time chart of the operation by the embodiment shown in FIG. 38.

FIG. 39 is a time chart of the operation by the embodiment shown in FIG. 38 and shows the operations of the counters 43a, 43b and the selector 45c.

When the power switch is turned on and an initialization signal IST is produced, the selector 44b switches a data signal DT from a host module as an input signal over to an initialization writing data signal IDT which is output from the register 44a, and stores the initialization writing data signal IDT into the register 44c. The selector 45a switches the column addresses CA0' to CAn' as an input signal from a host module over to the initialization column addresses CA0 to CAn as an output signal from the counter 43a, and the selector 45b switches the row addresses RA0' to RAm' as an input signal from the host module over to the initialization row addresses RA0 to RAm as an output signal from the counter 43b.

An AND gate 43c outputs a clock signal CL to the counter 43b and an AND gate 43d. Since a carry signal CRY output from the counter 43b remains in the state of logic 0, the clock signal CL is not supplied to the counter 43a. The counter 43b counts up in accordance with the clock signal CL. Since the switching signal SWS changes at half the period of the clock signal CL, the selector 45c alternately outputs an address signal AD composed of the row address RA and the column address CA during one clock, as shown in FIG. 39. At this time, data are written in the order of the memory cells ① to ② (in the serial order of rows) in FIG. 37B. When the counter 43b counts up and all the initialization row address signals Ra0 to Ram become "1", the carry signal CRY of the counter 43b is output and the AND gate 43d is opened. The counter 43a counts up at the next clock, and all the outputs of the counter 43b become logic 0. Therefore, the carry signal CRY becomes logic 0 again. While the counter 43b counts up, data are written in the order of the memory cells ③ to ④ in FIG. 37B. When the data are written on the second column, the memory cells ① to ② are refreshed due to the refreshing effect described above.

This operation is repeated and when all the outputs of the counters 43a and 43b become logic "1" (indicating a cell ⑤ in FIG. 37B), both carry signals CRY', CRY of the counters 43a and 43b become "1", an initialization end signal IED is output as an output signal of an AND gate 43e and the host module is informed of the end of the initialization of the memory 41.

Figure 40:
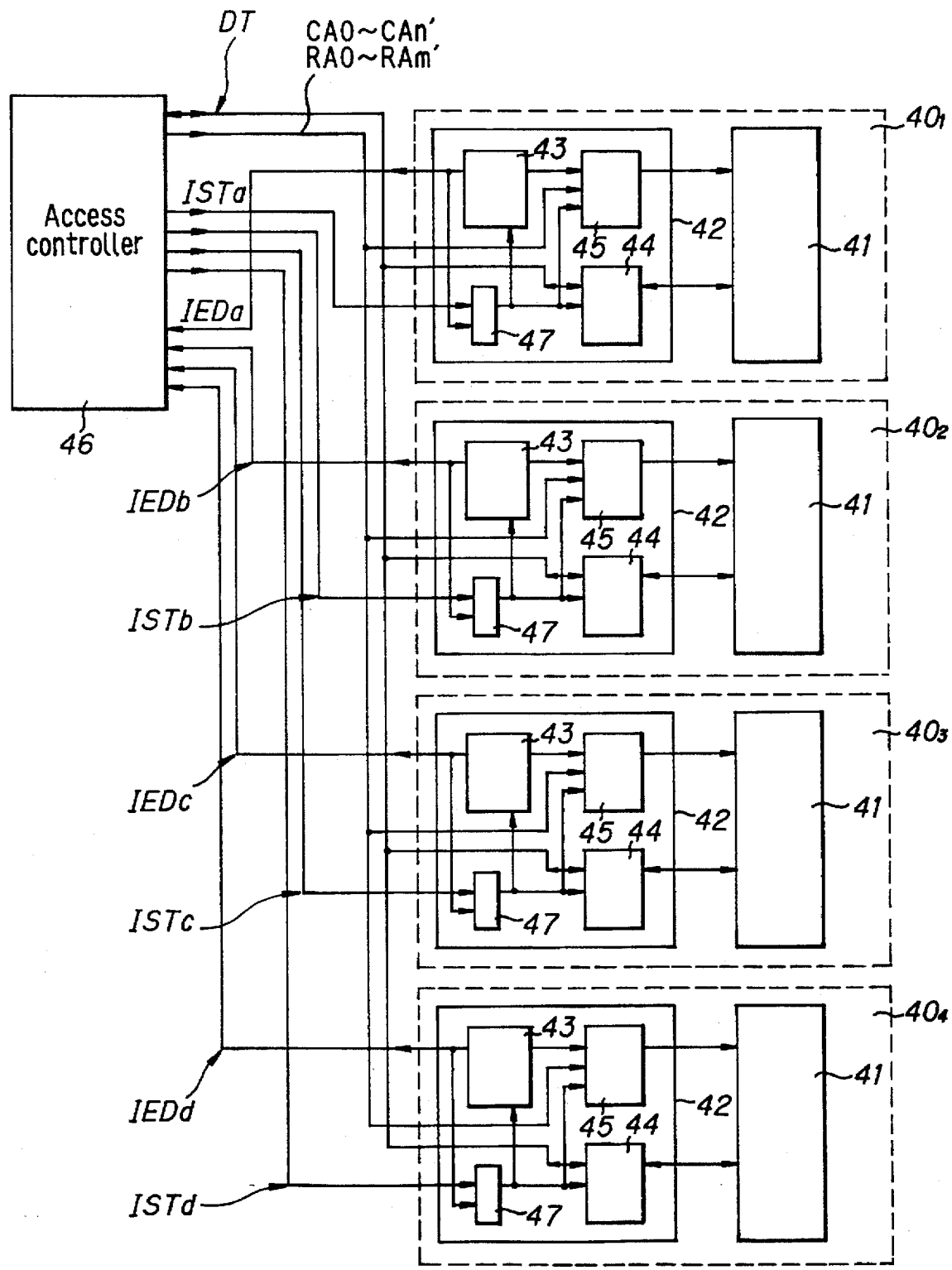
FIG. 40 shows the structure of another embodiment of a memory initialization method according to the present invention.

FIG. 40 shows the structure of another embodiment of a memory initialization method of the present invention. In each of memory modules $40_1$ to $40_4$, the same numerals are provided for the elements which are the same as those in the embodiment shown in FIG. 38. In this embodiment, the access controller 46 can access each of the memory modules $40_1$ to $40_4$ separately from each other. For example, when the second memory module $40_2$ from the top is added due to the insertion of a print board, the access controller 46 transmits an initialization command signal ISTb in response to a request for initialization from a host module. The flip flop 47 in the memory module $40_2$ is then set and the access controller 42 in the memory module produces an initialization address, as described above, so as to execute the initialization of the memory 41. When the initialization is finished, an initialization end signal IEDb is supplied, the flip flop is reset and the access controller 46 is informed of the end of the initialization. In this embodiment, since refreshment is not necessary in the initialization and the initialization of the memory module $40_2$ as a single body is executed, the access controller 46 can access another memory module during the initialization between the transmission of the initialization command signal ISTb and the reception of the initialization end signal IEDb.

It is also possible to provide another access controller 46 (not shown) so that the two access controllers can access individually the plurality of memory modules $40_1$ to $40_4$. In this structure, when a memory module is added due to the insertion of a print board, one of the access controller 46s transmits the initialization command signals ISTa to ISTd. Thereafter, the initialization of the designated memory module as a single body is executed. Therefore, the two access controllers 46 can process a request for access from a host module even during the initialization of the memory module.

(d-3) Initialization method when high-speed access is possible

Figure 41:
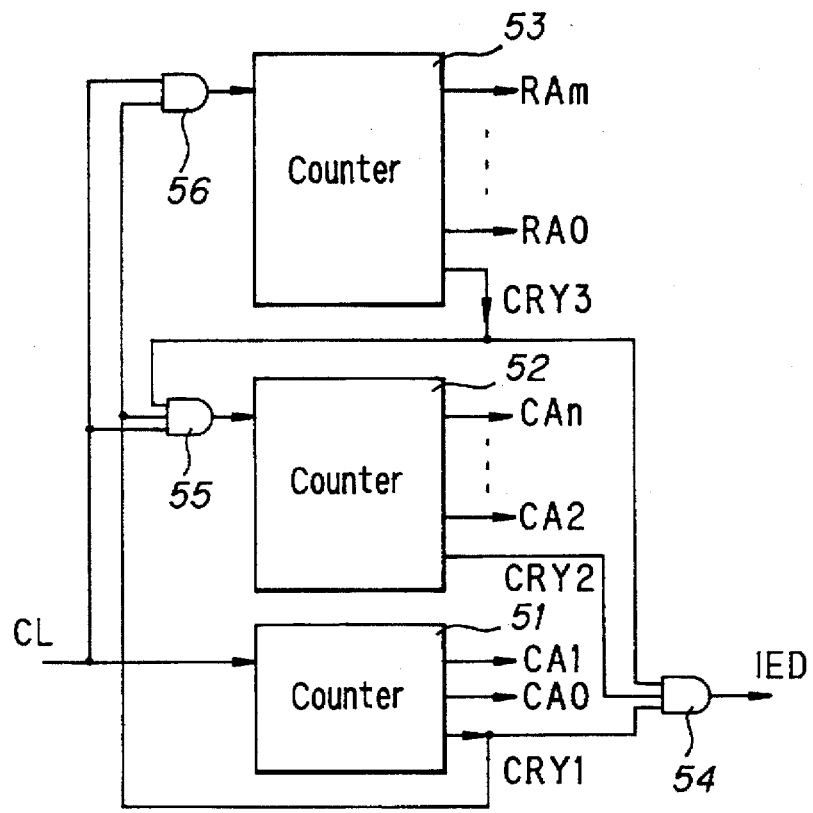
FIG. 41 shows the structure of an initialization address counter which is used in a high-speed access mode.

In order to execute high-speed initialization, a dynamic RAM which is capable of high-speed access such as a nibble mode and a high-speed page mode may be adopted. In a nibble mode or a high-speed page mode, it is possible to read/write data in consecutive four memory cells on one row or any four cells on one row. FIG. 41 shows the structure of an initialization address counter used in a high-speed page mode. The initialization address counter is composed of a counter 51 of 2 bits, a counter 52 of (n–1) bits, a counter 53 of (m+1) and AND gates 54 to 56.

A clock signal CL is constantly supplied to the counter 51, and a clock signal CL is input to the counter 53 only when a carry signal CRY1 is output from the counter 51 (all the outputs of the counter 51 are logic "1"). A clock signal CL is input to the counter 52 only when the carry signal CRY1 and a carry signal CRY3 are simultaneously output from the counters 51 and 53, respectively. The counter 51 outputs the lower 2 bits CA0, CA1 of the column address, the counter 52 outputs the upper (n–1) bits CA2 to CAn of the column address, and the counter 53 outputs the row addresses RA0 to RAm of (m+1) bits. When all the carry signals CRY1 to CR3 of the counters 51 to 53 are output, the output signal IED of the AND gate 54 becomes logic "1" which indicates the end of the initialization.

Figure 42:
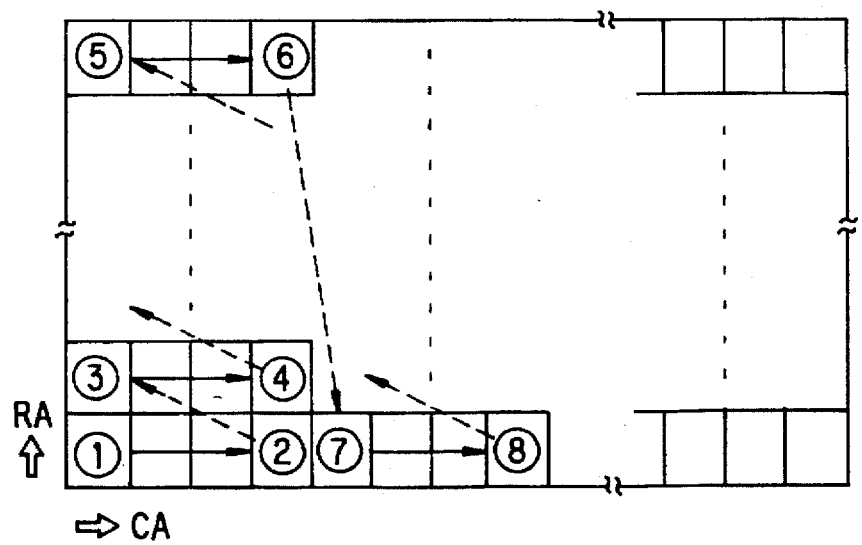
FIG. 42 is an explanatory method of still another embodiment of a memory initialization method according to the present invention which is capable of high-speed access.

Data are written in the memory cells in the order of ① to ⑧ during the initialization using the initialization address counter, as shown in FIG. 42, and the data written in the memory cells ① to ② are refreshed when data are written into the memory cells ⑦ to ⑧. The time taken for data to be written into the cells ① to ⑥ is shorter than the interval between two refreshment operations.

Figure 43:
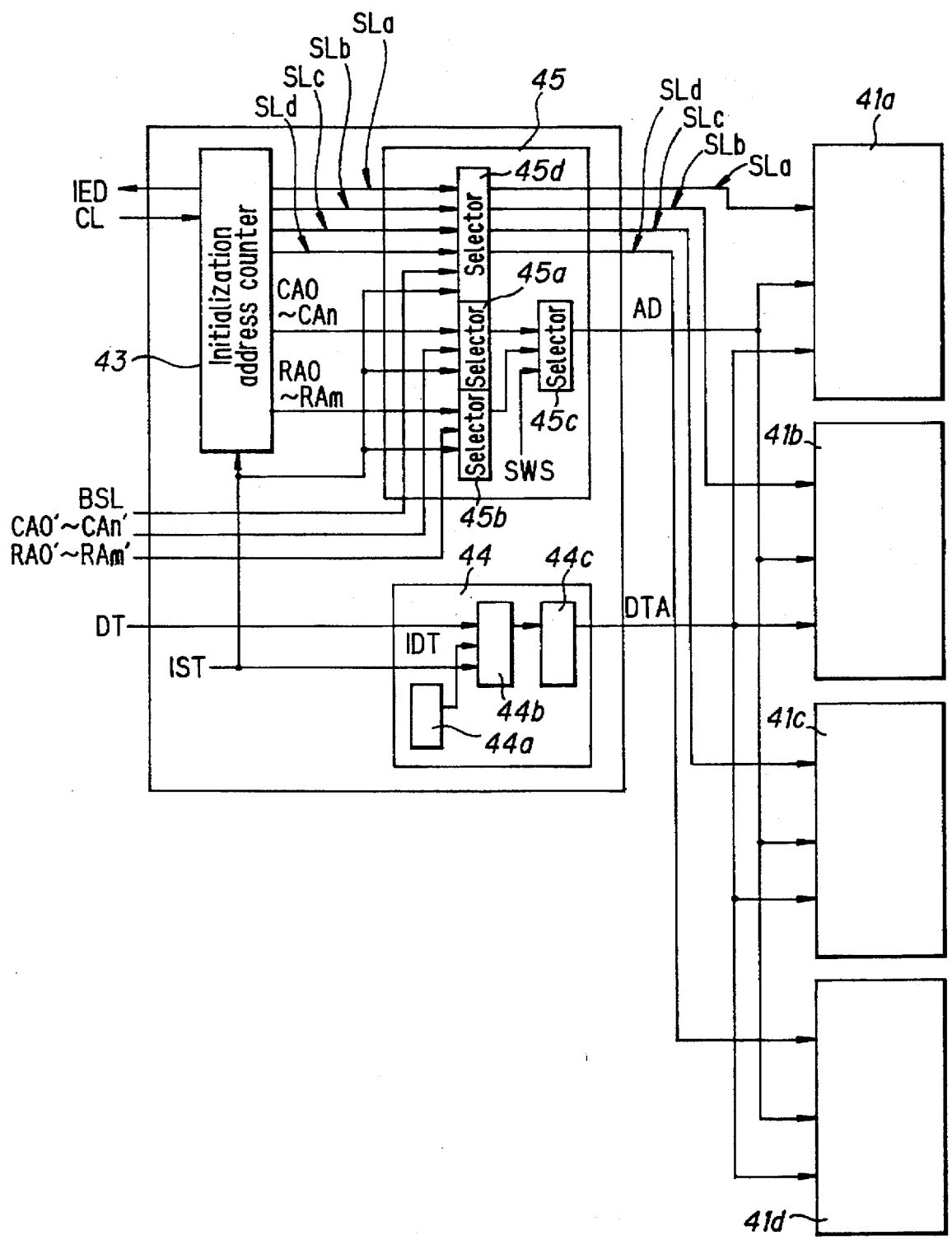
FIG. 43 shows the structure of a further embodiment of a memory initialization method according to the present invention in which the memory is divided into a plurality of blocks.
Figure 44:
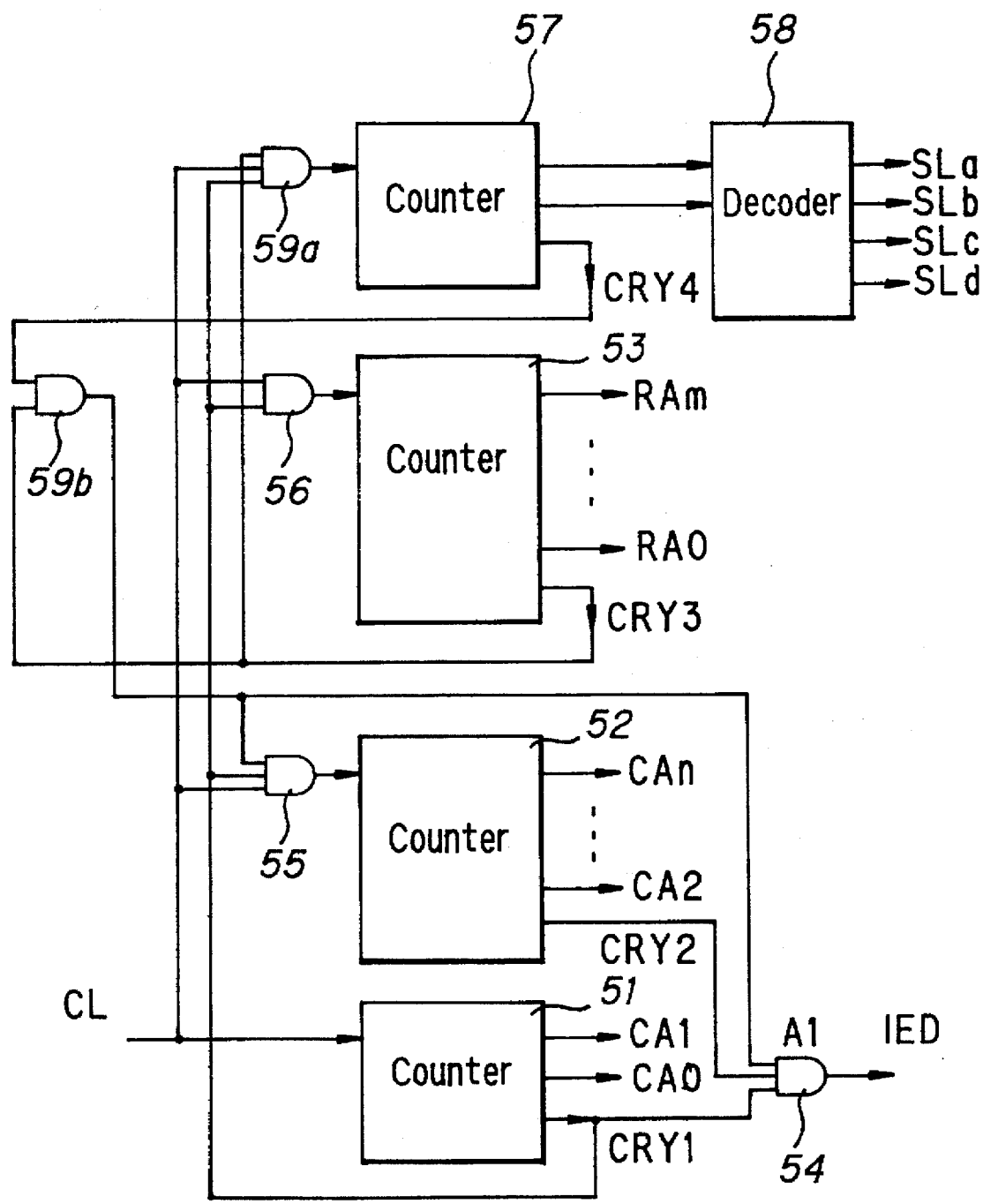
FIG. 44 shows the structure of the initialization address counter used in the embodiment shown in FIG. 43.

FIG. 43 shows the structure of a further embodiment of a memory initialization method according to the present invention in which the memory 41 is divided into a plurality of memory blocks 41a to 41d. In this case, the address signal AD from a host module contains ① column address signals CA0' to CAn', ② row address signals RA0' to RAm' and ③ a signal BSL for selecting a memory block. The selector 45d outputs one of selection signals SLa to SLd based on the signal BSL so that one of the memory blocks 41a to 41d which has received the selection signal SLA to SLd is accessed. The operation of selecting one of the memory blocks 41a to 41d simultaneously with the transmission of the address signal is necessary at the time of initialization. The initialization address counter 43 therefore has a structure such as that shown in FIG. 44. The initialization address counter 43 is produced by adding a counter 57 of 2 bits, a decoder 58 for decoding the output of the counter 57 and AND gates 59a, 59b to the structure shown in FIG. 41 on the assumption that the above-described high-speed page mode is adopted.

A clock signal CL is constantly supplied to the counter 51, and a clock signal CL is input to the counter 53 only when a carry signal CRY1 is output from the counter 51. A clock signal CL is input to the counter 57 only when the carry signal CRY1 and a carry signal CRY3 are simultaneously output from the counters 51 and 53, respectively, and a clock signal CL is input to the counter 52 only when the carry signal CRY1, a carry signal CRY2 and a carry signal CRY4 are simultaneously output from the counters 51, 52 and 57, respectively.

Figure 45:
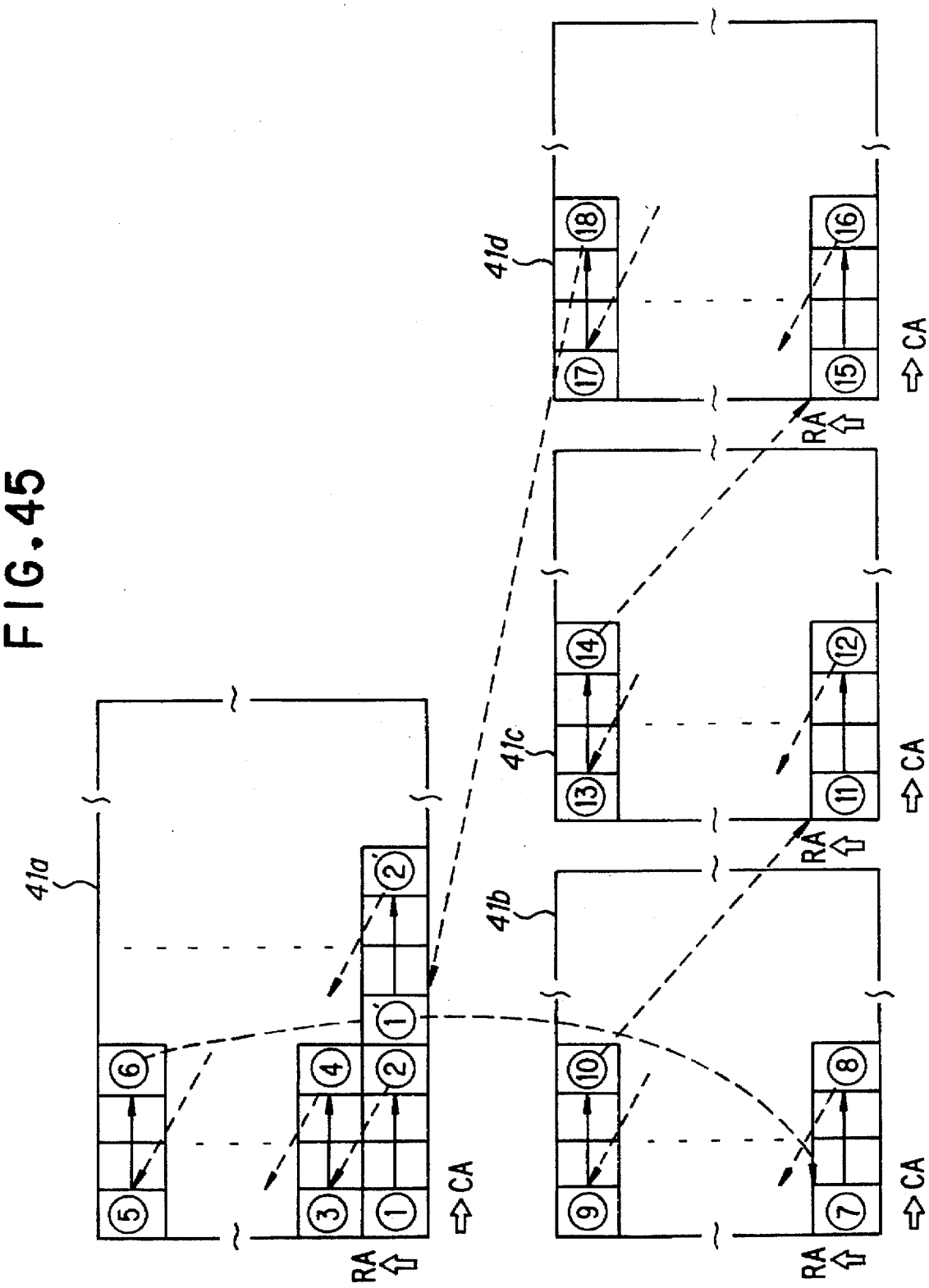
FIG. 45 is an explanatory view of a process for writing data in the embodiment shown in FIG. 43.

In the initialization process using the initialization address counter 43, data are written in the memory cells in the order shown in FIG. 45. The internal cells of the memory blocks 41a to 41d shown in FIG. 43 are shown in FIG. 45. Data are written into the cells ① to ⑥ in the same way as shown in FIG. 42. After data is written into the cell ⑥, the output of the counter 57 changes and the memory block 41b is selected, so that data is then written into the cell ⑦ of the memory block 41b. Subsequently, data are written in the memory blocks 41c and 41d in the same way. When the data writing into the memory block 41d is finished, the memory block 41a is selected again, but since the counter 52 counts up at this time, data are written into the memory cell ①'. Since the cells ① to ② are refreshed during the operation of writing data into the cells ①' to ②', there is no fear of losing the contents of the memory cells ① to ②.

(d-4) Advantages

At the time of initialization which requires refreshment, the production of the addresses in accordance with a specific rule obviates individual refreshing operations, thereby shortening the initialization time.

In addition, a host module and the access controller can execute initialization with indifference to refreshment. According to some structures, it is possible to prevent the memory access power from being lowered due to initialization, thereby enhancing the performance of the information processing apparatus.

As described above, according to the present invention, it is not necessary to stationarily prepare a large exclusive control table to provide for the maximum structure of an I/O subsystem unlike in a conventional I/O subsystem and an exclusive control table suffices in which only the host interfaces actually connected to the I/O subsystem are listed. It is therefore possible to reduce the size of the exclusive control table and the storage capacity for the table. Since the logical path control table LPT is stored in a non-volatile memory which does not lose the contents of the memory even if the power source is turned off, and a logical path number is allotted on the basis of the logical path control table LPT which is stored in the non-volatile memory, it is possible to reproduce the allotment of a logical path number before the power failure, so that the same environment is reproduced at the time of analysis of a trouble or a reproducing test of the trouble. In this way, according to the present invention, it is possible to enhance the performance of the I/O subsystem.

In addition, according to the present invention, since part of data is compressed before storage, it is possible to provide a semiconductor disk apparatus for storing a larger amount of data than the capacity of a semiconductor memory. At the time of data compression, since a data buffer having a large capacity is provided within the channel adapter, it is possible to compress data while maintaining the data transfer speed with respect to a host apparatus at a constant rate and therefore to alleviate the stress caused by the compression of the data. It is possible to verify the normality of compressed data within the subsystem without the need for linkage with a host apparatus. Even when an abnormality of data is detected as a result of verification, it is possible to recover the data within the subsystem. Since such data compression enables a large capacity of data to be stored, it is possible to enhance the performance of the I/O subsystem.

Furthermore, according to the present invention, when initialization data is written in a volatile memory which requires refreshment for each row, the initialization data is written in all memory cells on an i-th column while consecutively producing row addresses RA in an ascending order with the column address CA fixed at a constant value i, and the step of writing the initialization data is repeated in the same way on subsequent columns while serially advancing the column address CA one by one. In this manner, since refreshment and data writing are simultaneously conducted, if the time taken for the data to be written is shorter than the interval between two refreshment operations, it is not necessary to execute refreshment separately from the data writing operation, thereby shortening the initialization time. In the case of using a high-speed memory, the column addresses CA are divided into the upper column address and the lower column address, the initialization data is written in the memory cells while consecutively producing the lower column addresses in an ascending order with the upper column address and the row address RA fixed. The initialization data is then written in the same way on the subsequent row. In this way, after the initialization data is written on all rows, the data writing operation is repeated while serially advancing the upper column address one by one. This process also obviates a separate refreshing operation, thereby reducing the initialization time. In this way, according to the present invention, it is possible to enhance the performance of the I/O subsystem.

As many apparently widely different embodiments of the present invention can be made without departing from the spirit and scope thereof, it is to be understood that the invention is not limited to the specific embodiments thereof except as defined in the appended claims.

What is claimed is:

1. A data storage method in an I/O subsystem having a semiconductor memory module which is composed of a plurality of semiconductor memory chips, a memory interface adapter for controlling the operation of writing and reading data to and from said semiconductor memory module, a channel adapter for controlling the operation of inputting and outputting data between a host apparatus and said memory interface adapter, an exclusive controller for executing exclusive control over the access of said semiconductor memory module, and a backup memory for storing uncompressed data used to initialize the semiconductor memory module, said method comprising the steps of:

compressing the data in the channel adapter;
determining whether there is room in the semiconductor memory module to store the compressed data:
writing the compressed data in the semiconductor memory module if there is room, otherwise writing the uncompressed data to the backup memory during the operation of writing the compressed data into said semiconductor memory module because the size of the compressed data is larger than the size of the uncompressed data and subsequently writing the uncompressed data from said backup memory into said semiconductor memory;
reading and restoring the compressed data from the semiconductor memory module; and
verifying the compressed data written in the semiconductor memory module by comparing the restored data with the data before compression.

2. A data storage method in an I/O subsystem according to claim 1, further comprising the steps of:
providing a data buffer having a large capacity and a data compression mechanism in said channel adapter; and
compressing the input data which is stored in said data buffer by said data compression mechanism and writing the compressed data into said semiconductor memory module.

3. A data storage method in an I/O subsystem according to claim 2, further comprising the steps of:
writing said data before compression which is stored in said data buffer into a spare semiconductor memory module after said compression data is written into said semiconductor memory module; and
reading said data before compression from said spare semiconductor memory module so as to compare said data with said compressed data.

4. A data storage method in an I/O subsystem according to claim 3, further comprising the steps of:
compressing and writing said data which is read from said spare semiconductor memory module into said semiconductor memory module when an abnormality is detected as a result of the data comparison;
reading and restoring the compressed data which is written into said semiconductor memory module; and
verifying said compressed data which is written in said semiconductor memory module by comparing the restored data with said data before compression.

5. A data storage method in an I/O subsystem according to claim 1, further comprising the step of supplying a signal indicating "Busy" from said exclusive controller in response to the request for access to said semiconductor memory module during the data comparison.

6. A data storage method in an I/O subsystem according to claim 1, wherein said I/O subsystem is a semiconductor disk apparatus produced by emulating a magnetic disk apparatus.

7. A data storage method in an I/O subsystem according to claim 6, further comprising the steps of:
writing a directory containing the control information of records which are to be stored in a track field at the head of said track field which corresponds to a track of said magnetic disk apparatus, and writing the records after said directory;
adding a flag to each record which indicates whether or not the data at said record is compressed; and
adding to the directory logical address information, physical memory address information, a compression flag which indicates that the data is an object of compression, and the latest date when the data in said track field is changed or written.

8. A data storage method in an I/O subsystem according to claim 7, further comprising the steps of:
providing a backup disk apparatus and a backup adapter for controlling the operation of inputting and outputting data to said backup disk apparatus;
backing up the data stored in said semiconductor memory module into said backup disk apparatus;
storing the backup completion date when said data stored in said semiconductor memory module is backed up into said backup disk apparatus;
comparing said date contained in said directory with said backup completion date when said data stored in said semiconductor memory is backed up again; and
backing up the data newer than said backup completion date into said backup disk apparatus while not backing up the data older than said backup completion date.

9. A data storage method in an I/O subsystem according to claim 1, further comprising the steps of:
providing a backup disk apparatus and a backup adapter for controlling the operation of inputting and outputting data to said backup disk apparatus;
storing uncompressed data into said backup disk apparatus when said semiconductor memory module becomes full during the operation of writing said compressed data into said semiconductor memory module because the size of said compressed data is larger than the size of said uncompressed data; and subsequently writing said uncompressed data from said backup disk apparatus into said semiconductor memory module.

10. An I/O subsystem including a plurality of channel adapters for serving as interfaces to and from a host apparatus, a plurality of I/O devices, a plurality of device adapters for serving as interfaces to and from the I/O devices and a resources manager for managing the resources of said I/O subsystem as a whole, the subsystem comprising:

a semiconductor memory module which is composed of a plurality of semiconductor memory chips as one of said I/O devices;

a spare memory module;

a data buffer for storing uncompressed data sent from the host apparatus;

a data compressing means for compressing the data stored in said data buffer;

a memory interface adapter for controlling the operation of writing the compressed data into said semiconductor memory module and controlling the operation of writing the uncompressed data stored in said data buffer into said spare memory module;

a verifying means for restoring the compressed data which is written into said semiconductor memory module, and verifying said compressed data by comparing said restored data with the uncompressed data stored in the spare memory module;

a backup memory for storing the uncompressed data; and means for writing the uncompressed data into said backup memory when said semiconductor memory module becomes full during the operation of writing the compressed data into said semiconductor memory module because the size of the compressed data is larger than the size of the uncompressed data and subsequently writing the uncompressed data from said backup memory into said semiconductor memory.

* * * * *